US011957273B2

(12) United States Patent
Braido et al.

(10) Patent No.: US 11,957,273 B2
(45) Date of Patent: Apr. 16, 2024

(54) APPARATUS, METHODS, AND SYSTEM FOR AUTOMATICALLY FOLDING A BOX FOR FAST FOOD DELIVERY

(71) Applicant: RoboBurger Enterprises, Wilmington, DE (US)

(72) Inventors: Dan Braido, Jersey City, NJ (US); Audley Wilson, Jersey City, NJ (US); John Kelley, Gaysville, VT (US)

(*) Notice: Subject to any disclaimer, the term of this patent is extended or adjusted under 35 U.S.C. 154(b) by 49 days.

(21) Appl. No.: 17/856,044

(22) Filed: Jul. 1, 2022

(65) Prior Publication Data
US 2023/0069788 A1 Mar. 2, 2023

Related U.S. Application Data

(63) Continuation-in-part of application No. PCT/US2021/016448, filed on Feb. 3, 2021.

(51) Int. Cl.
*B31B 50/52* (2017.01)
*A47J 37/04* (2006.01)
*A47J 43/28* (2006.01)
*A47J 44/00* (2006.01)
*B31B 50/00* (2017.01)
*B31B 100/00* (2017.01)
*B31B 120/10* (2017.01)

(52) U.S. Cl.
CPC ........... *A47J 37/044* (2013.01); *A47J 37/049* (2013.01); *A47J 43/288* (2013.01); *A47J 44/00* (2013.01); *B31B 50/005* (2017.08); *B31B 50/006* (2017.08); *B31B 50/52* (2017.08); *B31B 2100/00* (2017.08); *B31B 2120/102* (2017.08)

(58) Field of Classification Search
CPC ..... B31B 50/006; B31B 50/005; B31B 50/52; B31B 2100/00; B31B 2120/102; B31B 2170/10; B31B 2241/002; B31B 2241/003
USPC ......................................................... 493/180
See application file for complete search history.

(56) References Cited

U.S. PATENT DOCUMENTS 3,215,062 A 11/1965 Frankenberg
3,314,198 A 4/1967 Frisk
(Continued)

FOREIGN PATENT DOCUMENTS

CN 202440044 U 9/2012
EP 1415937 A1 5/2004
(Continued)

*Primary Examiner* — Sameh Tawfik
(74) *Attorney, Agent, or Firm* — Derek Fahey; The Plus IP Firm, PLLC

(57) ABSTRACT

A system for automatically folding a box for fast food delivery is disclosed. The system includes a wall, a track within the wall, a conveyer channel located adjacent to the wall. The panels are initially arranged within the channel, so a first panel is positioned above and in front of the second panel. The panels will move in a series of five positions. The first position having the first panel and second panel adjacent to one another. The second position shifting the second panel downward to a height lower than the first. The third position moving the first panel so that it is substantially vertical creating an angle near 90 degrees between the first and second panel. The fourth position returning the first panel proximate to its original position. And a fifth position having a portion of the first panel extended over the second panel.

5 Claims, 62 Drawing Sheets

(56) References Cited

U.S. PATENT DOCUMENTS

| | | | |
|---|---|---|---|
| 3,386,348 A * | 6/1968 | Soennichsen | B65B 23/04 |
| | | | 493/122 |
| 3,386,550 A | 6/1968 | Murray et al. | |
| 4,164,171 A * | 8/1979 | Meyers | B31B 50/00 |
| | | | 198/408 |
| 4,581,876 A * | 4/1986 | Williams | B65B 7/26 |
| | | | 53/76 |
| 4,687,119 A | 8/1987 | Juillet | |
| 4,700,617 A | 10/1987 | Lee et al. | |
| 4,733,608 A | 3/1988 | Merdy | |
| 4,754,541 A * | 7/1988 | Dorner | B21D 51/52 |
| | | | 198/444 |
| 4,778,439 A * | 10/1988 | Alexander | B29C 51/082 |
| | | | 493/902 |
| 4,813,572 A | 3/1989 | Schmidt | |
| 4,922,435 A | 5/1990 | Cahlander et al. | |
| 4,970,845 A * | 11/1990 | Ausnit | B65B 43/42 |
| | | | 206/820 |
| 4,972,766 A | 11/1990 | Anetsberger | |
| 5,132,914 A | 7/1992 | Cahlander et al. | |
| 5,137,740 A | 8/1992 | Benson et al. | |
| 5,172,328 A | 12/1992 | Cahlander et al. | |
| 5,473,868 A * | 12/1995 | Antonio | B65B 43/345 |
| | | | 53/381.1 |
| 5,927,184 A | 7/1999 | Hermansson | |
| 6,805,659 B2 * | 10/2004 | Bohrer | B29C 66/135 |
| | | | 493/115 |
| 8,671,654 B2 * | 3/2014 | Langen | B31B 50/022 |
| | | | 493/122 |
| 11,019,960 B1 | 6/2021 | Wilson et al. | |
| 11,198,268 B2 * | 12/2021 | Desertot | B31B 50/282 |
| 2010/0263325 A1 | 10/2010 | Inamura | |
| 2020/0031008 A1 | 1/2020 | Engel-Hall et al. | |

FOREIGN PATENT DOCUMENTS

| | | |
|---|---|---|
| GB | 257344 A | 8/1926 |
| GB | 735649 A | 8/1955 |
| KR | 20010065538 A | 7/2001 |
| WO | 2022172144 A1 | 8/2002 |

\* cited by examiner

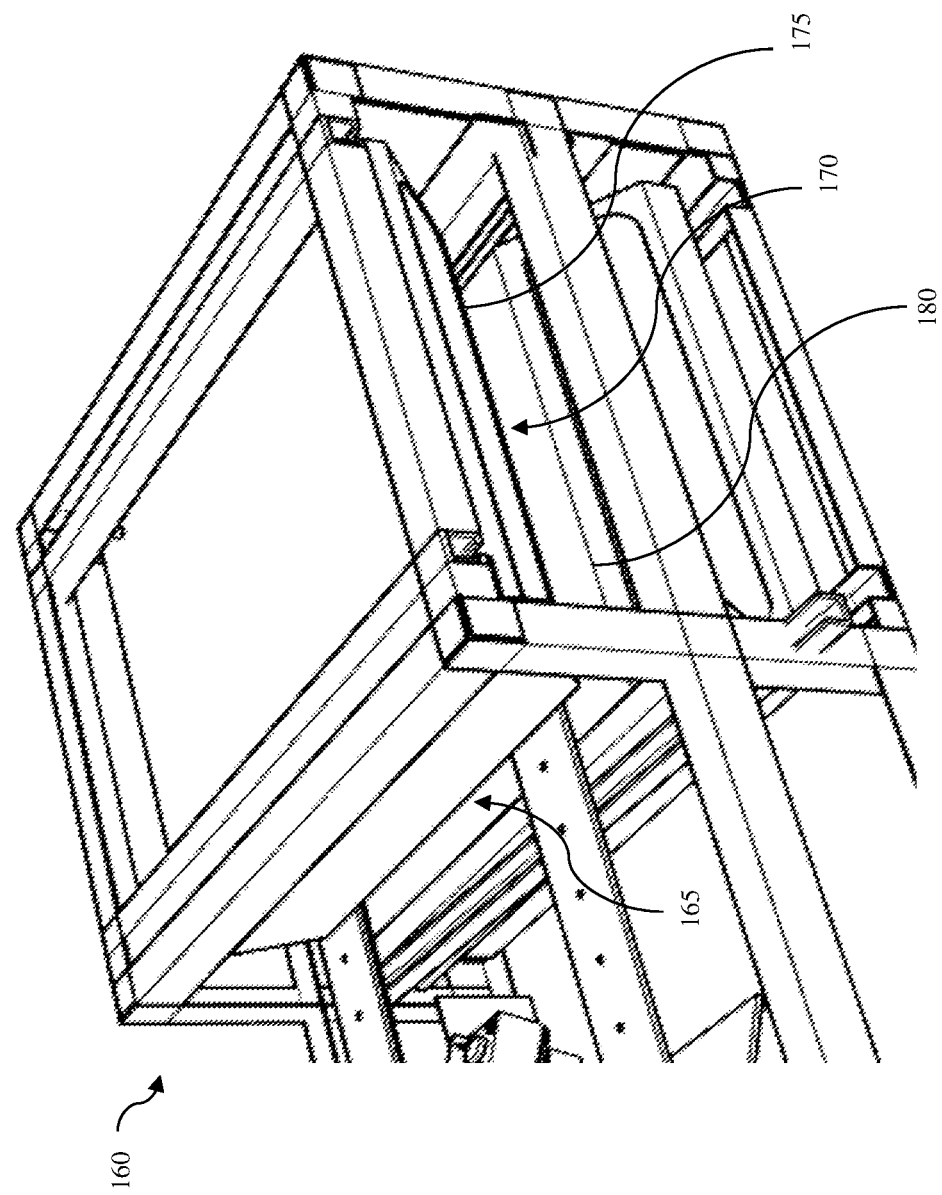

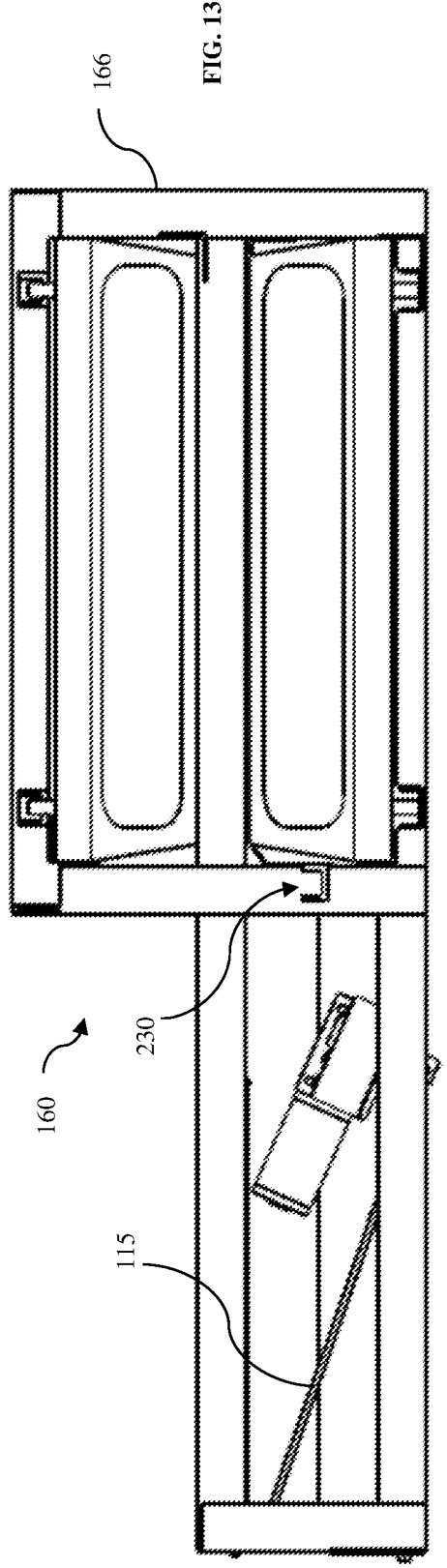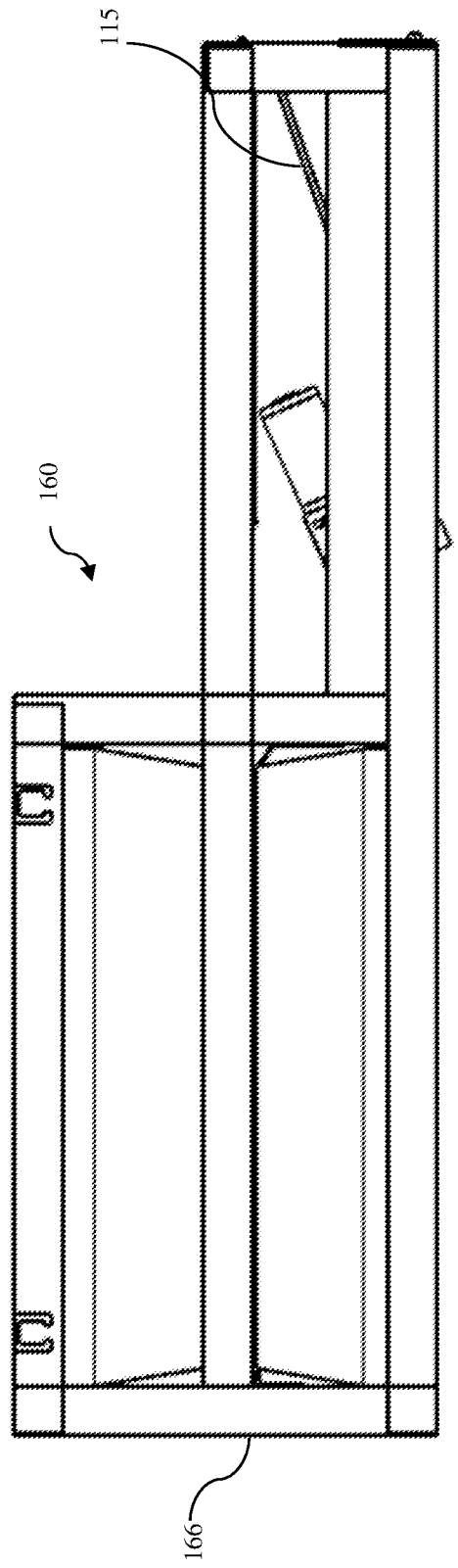

APPARATUS, METHODS, AND SYSTEM FOR AUTOMATICALLY FOLDING A BOX FOR FAST FOOD DELIVERY

CROSS-REFERENCE TO RELATED APPLICATIONS

This application is a continuation in part application that claims the benefit of PCT application no. PCT/US21/16448 entitled "APPARATUS AND METHOD FOR PREPARING COOKED FOOD" and filed Feb. 3, 2021, which claims the benefit of U.S. Non-provisional application Ser. No. 16/780,131 entitled "APPARATUS AND METHOD FOR PREPARING COOKED FOOD" and filed Feb. 3, 2020, now patented, the subject matter of both said applications is incorporated herein by reference.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

TECHNICAL FIELD

The present invention relates to the field of food preparation, and more specifically to the field of automated food preparation devices.

BACKGROUND

Safe food supplies support national economies, trade and tourism, contribute to food and nutrition security, and underpin sustainable development. However, foodborne diseases encompassing a wide spectrum of illnesses are a growing public health problem worldwide. Foodborne diseases account for an estimated 76 million illnesses, 350,000 hospitalizations and 5,000 deaths every year in the United States, according to the Centers for Disease Control and Prevention. Moreover, according to the World Health Organization (WHO), an estimated 600 million people—almost 10 percent of the global population—fall ill after eating contaminated food.

Protecting the public from the degrees of the harmfulness of contaminated foods has become a daunting task. Automated food preparation devices are being increasingly used in the food industry as a means of preventing food contamination. Although automated food preparation devices have potential food safety benefits such as the need for fewer workers reducing the risk of contamination through manual handling, the implementation of suitable procedures to clean and sanitize the automated food preparation devices is necessary.

For example, it is essential to increase awareness among service operators about the risks related to human factors. While it cannot be overemphasized that clean, sanitary workers are necessary to produce clean, healthy food products, it is estimated in general society that between 30 percent and 50 percent of persons do not wash their hands after using the restroom. Therefore, service operators must be fully trained on sanitizing hands, using clean garments intended for food processing, and wearing disposable gloves, shoe covers and hats, especially when dealing with highly perishable foods. Training is also fundamental to learn how to maintain the device so as to minimize the occurrence of accidental contamination due to a lack of awareness among service operators.

Even if an automated food preparation device is properly cleaned, however, it will not prevent biofilms from forming on food-contact surfaces during the time span in between cleanings. Biofilms are surface-attached microbial communities with distinct properties, which have a tremendous impact on public health and food safety. Specifically, biofilms act as a persistent source of contamination because a wide variety of foodborne pathogens are able to attach, colonize, and form biofilms, such as the O157- and non-O157 Shiga toxin—producing *E. coli* (STEC), *S. enterica,* and *L. monocytogenes,* etc.

Given the impact of human factors, a need exists to improve over the prior art and more particularly, for a self-cleaning automated food preparation device to reduce the risk of food-borne diseases and contamination.

SUMMARY

An apparatus and method for preparing cooked food is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a system for automatically folding a box for fast food delivery is disclosed. The system comprises a wall, a conveyer channel located adjacent to the wall, two panels each with a motor attached by use of an arm connected to a fixed end of the panel providing the ability to pivot about an axis within the conveyer channel. The panels are first arranged so that they are vertically offset positioning the first panel above the second panel, and horizontally offset positioning the first panel in front of the second panel. The panels will move in order for a series of five positions. The first position comprises the first panel and second panel are adjacent to one another. The second position will shift the second panel downward to a height lower than the first. The third position will orient the first panel so that it is substantially vertical creating an angle close to (within plus or minus 5 degrees) of 90 degrees as measured between the first panel and the first panels starting position. The fourth position will return the first panel proximate to its original location in position one. And the fifth and ending position will be arranged so that the first panel pivots past 90 degrees leaving the first end portion positioned over the second panel In one embodiment, the wall contains a track with a peg positioned within the track. The track is used to guide each panel through the conveyer channel at various positions while the peg, being positioned on the free end of each panel, links the panel and the track together. Three sensors are utilized to monitor the positions of the panels and the box as they move along the track. A first sensor is configured to detect the position of the first panel. A second sensor is configured to detect the position of the second panel. A third sensor is configured to detect if the box is disposed onto the second panel within the conveyer channel. Each panel is in communication with a motor, being connected to the panel by an arm connected to a fixed end of the panel. The motor drives the panels along the track and pivots the panels about their axis when necessary.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein:

FIG. 12 is a top perspective front view of an oven assembly, according to an example embodiment of the present invention;

FIG. 13 is a front view of an oven assembly, according to an example embodiment of the present invention;

FIG. 14 is a rear view of an oven assembly, according to an example embodiment of the present invention;

DETAILED DESCRIPTION

Figure 1:
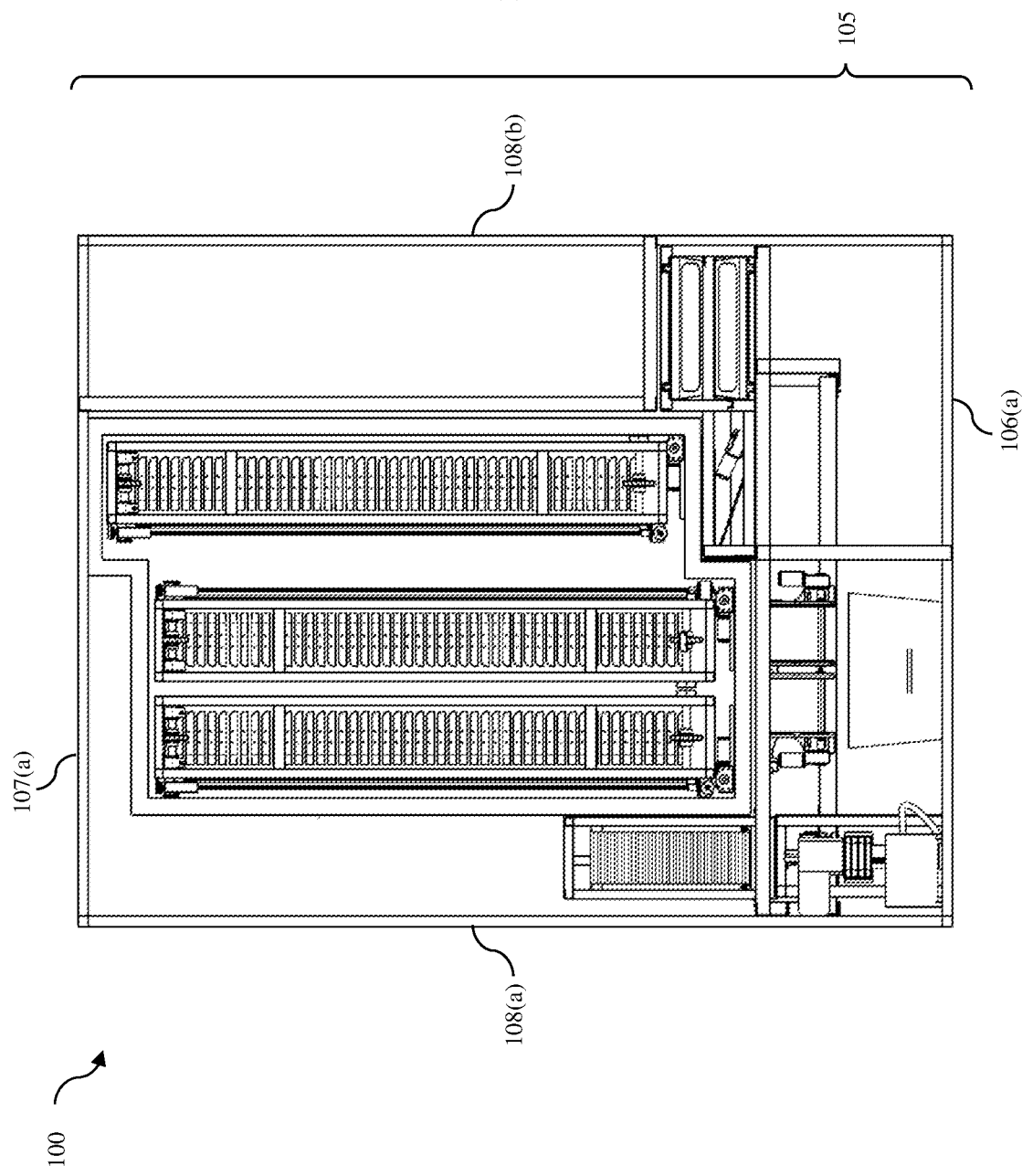
FIG. 1 is a front view of an apparatus for preparing a cooked food item, according to an example embodiment of the present invention.
Figure 2:
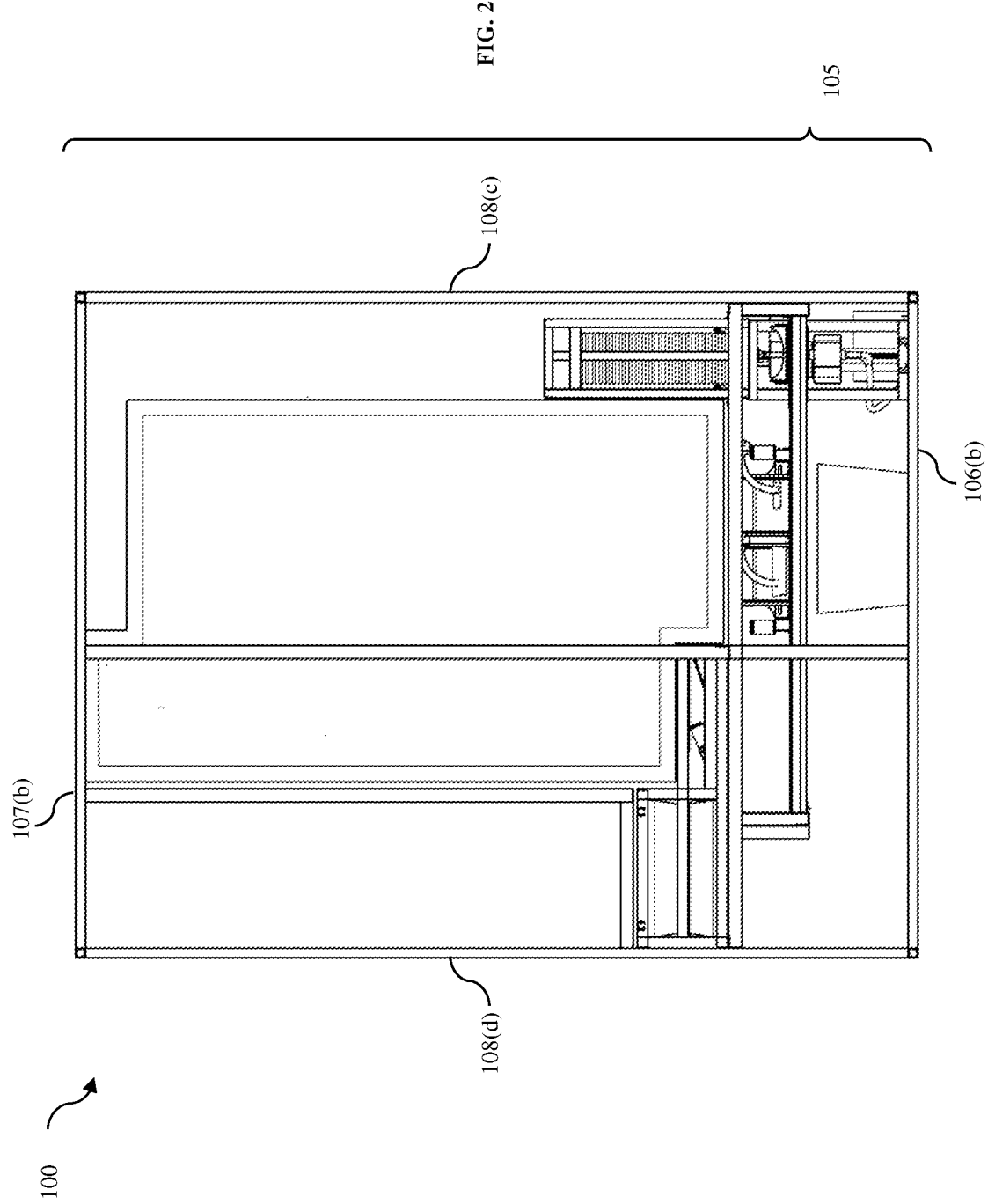
FIG. 2 is a rear view of an apparatus for preparing a cooked food item, according to an example embodiment of the present invention.
Figure 4:
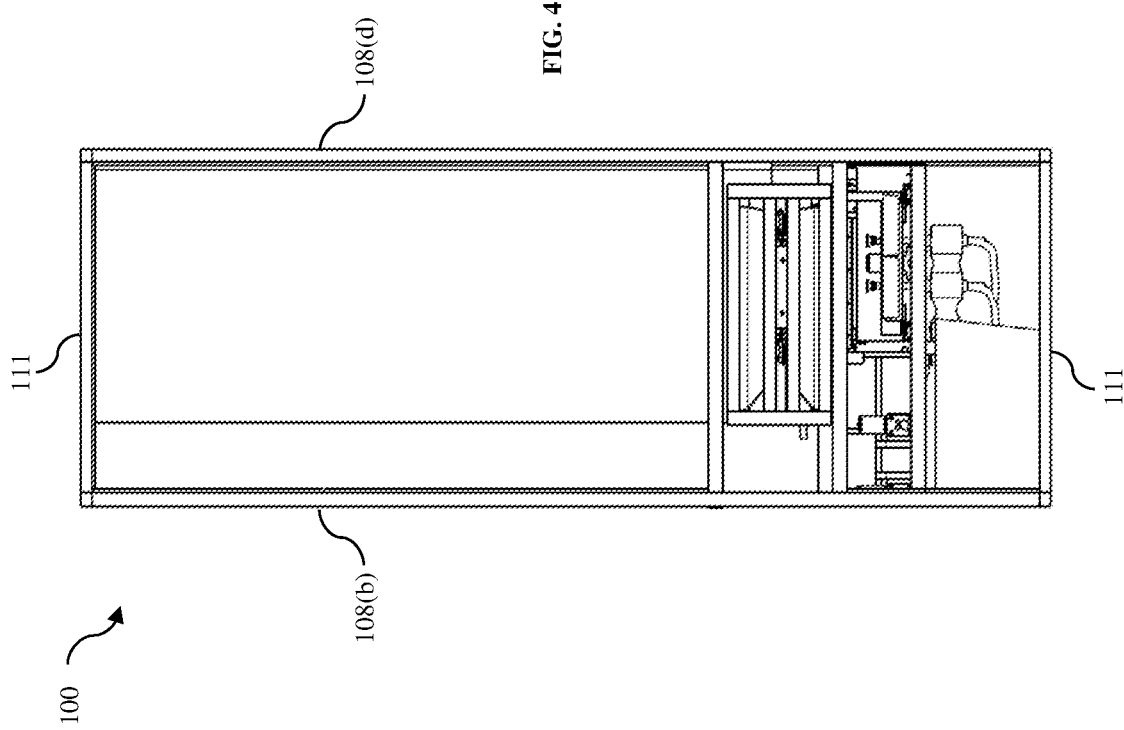
FIG. 4 is a left-side view of an apparatus for preparing a cooked food item, according to an example embodiment of the present invention.
Figure 3:
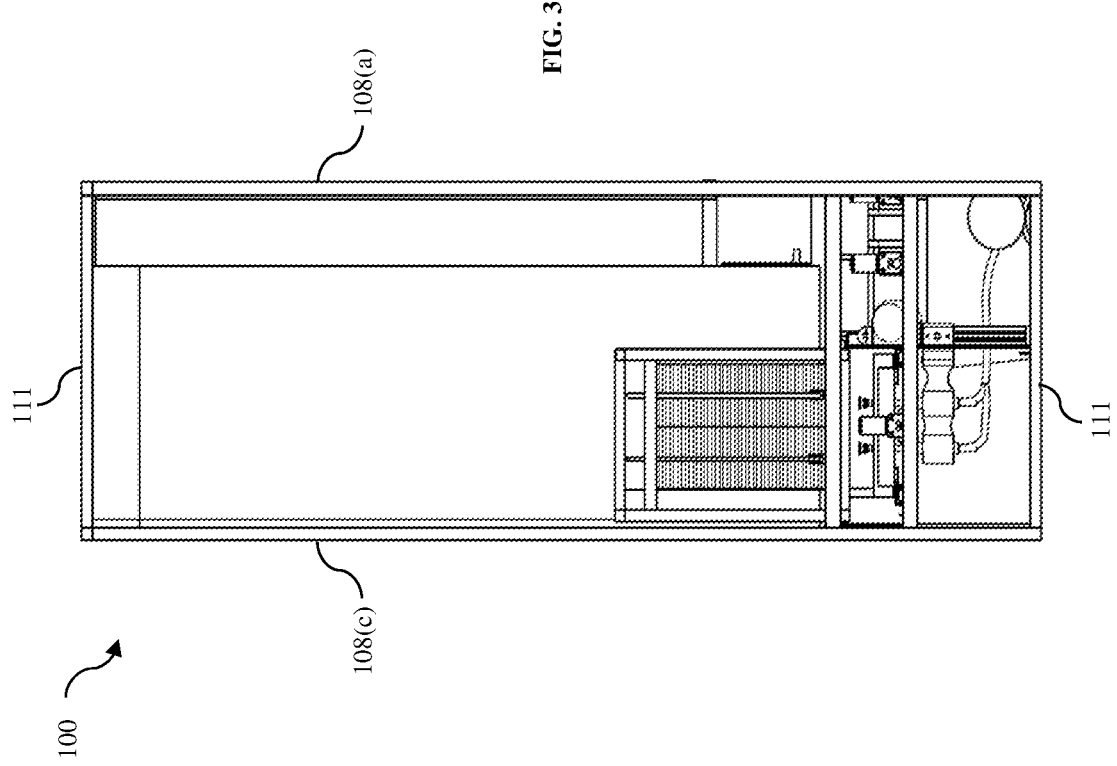
FIG. 3 is a right-side view of an apparatus for preparing a cooked food item, according to an example embodiment of the present invention.
Figure 6:
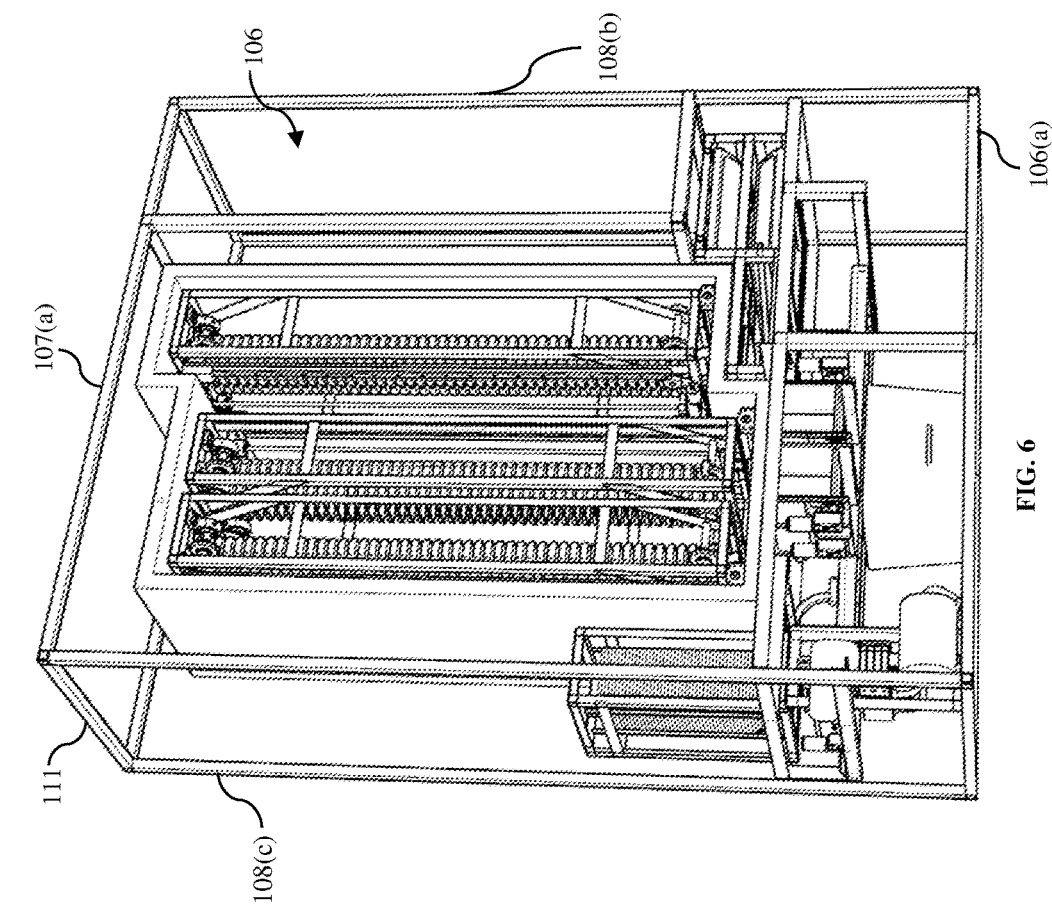
FIG. 6 is a bottom perspective front view of an apparatus for preparing a cooked food item, according to an example embodiment of the present invention.
Figure 5:
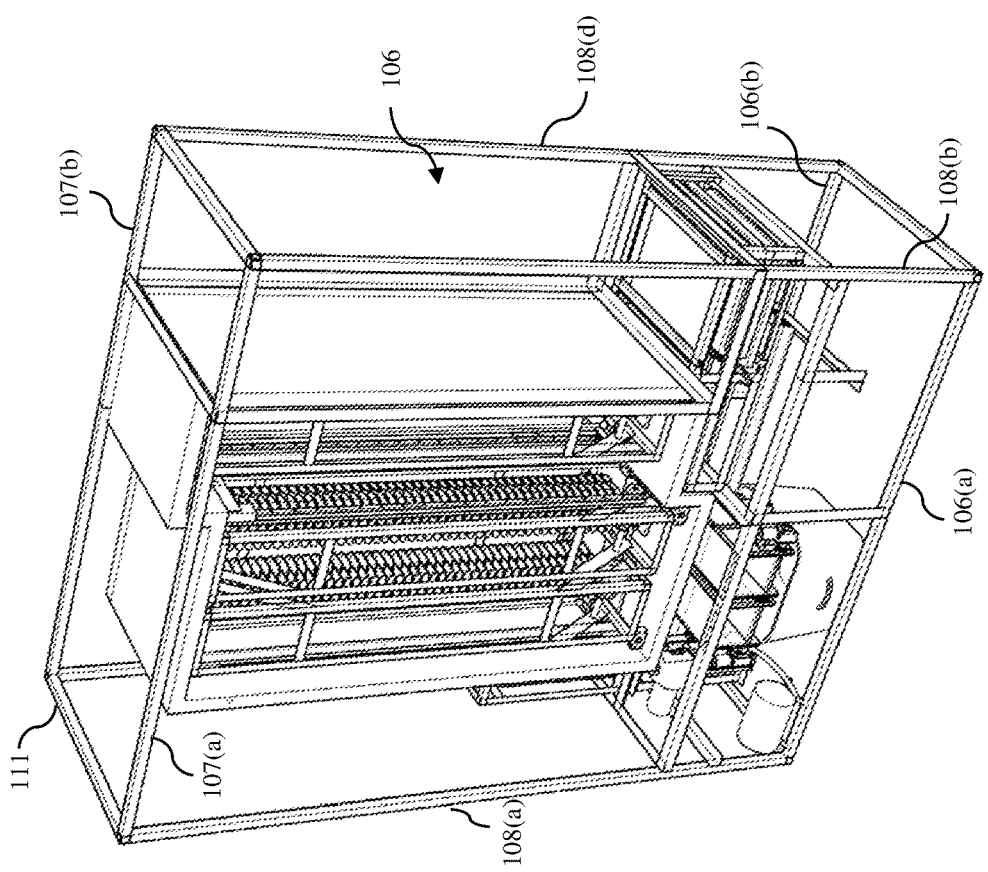
FIG. 5 is a top perspective front view of an apparatus for preparing a cooked food item, according to an example embodiment of the present invention.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

As used herein, the terms "in attachment with", "attached", "connected", "interconnected", "contacting", "coupled", "mounted," and the like encompasses both direct and indirect attachment between elements, unless stated otherwise.

The present invention improves upon the prior art by providing an apparatus for preparing cooked food that includes an automated cleaning system for the parts directly in contact with food, which minimize human intervention and, consequently, contamination risks. The apparatus includes at least one spray assembly having at least one nozzle configured to spray cleaning solution on a cooking area upward facing surface, a cooking area downward facing surface, and a plate. A movable wiper assembly defining an elongated body having a movable wiper cleaning surface along the elongated body is positioned proximate to the plate and configured to have the movable wiper cleaning surface move across the plate cooking surface when the plate is in a plate lower position. The apparatus further includes a fixed wiper defined by an elongated bar having at least one fixed wiper cleaning surface. The elongated bar is configured to engage the cooking area upward facing surface and the cooking area downward facing surface such that the fixed wiper cleans the cooking area upward facing surface and the cooking area downward facing surface when a spatula assembly moves between a spatula assembly cooking position and a spatula assembly non-cooking position.

Referring now to the Figures, FIGS. 1-6 illustrate an apparatus 100 for preparing a cooked food item according to an example embodiment of the present invention and will be discussed together for ease of reference. Although the examples given below describe the apparatus 100 as an apparatus for preparing and cooking a hamburger consisting of a ground beef patty, those of skill in the art will appreciate that the apparatus may be used to prepare and cook other foods having various shapes and sizes, including, but not limited to chicken, steak, pork, fish, bacon, pizza, tacos, vegetables, and eggs, and such variations are within the spirit and scope of the claimed invention.

The apparatus 100 includes a frame assembly 105 defining a housing 106 that is configured to hold or support a plurality of electrical and mechanical components of the apparatus 100. As illustrated, the apparatus is housed within an enclosed frame structure defined by the frame assembly 105. In one embodiment, the frame assembly includes a forward frame and a rearward frame. The forward frame includes a bottom frame 106(*a*), a top frame 107(*a*), and two side frames 108(*a*),108(*b*). The rearward frame includes a bottom frame 106(*b*), a top frame 107(*b*), and two side frames 108(*c*),108(*d*). The frame assembly 105 further includes a plurality of spanning cross members (111) interconnected between the forward frame and rearward frame. The forward frame, rearward frame, and plurality of spanning cross members (111) may be integrally formed to each other or may be comprised of different pieces which may be secured to each other by any suitable means, such as mechanical fastening means or welding. In one embodiment, the frame assembly 105 is made of a suitably strong metal, such as steel. However, it should be appreciated that the frame assembly 105 may be made of any suitable material or combination of materials and that the shape, configuration, and size of the frame assembly 105 may vary in accordance with the present invention. In certain embodiments the apparatus may be an enclosed vending machine configured to house all the components of the apparatus.

Figure 7:
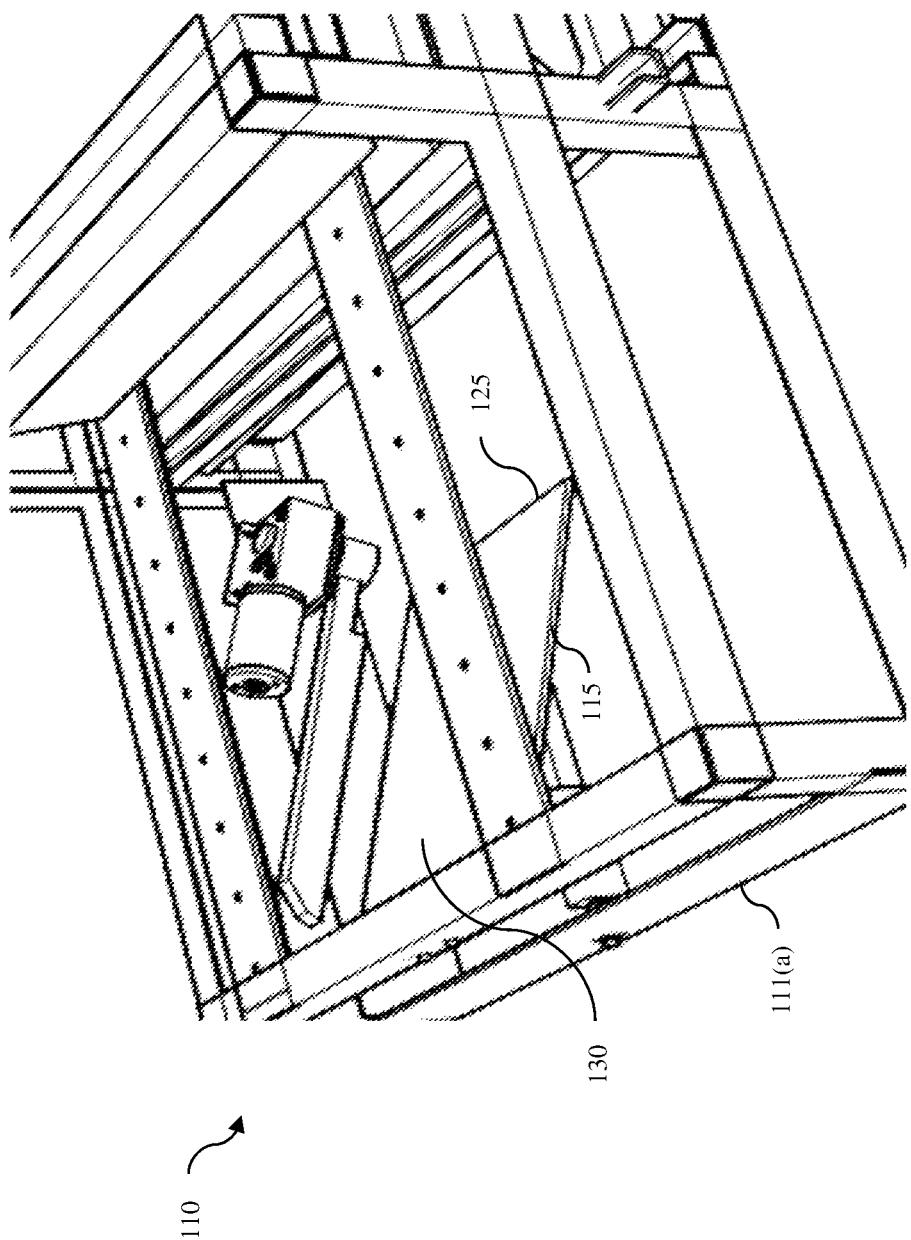
FIG. 7 is a top perspective view of a spatula assembly and a movable wiper assembly, according to an example embodiment of the present invention.
Figure 8:
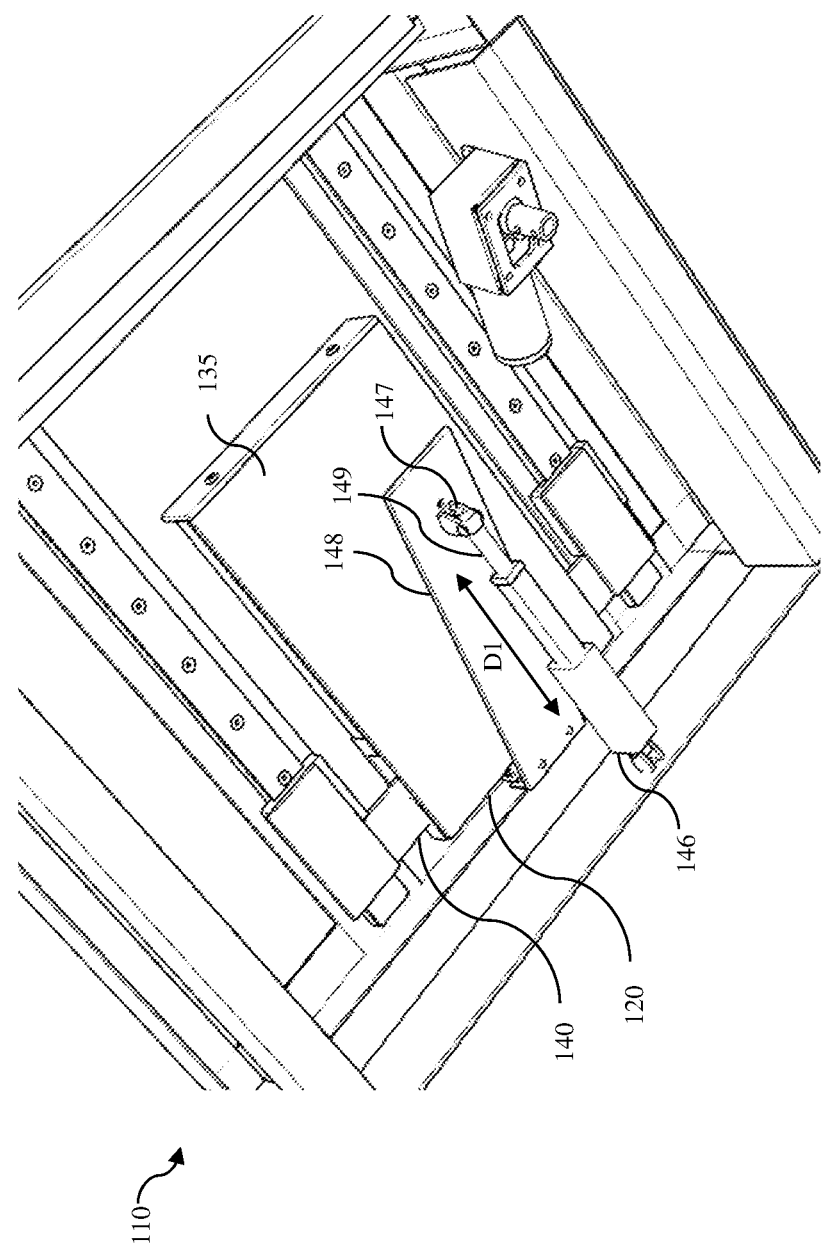
FIG. 8 is a bottom perspective view of a spatula assembly and a movable wiper assembly, according to an example embodiment of the present invention.

FIGS. 7 and 8 show a spatula assembly 110 according to an example embodiment of the present invention. The spatula assembly 110 defines a plate 115 that is configured to move between a plate upper position and a plate lower position, as further discussed below. The plate includes a plate first end portion 120 and a plate second end portion 125. The plate first end portion 120 is pivotally attached with a spatula assembly cross member 140 of the spatula assembly 110. Further, the plate may move (e.g., rotate) relative to the cross member between a plate upper position and a plate lower position. The plate first end portion 120 may be attached to the spatula assembly cross member 140 with a shaft, hinge, pin, or any other suitable method known in the art. The plate 115 further includes a plate cooking surface 130 and a plate non-cooking surface 135. The plate cooking surface 130 is located on the upward facing side of the plate and the plate non-cooking surface 135 is located on the downward facing side of the plate. As further discussed below, the spatula assembly 110 is further configured to move between a spatula assembly cooking position and a spatula assembly non-cooking position. In this regard, the plate may move linearly between a plate cooking position and a plate non-cooking position. In one embodiment, in the plate cooking position substantially all of the plate is positioned in the cooking area between the cooking area downward facing surface and the cooking area upward facing surface. In one embodiment, in the plate non-cooking position substantially all of the plate is positioned outside the cooking area, outside the open first end of the at least one fixed oven assembly and not between the cooking area downward facing surface and the cooking area upward surface. An elongated assembly (e.g., a telescoping arm as described above) may be movably engaged to the plate non-cooking surface to move the plate, where substantially all of the plate is outside a cooking area when the plate is in the plate lower position.

In the present embodiment, the plate 115 has a square shaped body and a substantially planar surface. It should be appreciated that the plate 115 may have other shapes, dimensions, and surfaces, and such variations are within the spirit and scope of the claimed invention. For example, the plate 115 may have a circular shape body and a partially or entirely curved surface. The plate 115 may be comprised of materials such as stainless steel, aluminum, aluminum alloy, cast iron, steel, ceramic, or any other suitable material known in the art, and such variations are within the spirit and scope of the claimed invention. Additionally, the plate cooking surface 130 may be coated with one or more nonstick coatings, such as TEFLON® (i.e., fluorocarbon polymers) or (e.g., tetrafluoroethylene and fluorinated ethylene propylene) to ease the removal of a food item from the plate cooking surface 130 when the plate is in the plate lower position.

The spatula assembly 110 further includes a retaining member 200. The retaining member is configured to maintain a food item on the plate cooking surface 130. The retaining member 200 is in attachment with the spatula assembly cross member 140 above the plate 115. In the present embodiment, the retaining member 200 has a square shaped body with a circular opening 201 formed therethrough. The circular opening 201 is sized and shaped to accommodate a ground beef patty, however, it should be appreciated that the retaining member 200 may have other shapes, dimensions, and openings, and such variations are within the spirit and scope of the claimed invention. For example, the retaining member 200 may have a circular shape body and a square shaped opening formed therethrough. The retaining member 200 may be formed from the same material as the plate or may be formed from any other suitable material. In one embodiment, the retaining member is attached to the cross member and above the plate such that a first longitudinal axis of the retaining member is perpendicular and substantially in line with a second longitudinal axis of the cross member. The retaining member may also have a retaining member opening within a perimeter of the retaining member. In one embodiment, substantially all of the retaining member opening is positioned in the cooking area between the cooking area downward facing surface and the cooking area upward facing surface of the at least one fixed oven assembly when the plate is in the plate cooking position. In such embodiments, substantially all of the retaining member opening is positioned outside the open first end of the at least one fixed oven assembly and not between the cooking area downward facing surface and the cooking area upward facing surface when the plate is in the non-cooking position. In one embodiment, in the plate upper position, the plate second end portion may be next to the retaining member. In one embodiment, in the plate lower position, the plate second end portion may be separated apart from the retaining member.

FIGS. 7 and 8 also show a telescoping arm assembly 145 according to an example embodiment of the present invention. The telescoping arm assembly 145 is movably engaged with the plate non-cooking surface 135. The telescoping arm assembly 145 is configured to move the plate 115 between the plate upper position and the plate lower position. The telescoping arm assembly 145 includes a first 146, a second end 147, and a plurality of telescoping segments 149 which telescope out to form an elongated arm moving the plate 115 between the plate upper position and the plate lower position. In one embodiment, the first end 146 of the telescoping arm assembly 145 is coupled to a horizontal cross member 111(a) spanning between the forward frame and the rearward frame of the apparatus 100, and the second end of the telescoping arm assembly 145 is directly attached to the plate non-cooking surface 135.

Figure 55:
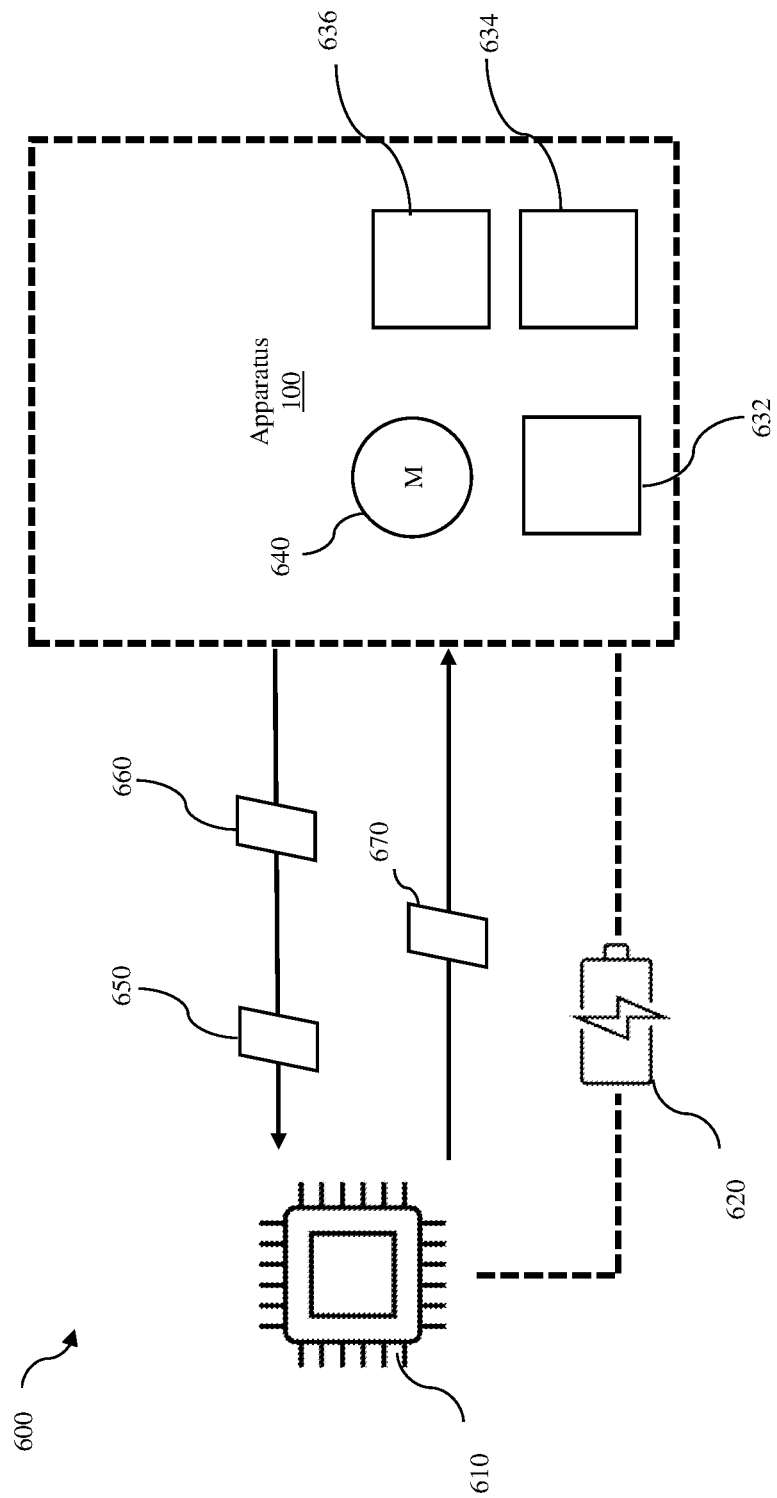
FIG. 55 is a schematic diagram of an apparatus and a controller in communication.

The telescoping arm assembly 145 is conductively and communicatively coupled to at least one controller and at least one power source and includes a linear actuator that is configured for extending and retracting (in the direction of double arrowed line D1) the telescoping arm assembly 145 via an electrically powered motor (see FIG. 55). In operation, to move the plate from the plate upper position to the plate lower position, the telescoping arm assembly 145 is retracted in the direction of arrowed line D2. Conversely, to move the plate from the plate lower position to the plate upper position, the telescoping arm assembly 145 is extended in the direction of arrowed line D3.

In the present embodiment, the first end 146 of the telescoping arm assembly 145 is coupled to the horizontal cross member 111(a) spanning between the forward frame and the rearward frame of the apparatus 100, and the second end of the telescoping arm assembly 145 is coupled to a pivot arm 148. The pivot arm 148 is configured to retain, or hold, the plate 115 in a desired position. For example, when the telescoping arm assembly 145 is extended, the pivot arm 148 is configured to hold the plate 115 in the plate upper position such that a food item component may be positioned upon the plate cooking surface 130. In another example, when the telescoping arm assembly 145 is retracted, the pivot arm 148 is configured to hold the plate 115 in the plate lower position such that the food item component may be delivered to at least one assembling area 235, as further discussed below.

Figure 9:
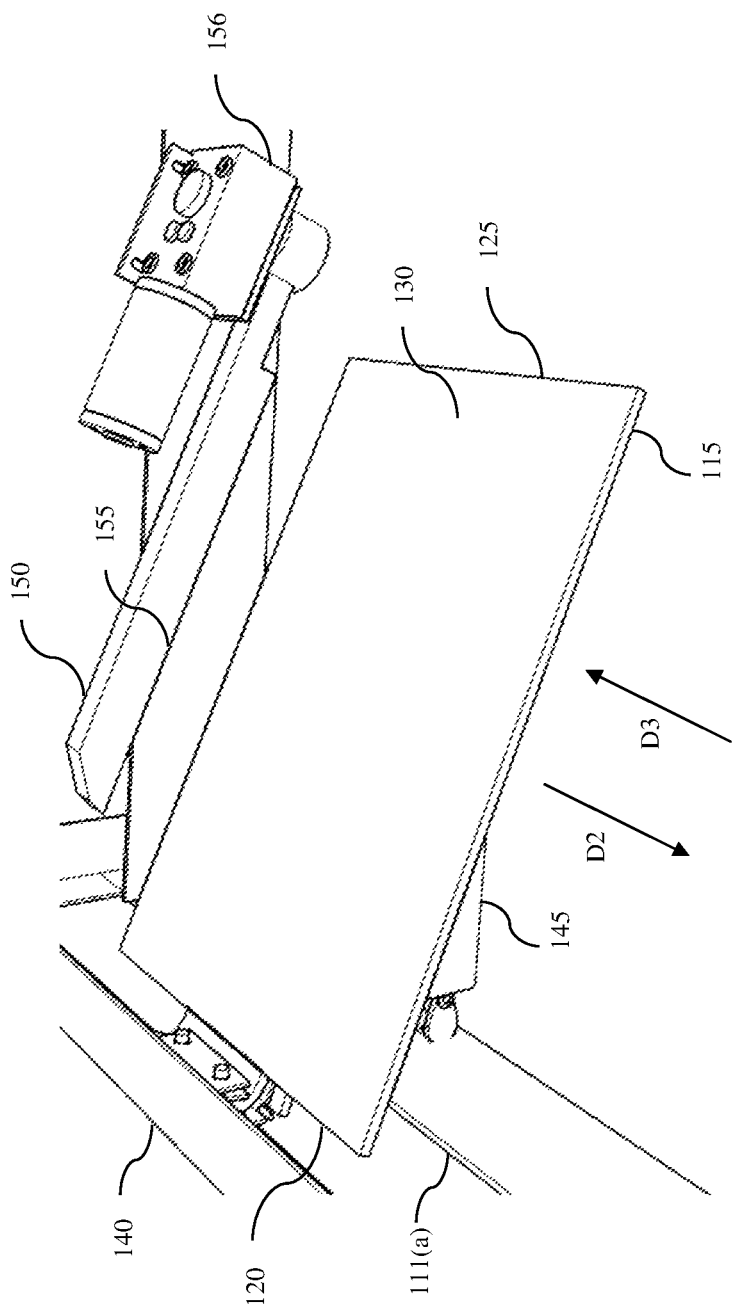
FIG. 9 is a perspective view of a spatula assembly and a movable wiper assembly, wherein the movable wiper assembly is in a first position, according to an example embodiment of the present invention.
Figure 10:
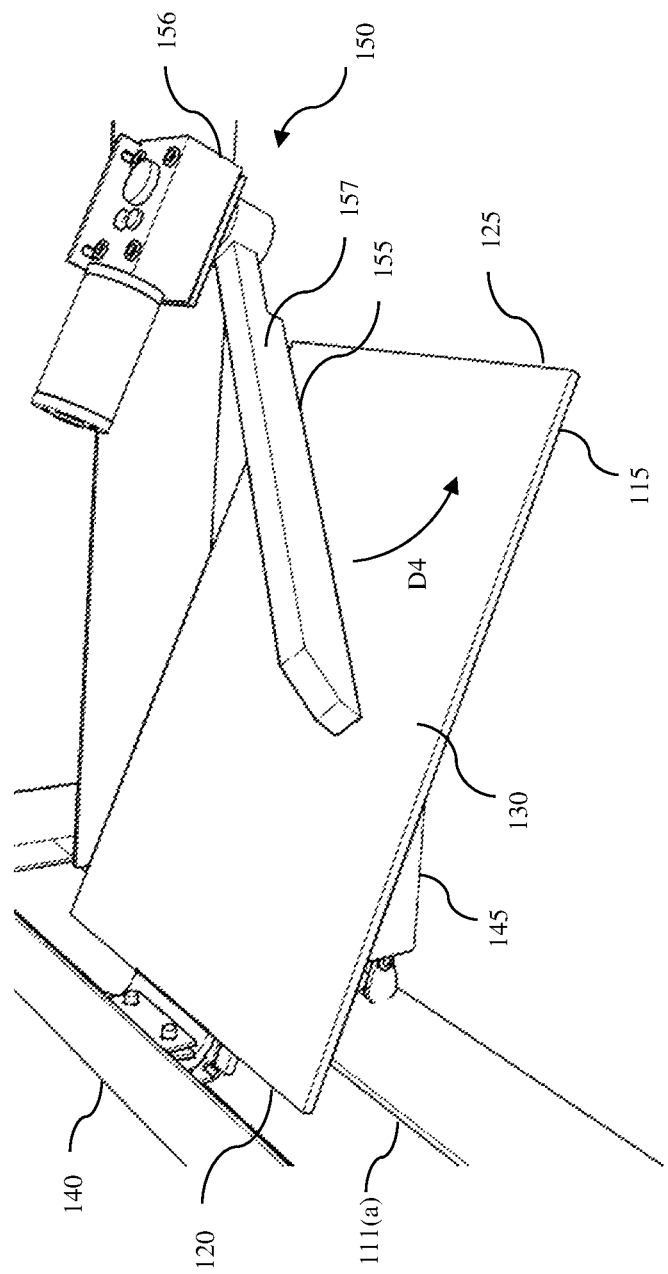
FIG. 10 is a perspective view of a spatula assembly and a movable wiper assembly, wherein the movable wiper assembly is in a second position, according to an example embodiment of the present invention.
Figure 11:
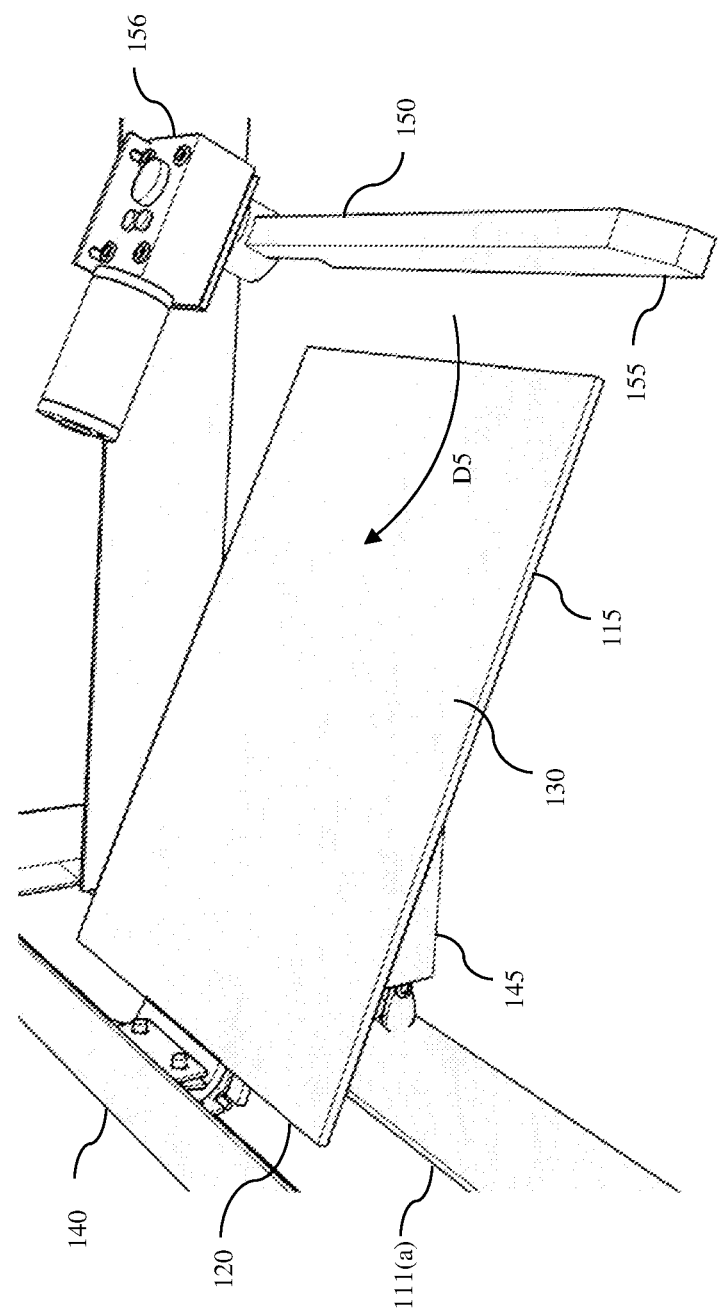
FIG. 11 is a perspective view of a spatula assembly and a movable wiper assembly, wherein the movable wiper assembly is in a third position, according to an example embodiment of the present invention.
Figure 15:
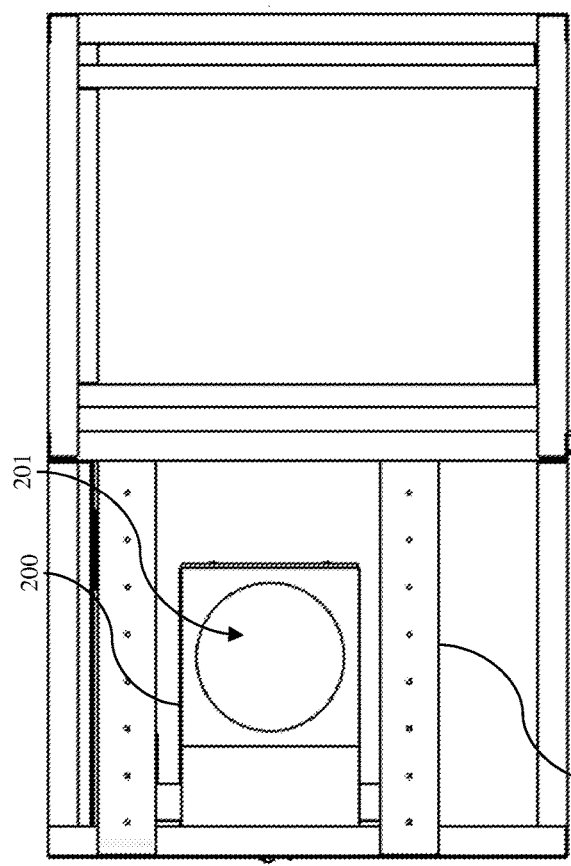
FIG. 15 is a top view of an oven assembly, according to an example embodiment of the present invention.
Figure 16:
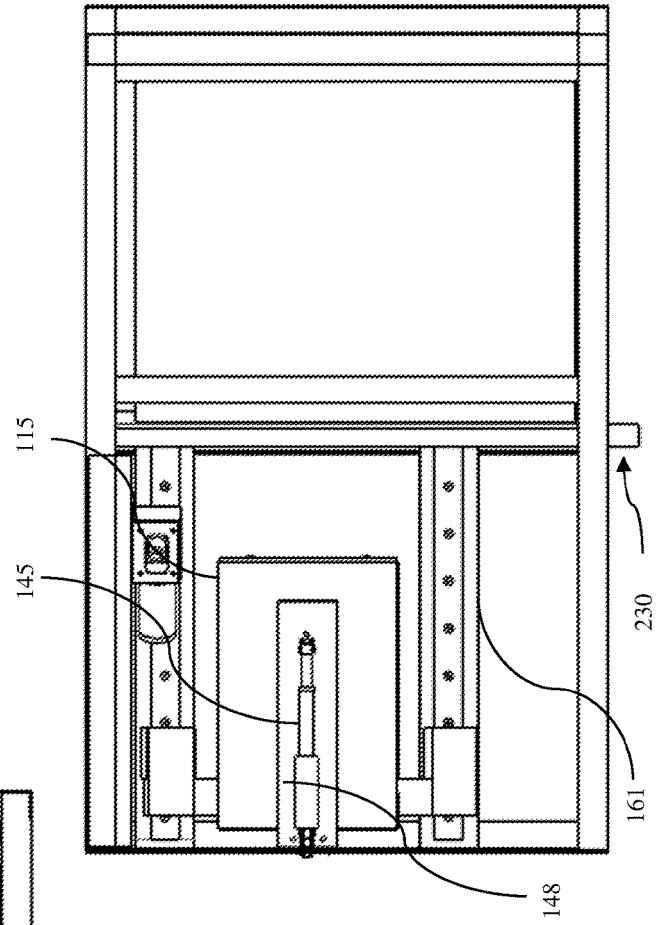
FIG. 16 is a bottom view of an oven assembly, according to an example embodiment of the present invention.

FIGS. 9-11 show a moveable wiper assembly 150 according to an example embodiment of the present invention. The moveable wiper assembly 150 is attached to a wiper shaft 157 and comprises an elongated body positioned proximate to the plate 115. The moveable wiper assembly 150 may be fastened to the wiper shaft 157 using nuts and bolts, rivets, or any other suitable fasteners. The elongated body includes a movable wiper cleaning surface 155 located along a downward facing side of the elongated body. The movable wiper assembly 150 is configured to move the movable wiper cleaning surface 155 located along the downward facing side of the elongated body across the plate cooking surface 130 when the plate 115 is in the plate lower position. The elongated body may have an elongated body first end that is pivotally attached to a pivoting element such that the elongated body rotates (e.g., traverses and non-linearly) across the plate cooking surface when the plate is in the plate lower position. The movable wiper assembly is conductively and communicatively coupled to the at least one controller, the at least one power source, and an electric motor (see FIG. 55). The electric motor is connected to the wiper shaft 157 so as to cause rotation of the wiper shaft in a first direction and a second direction.

In operation, as shown in FIG. 9, the moveable wiper assembly 150 is brought into contact with the plate 115 such that the movable wiper cleaning surface 155 is pressed against the plate cooking surface 130. As the movable wiper cleaning surface 155 oscillates from the first direction (in the direction of arrowed line D4) to the second direction (in the direction of arrowed line D5) as shown in FIGS. 10 and 11, respectively, the movable wiper cleaning surface 155 removes debris (e.g., food particles, grease, cleaning solution) from the plate cooking surface 130. In the present embodiment, the moveable wiper assembly 150 has an elongated rectangular shaped body and a substantially planar wiper cleaning surface. It should be appreciated that the moveable wiper assembly 150 may have other shapes, dimensions, and wiper cleaning surfaces and such variations are within the spirit and scope of the claimed invention. For example, the moveable wiper assembly 150 may have an elongated cylindrical shaped body and a partially or entirely curved wiper cleaning surface.

FIGS. 12-16 show at least one oven assembly 160 (e.g., a fixed oven assembly) according to an example embodiment of the present invention. The at least one oven assembly 160 includes an open first end 165 for providing access to a cooking area 170. The cooking area 170 includes a cooking area downward facing surface 175 and a cooking area upward facing surface 180. The cooking area downward facing surface 175 and the cooking area upward facing surface 180 include dual coils such that food items may be inductively heated from both the cooking area downward facing surface 175 and the cooking area upward facing surface 180. The cooking area 170 is positioned between an oven fixed upper part having a cooking area downward facing surface 175 and an oven fixed lower part having a cooking area upward facing surface 180, where a fixed oven upper part and a fixed oven lower part are fixed relative to each other. The at least one oven assembly 160 is conductively and communicatively coupled to the at least one controller and the at least one power source. The at least one controller is configured to send a plurality of signals to cause the spatula assembly 110 to move between the spatula assembly cooking position and the spatula assembly non-cooking position.

Figure 17:
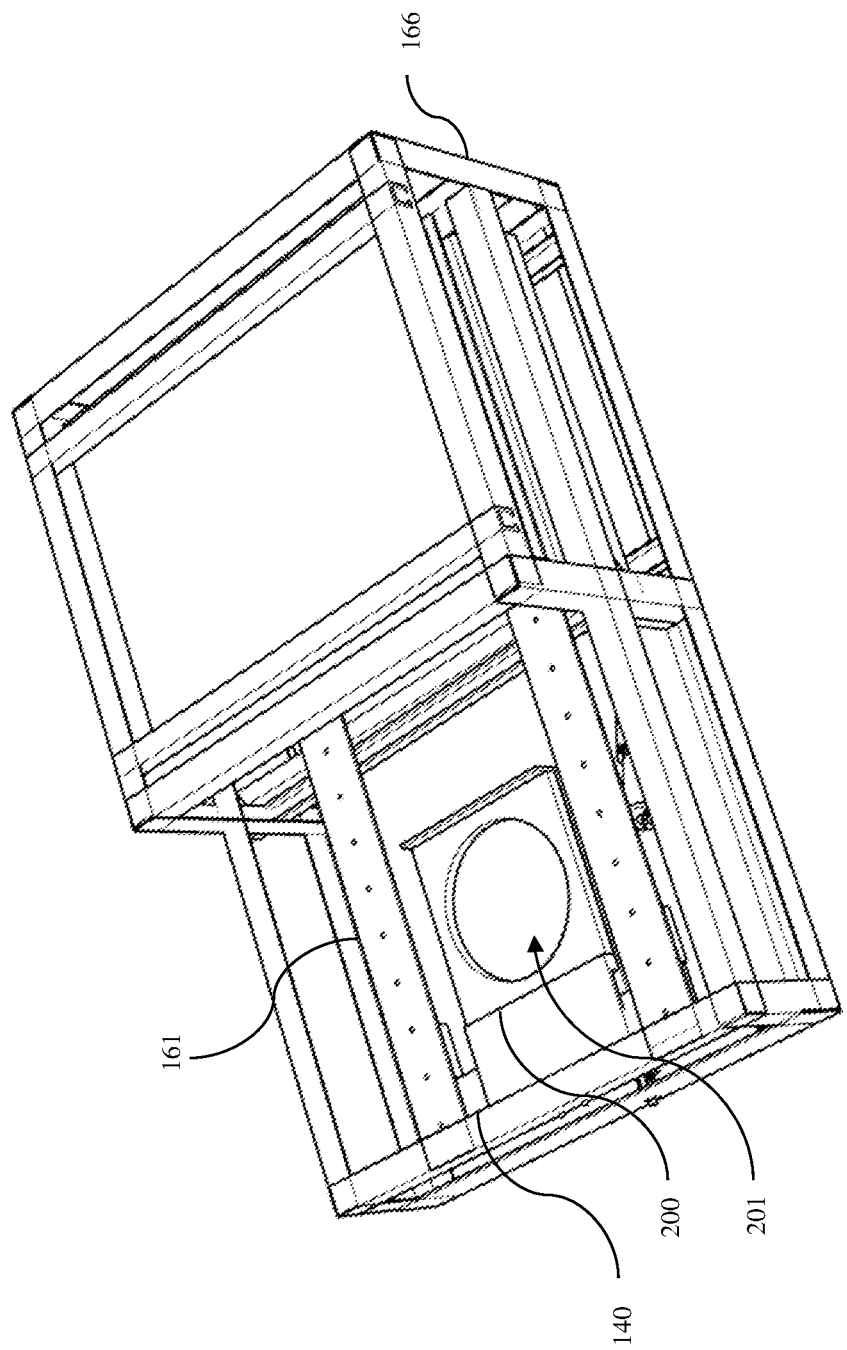
FIG. 17 is a top perspective front view of an oven assembly and a retaining member, according to an example embodiment of the present invention.
Figure 18:
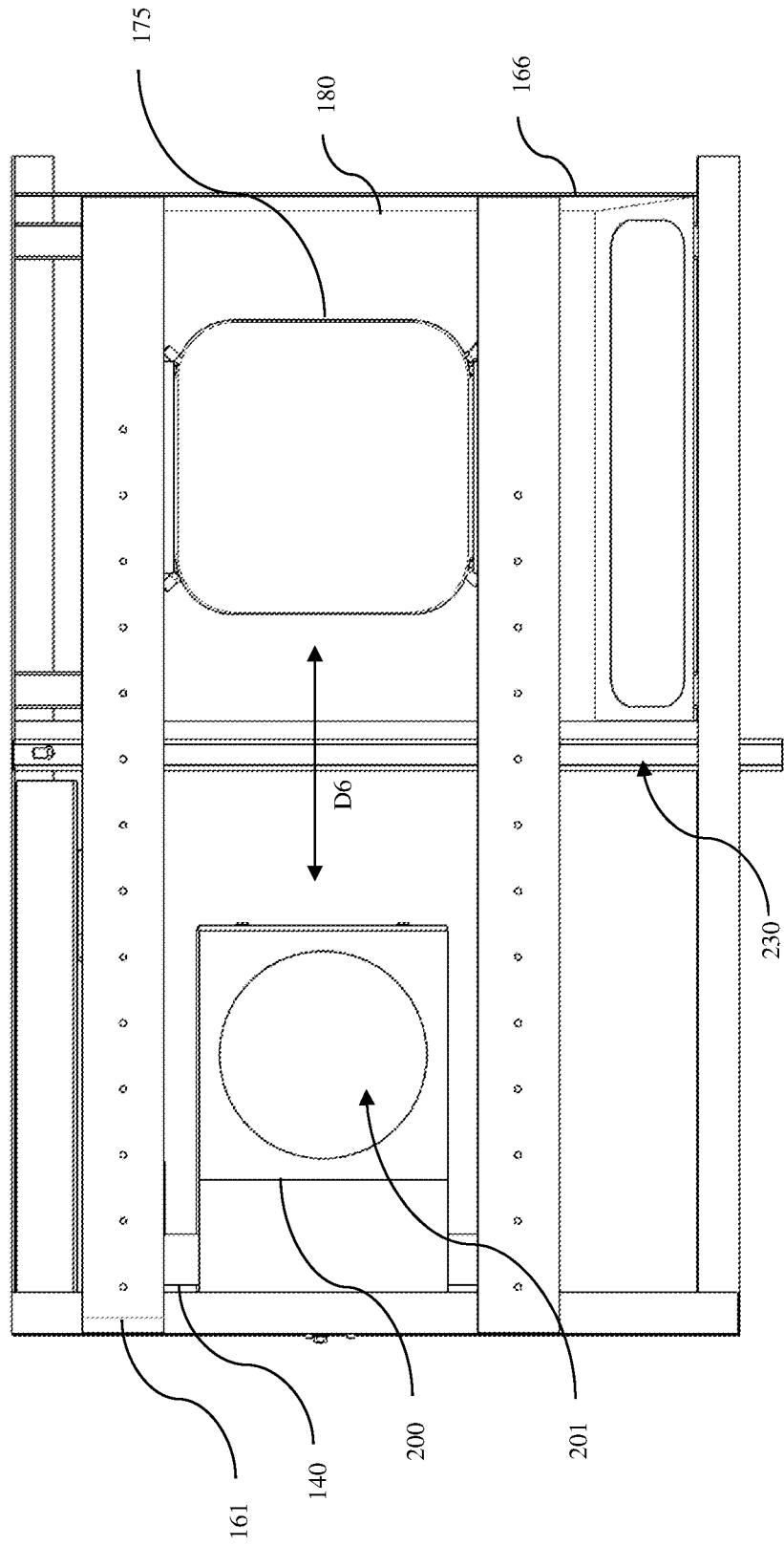
FIG. 18 is a cross-sectional top view of an oven assembly, according to an example embodiment of the present invention.
Figure 19:
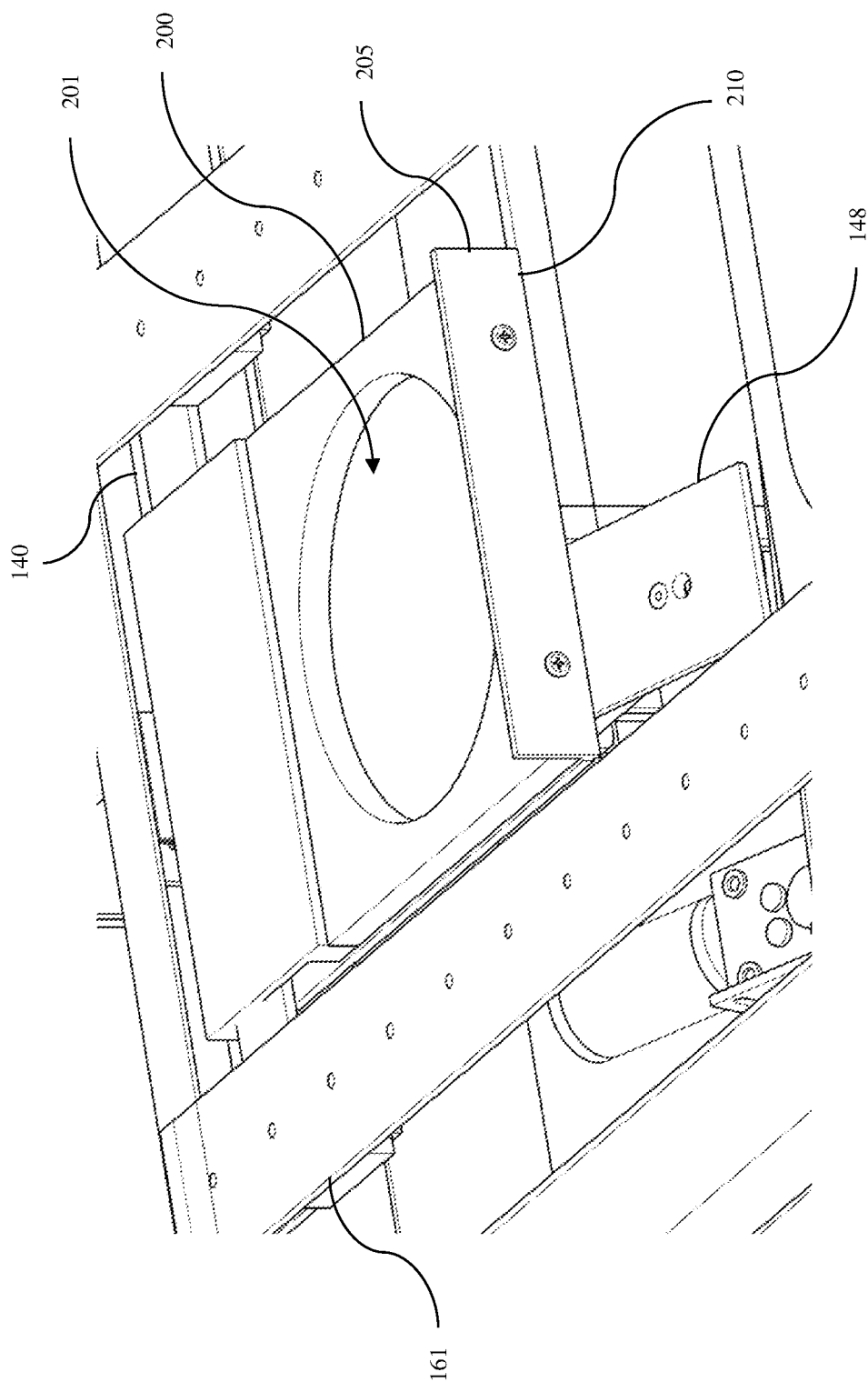
FIG. 19 is a top perspective side view of a spatula assembly, wherein the spatula assembly is in a spatula assembly non-cooking position; according to an example embodiment of the present invention.
Figure 20:
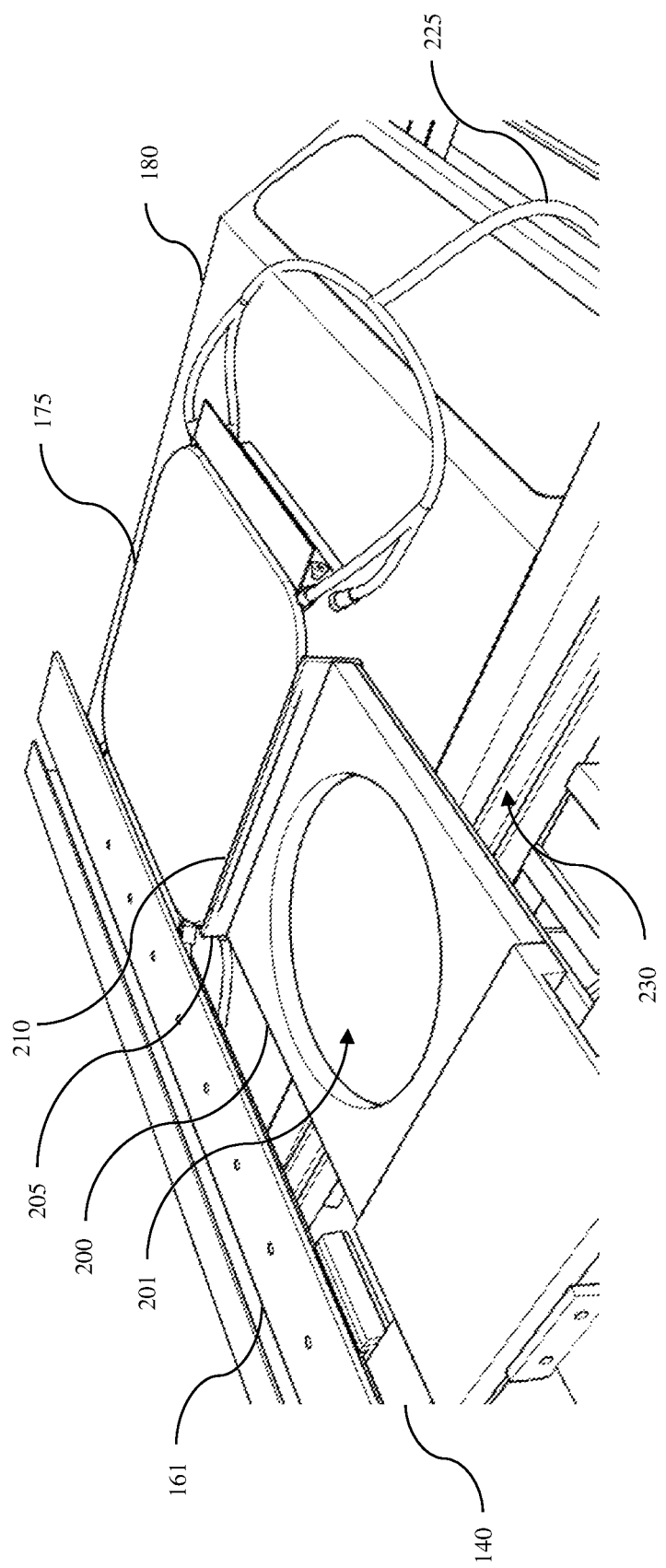
FIG. 20 is cross-sectional top view of an oven assembly, wherein a spatula assembly is in between a spatula assembly cooking position and a spatula assembly non- cooking position, according to an example embodiment of the present invention.
Figure 21:
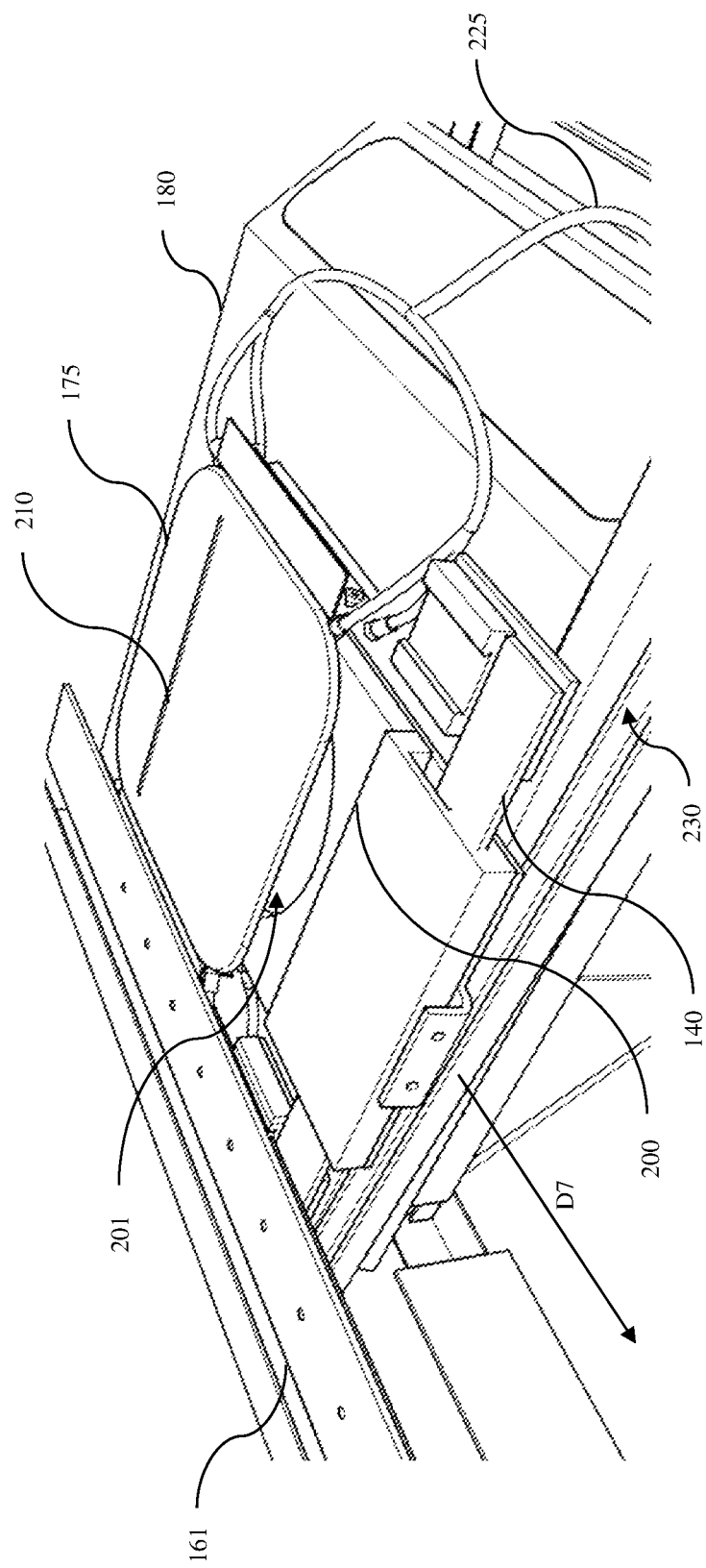
FIG. 21 is a cross-sectional top view of an oven assembly, wherein a spatula assembly is in a spatula assembly cooking position, according to an example embodiment of the present invention.

As best illustrated in FIGS. 17 and 18, the at least one oven assembly 160 includes a track 161 to allow the spatula assembly 110 to move between the spatula assembly cooking position and the spatula assembly non-cooking position (in the direction of doubled arrowed line D6). In the spatula assembly non-cooking position, as shown in FIGS. 19 and 20, substantially all of the plate 115 is positioned outside of the cooking area 170. In the spatula assembly cooking position, as shown in FIG. 21, substantially all of the plate 115 is positioned inside the cooking area of the oven assembly. As used herein, "substantially all" is meant to define at least about 95% of the plate 115, and most preferably at least about 99% of the plate 115. It should be appreciated that the at least one oven assembly 160 may be adapted for roasting, baking, frying, steaming, or heating applications, and such variations are within the spirit and scope of the claimed invention.

FIG. 19 further shows a fixed wiper 205 in attachment with the spatula assembly cross member 140 according to an example embodiment of the present invention. The fixed wiper 205 is attached to an end of the retaining member 200 and is defined by an elongated bar. The fixed wiper 205 may be fastened to the end of the retaining member 200 using nuts and bolts, rivets, or any other suitable fasteners. The fixed wiper 205 includes at least one fixed wiper cleaning surface 210 located along an upward facing side of the elongated bar and a downward facing side of the elongated body. The fixed wiper 205 is configured to engage at least one of the cooking area upward facing surface 180 and the cooking area downward facing surface 175 such that the fixed wiper 205 cleans at least one of the cooking area upward facing surface 180 and cooking area downward facing surface 175 when the spatula assembly 110 moves between the spatula assembly cooking position and the spatula assembly non-cooking position. The at least one oven assembly 160 includes a waste channel 230 located below the cooking area upward facing surface 180. The waste channel 230 is configured to collect the debris (e.g., food particles, grease, cleaning solution) that the fixed wiper 205 removes from the cooking area upward facing surface 180 and cooking area downward facing surface 175.

In operation, as illustrated in FIG. 21, when the spatula assembly 110 is in the spatula assembly cooking position, the at least one fixed wiper cleaning surface 210 located along the upward facing side and downward facing side of the elongated bar is pressed against the cooking area upward facing surface 180 and cooking area downward facing surface 175. The at least one fixed wiper cleaning surface may engage at least one of the cooking area upward facing surface and the cooking area downward facing surface such that the fixed wiper cleans at least one of the cooking area upward facing surface and the cooking area downward facing surface when the fixed wiper linearly translates between (a) outside the open first end of the at least one fixed oven assembly and (b) between the cooking area downward facing surface and the cooking area upward facing surface of the fixed oven assembly. The fixed wiper may linearly translate outside the open first end but not between the cooking area downward facing surface and the cooking area upward facing surface. As the fixed wiper 205 moves from the spatula assembly cooking position to the spatula assembly non-cooking position (in the direction of arrowed line D7), the at least one fixed wiper cleaning surface 210 removes and cleans debris from the cooking area upward facing surface 180 and cooking area downward facing surface 175. In the present embodiment, the fixed wiper 205 has an elongated rectangular shaped body and a substantially wiper cleaning surface 210. It should be appreciated that the fixed wiper 205 may have other shapes, dimensions, and wiper cleaning surfaces 210 and such variations are within the spirit and scope of the claimed invention. For example, the wiper cleaning surface 210 may be jagged, curved, or angled, and such variations are within the spirit and scope of the claimed invention.

Figure 22:
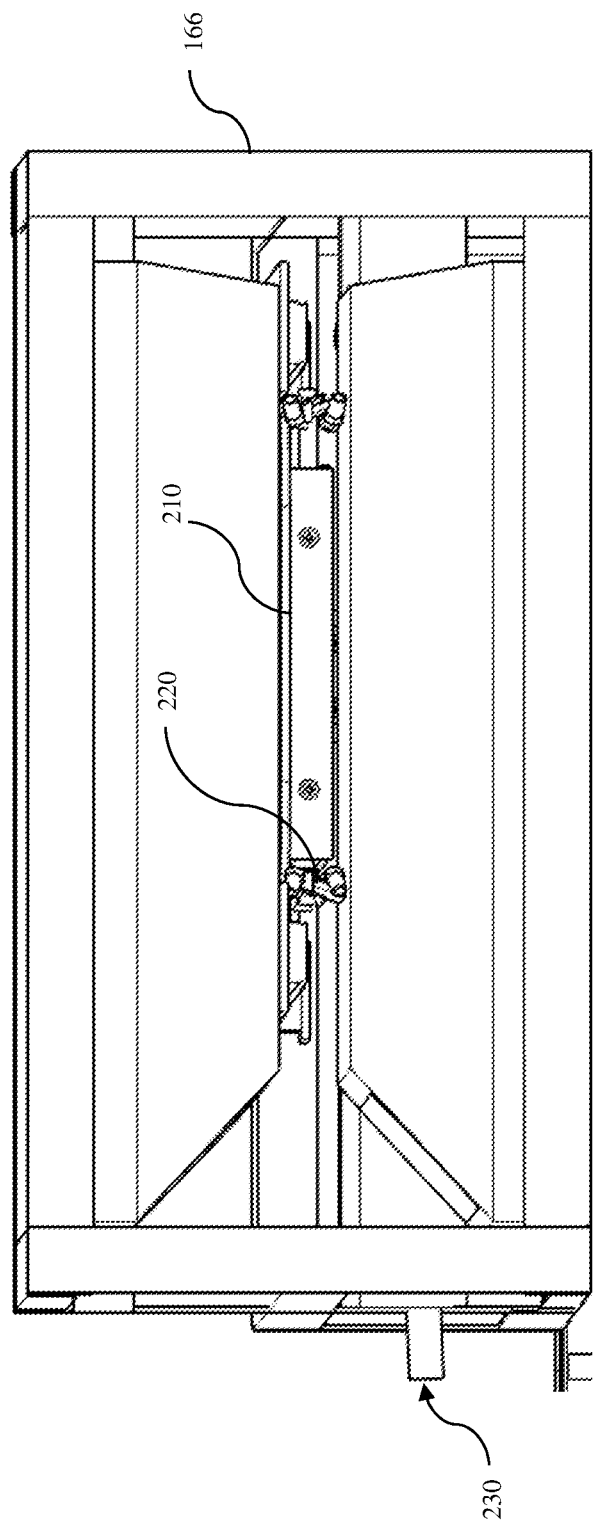
FIG. 22 is a left side view of an oven assembly, wherein a spatula assembly is in a spatula assembly cooking position, according to an example embodiment of the present invention.
Figure 23:
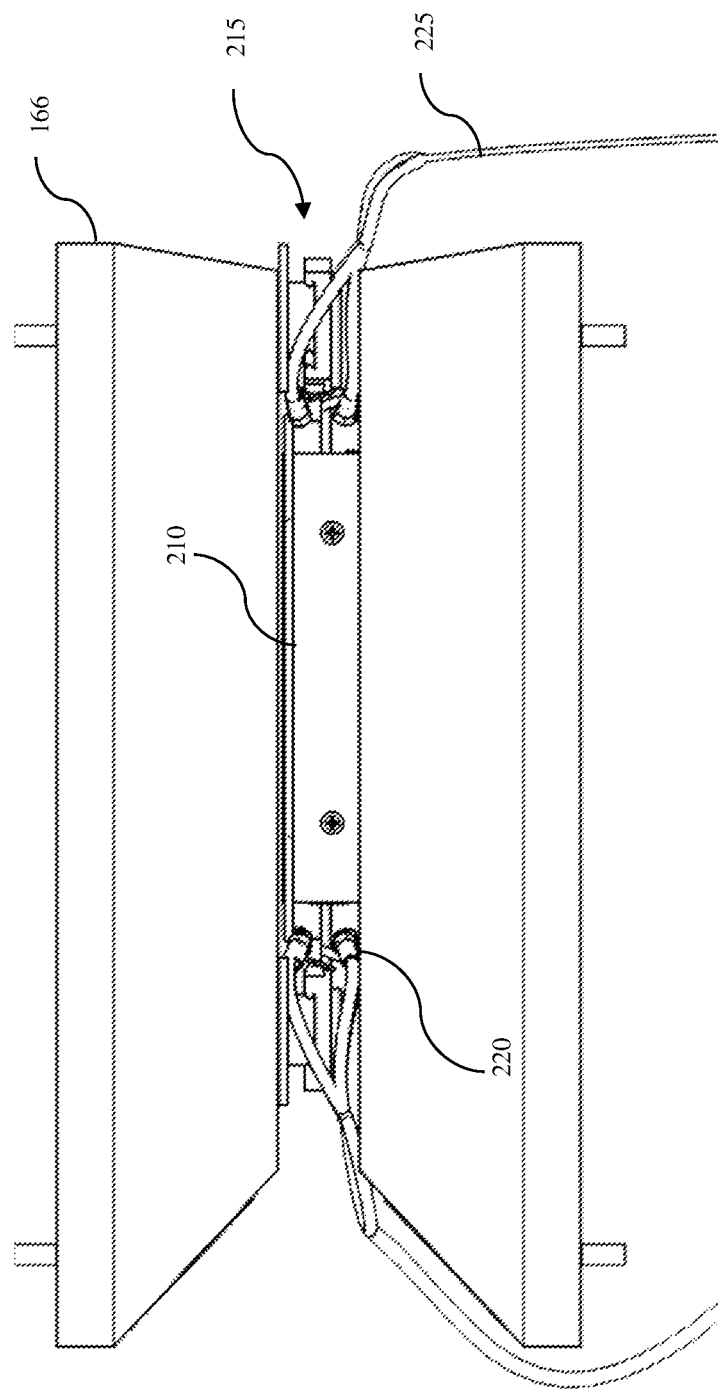
FIG. 23 is a left side view of an oven assembly and a spray assembly, wherein a spatula assembly is in a spatula assembly cooking position, according to an example embodiment of the present invention.

FIGS. 22 and 23 show at least one spray assembly 215 attached to an oven assembly second end 166 according to an example embodiment of the present invention. The at least one spray assembly 215 includes at least one nozzle 220 that is configured to spray cleaning solution onto at least one of the: cooking area upward facing surface 180, cooking area downward facing surface 175, and plate 115. In one embodiment, a pump (not shown) is fluidly connected to a cleaning solution container (not shown) and to a flexible tube 225. The flexible tube 225 fluidly connects the cleaning solution container to the at least one nozzle 220. In operation, when the spatula assembly is in the spatula non-cooking position as best shown in FIG. 17, the pump moves the cleaning solution stored in the cleaning solution container through the at least one flexible tube 225 and to the at least one nozzle 220 such that the cooking area upward facing surface 180, cooking area downward facing surface 175, and plate 115 are sprayed with cleaning solution.

The apparatus 100 includes at least one controller (illustrated in FIG. 55) is configured for controlling the electrical and mechanical components of the apparatus. As shown in the schematic diagram 600 of FIG. 55, the at least one controller 610 is conductively and communicatively coupled, via a communication bus, to allow communication and conductive coupling to the at least one power source 620, the mechanical components of the apparatus (e.g., spatula assembly, oven, telescoping arm assembly, moveable wiper assembly, etc.), and a plurality of sensors located throughout the apparatus. For instance, as illustrated in the diagram 600, the apparatus 100 includes a plurality of sensors, including a camera 632, a temperature sensor 634, and a time sensor 634. The camera 632 may be used to visually supervise the food preparation process. For instance, the camera may be used as a means of quality control. Artificial intelligence may be used to determine if the prepared food has been prepared in a way that is aesthetically pleasing. If the food is not aesthetically pleasing or fails to meet other visual standards, the apparatus may reject the prepared food and dispose of it. In this way, a strict adherence to quality control may be realized. Furthermore, the apparatus 100 may include a temperature sensor 636. The temperature sensor may be an infrared ("IR") temperature sensor, or any other suitable temperature sensor known in the art. The temperature sensor 636 may be used to determine if a food product has been cooked to the desired, or required (e.g., per health and safety laws) temperature. The time sensor 634 may be a simple digital clock. Based on time-temperature data, the time sensor 634 may be used to determine if a food product has been fully cooked. Moreover, the temperature sensor may be used to determine the temperature of the heated components. Motor 640 (discussed above) is also illustrated. These components of the apparatus 100 may be conductively coupled with the power source 620 via conduit, such as copper (or other suitable material) wire. Similarly, the components may be communicatively coupled (e.g., via the aforementioned communication bus), and conduit such as copper wire may also be used. The least one controller is further configured to receive and monitor sensor data from the plurality of sensors. The plurality of sensors may include additional temperature sensors, positional sensors, optical sensors, tilt sensors, infrared sensors, or the like to determine the status of, or monitor the status of, various aspects of the apparatus. For example, the apparatus may include a sensor to measure the temperature in the oven assembly cooking area, a sensor to detect the stock level of a food item component or food receptacle 261, a sensor to detect the amount of cleaning solution in the cleaning solution container, and a sensor to detect the fill level of the disposal area.

Controller 610 may be configured for controlling the aforementioned electrical and mechanical components (e.g., via the electrical components, such as a motor or actuator). For instance, the controller may be programmed (e.g., via executable code) to perform the operations described above to prepare a cooked food product. For instance, the motor of the telescoping arm assembly may have communicate a position of the telescoping arm to the controller 610. The telescoping arm may communicate an angle of the plate cooking surface 130 to the controller. The angle that is communicated may be discrete (e.g., an open/closed algorithm) or continuous. Controller 610 may be configured for receiving data from the aforementioned sensors, and using a computer algorithm to determine the next steps for the apparatus to take. For instance, a time sensor may be used to determine if a food product has been fully cooked and is ready for subsequent assembly.

Figure 30:
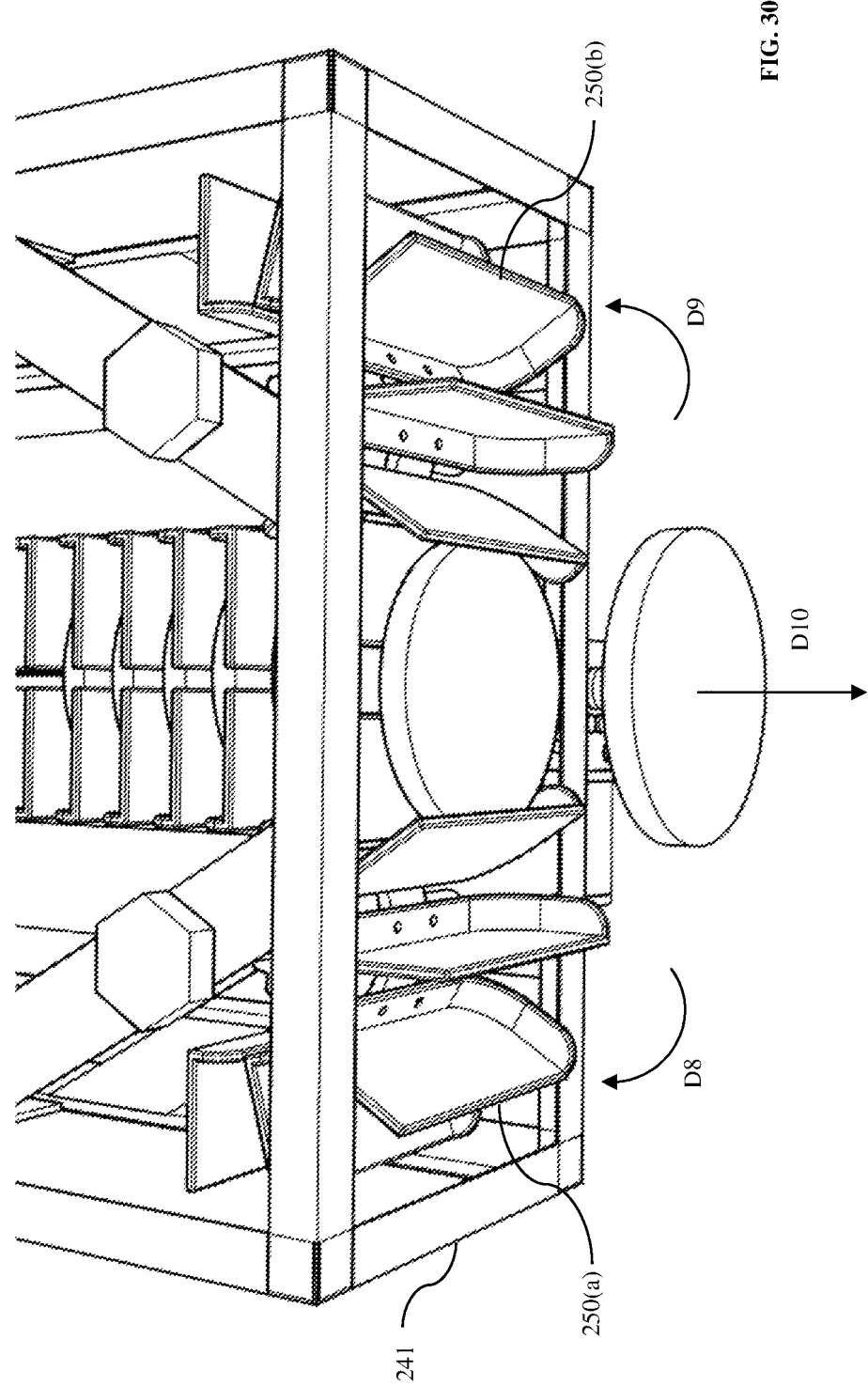
FIG. 30 is a bottom perspective left side view of a vertically stacked movable platform, according to an example embodiment of the present invention.

FIGS. 24-30 show at least one assembling area 235 and a conveyor system 240 according to an example embodiment of the present invention. The conveyor system 240 is located above each assembling area 235 for storing and delivering a food item component to at least one assembling area 235. The conveyor system is secured to the frame element 105 with bolts, however, other attachment devices may be used, including screws, bolts, welds, pins, clamps, or any other suitable method known in the art. The conveyor system 240 includes a plurality of vertically stacked movable platforms 245. The conveyor system 240 also includes a first column of movable doors 249(*a*) and an opposing second column of movable doors 249(*b*). Each door has a free end not attached to the conveyor system 240 and a non-free end attached to the conveyor system. As best illustrated in FIG. 30, each movable platform is formed by a pair of movable doors 250(*a*), 250(*b*) being horizontally aligned. The movable platform may be configured to have at least one of said doors move open. In operation, the pair of movable doors 250(*a*), 250(*b*) move in the direction of arrowed lines D8 and D9, respectively, at a conveyer system bottom end portion 241 such that the food item component moves into the assembling area 235 (in the direction of arrowed line D10) below the conveyer system 240. Additionally, the first of said pair of horizontally aligned doors being from the first column of movable doors and the second of said pair of horizontally aligned doors being from the second column of movable doors. The free ends of each of said pair of movable doors may be proximate each other and the non-free ends may be distal from each other. The free ends of the movable doors may rotate down and outward away from each other at a bottom end of portion of a conveyer system such that the food item component moves into the assembling area below the conveyer system.

In the present embodiment, the vertically stacked movable platforms include a bottom portion of a hamburger bun 257, a top portion of a hamburger bun, and a ground beef patty 259. It should be appreciated that the conveyor system may include additional vertically stacked movable platforms of various shapes and dimensions for storing and delivering additional food item components. The conveyor system 240 may also include a plurality of containers (not shown) above each assembling area 235 for storing and delivering toppings and condiments, such as cheese, lettuce, tomatoes, onions, ketchup, mustard, and mayonnaise, to one of the assembling areas 235, and such variations are within the spirit and scope of the claimed invention.

In one embodiment, the apparatus includes a thermal control system (not shown) for maintaining the food item components, toppings, and condiments at hot, cold, and ambient or room temperature. The thermal control system may comprise a cooling apparatus, a heating apparatus, an ambient temperature apparatus, ducting or piping, valves, and insulated walls such that each vertically stacked movable platform and container may have a different temperature setting.

Figure 31:
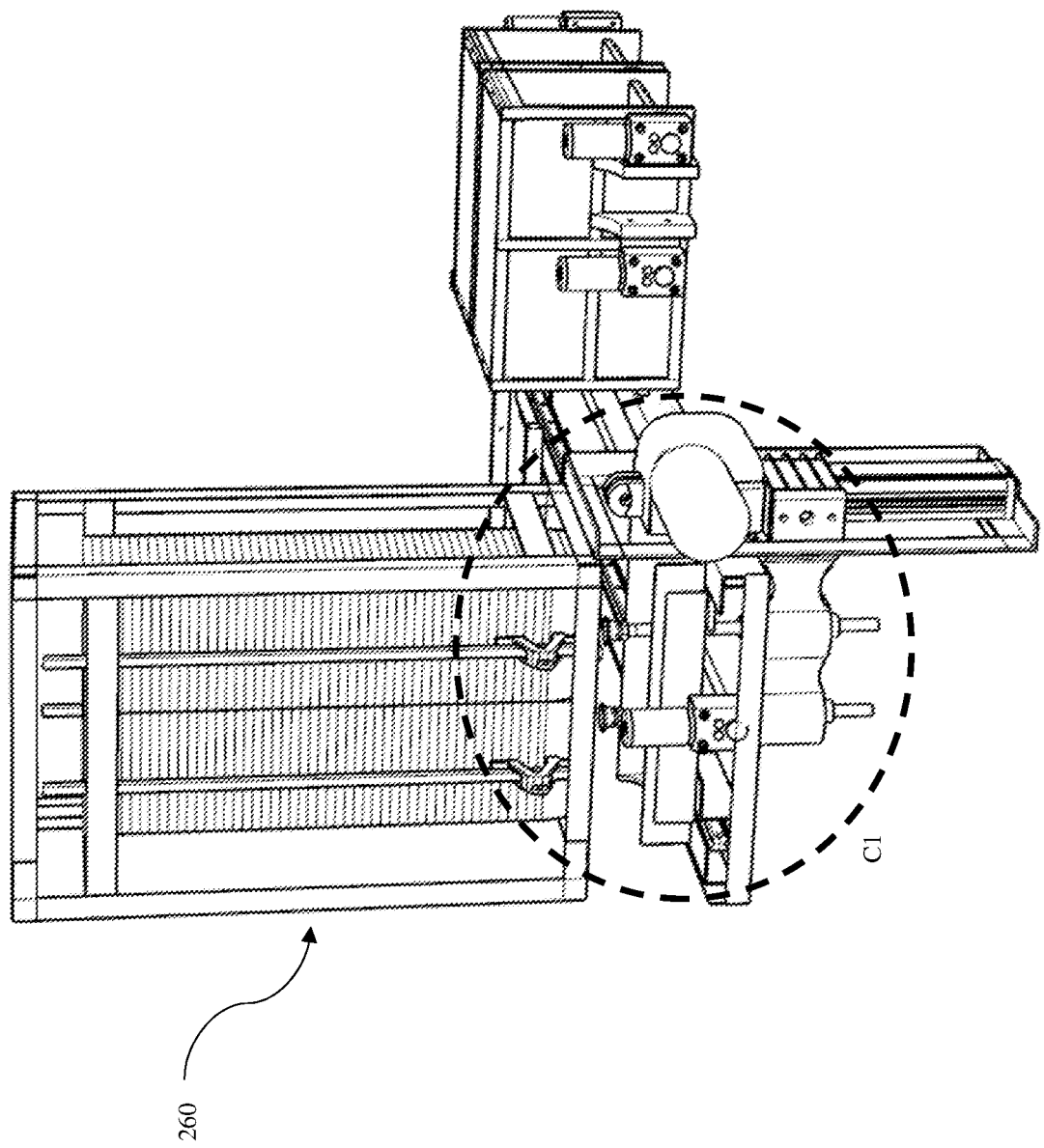
FIG. 31 is a perspective right side view of a vertical compartment and a vacuum system, according to an example embodiment of the present invention.
Figure 32:
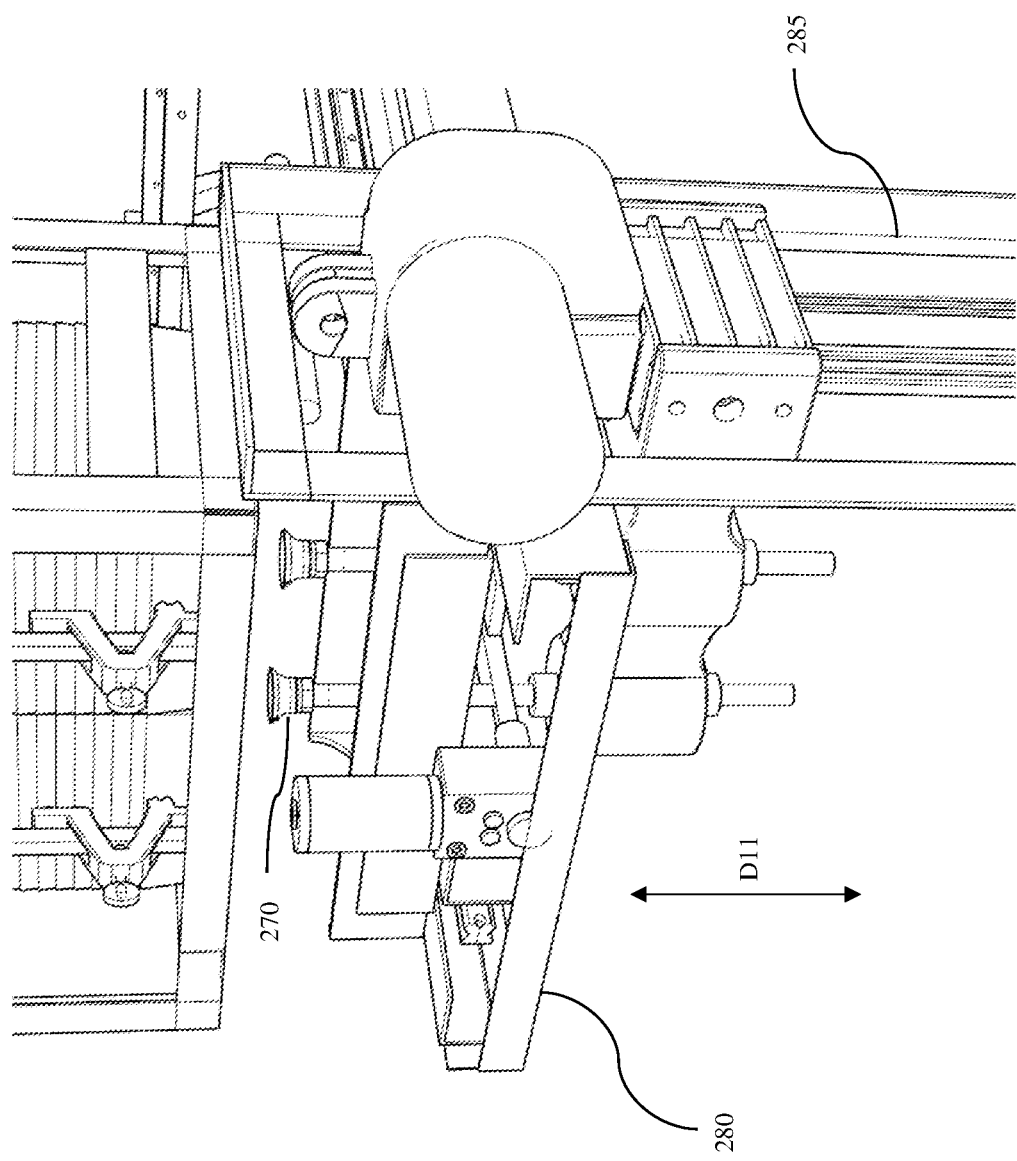
FIG. 32 is a magnified perspective view of a portion of the area enclosed within circle C1 of FIG. 31, according to an example embodiment of the present invention.

FIGS. 31 and 32 show a vertical compartment 260 for storing and delivering a food receptacle 261 to one of the assembling areas 235 according to an example embodiment of the present invention. The food receptacle 261 is configured to store a fully assembled cooked food item. The food receptacle 261 is positioned in a top-down orientation, leaving a bottom surface of the food receptacle 261 accessible to a vacuum system located below the assembling area 235. The vacuum system includes at least one vacuum suction head 270, at least one vacuum hose (not shown), and a pump (not shown). The at least one vacuum suction head 270 is affixed to a horizontal support arm 280 having a gear wheel (not shown) attached on a vertical track 285. A motor (not shown) coupled to the gear wheel rotates the gear wheel to effectuate movement (in the direction of double arrowed line D11) of the at least one vacuum suction head 270.

In operation, the gear wheel is rotated in a first direction to raise the horizontal support arm 280 such that the at least one vacuum suction head 270 is aligned with the bottom surface of the food receptacle 261. When the at least one vacuum suction head 270 reaches a position of close proximity to the food receptacle 261, the at least one vacuum suction head 270 adheres to the bottom surface of the food receptacle 261. Upon the food receptacle 261 adhering to the at least one vacuum suction head 270, the gear wheel is rotated in a second direction such that the food receptacle 261 is removed from its nested position in the vertical compartment 260 and lowered to the assembling area 235.

In one embodiment, the food receptacle 261 is a clamshell box that is sized and shaped to store a fully assembled hamburger. The clamshell box is preferably comprised from an integral piece of recyclable, non-toxic and food safe paper-based material such as corrugated cardboard or may be similarly comprised of biodegradable or compostable materials such as sugarcane, bamboo, and plant-based materials. It should be appreciated that the food receptacle 261 may comprise various shapes, dimensions, and configurations to accommodate other fully assembled cooked food items. For example, plates, bowls, or food-based receptacles such as tortillas, or any other type of food receptacles may be used in place of a clamshell box, and such variations are within the spirit and scope of the claimed invention.

Figure 33:
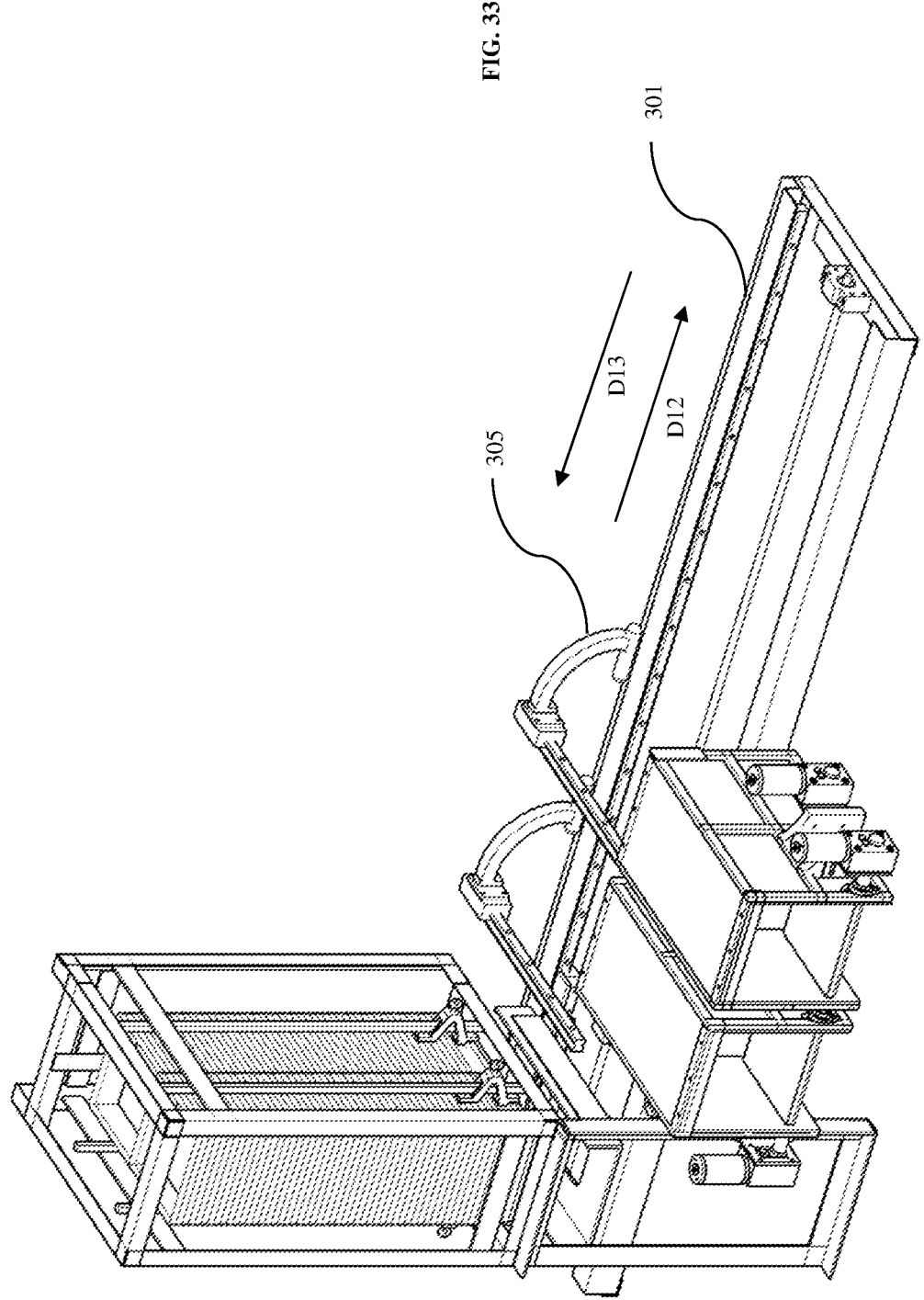
FIG. 33 is a top perspective front view of a movable carrier and at least one movable arm mounted on a track, according to an example embodiment of the present invention.
Figure 34:
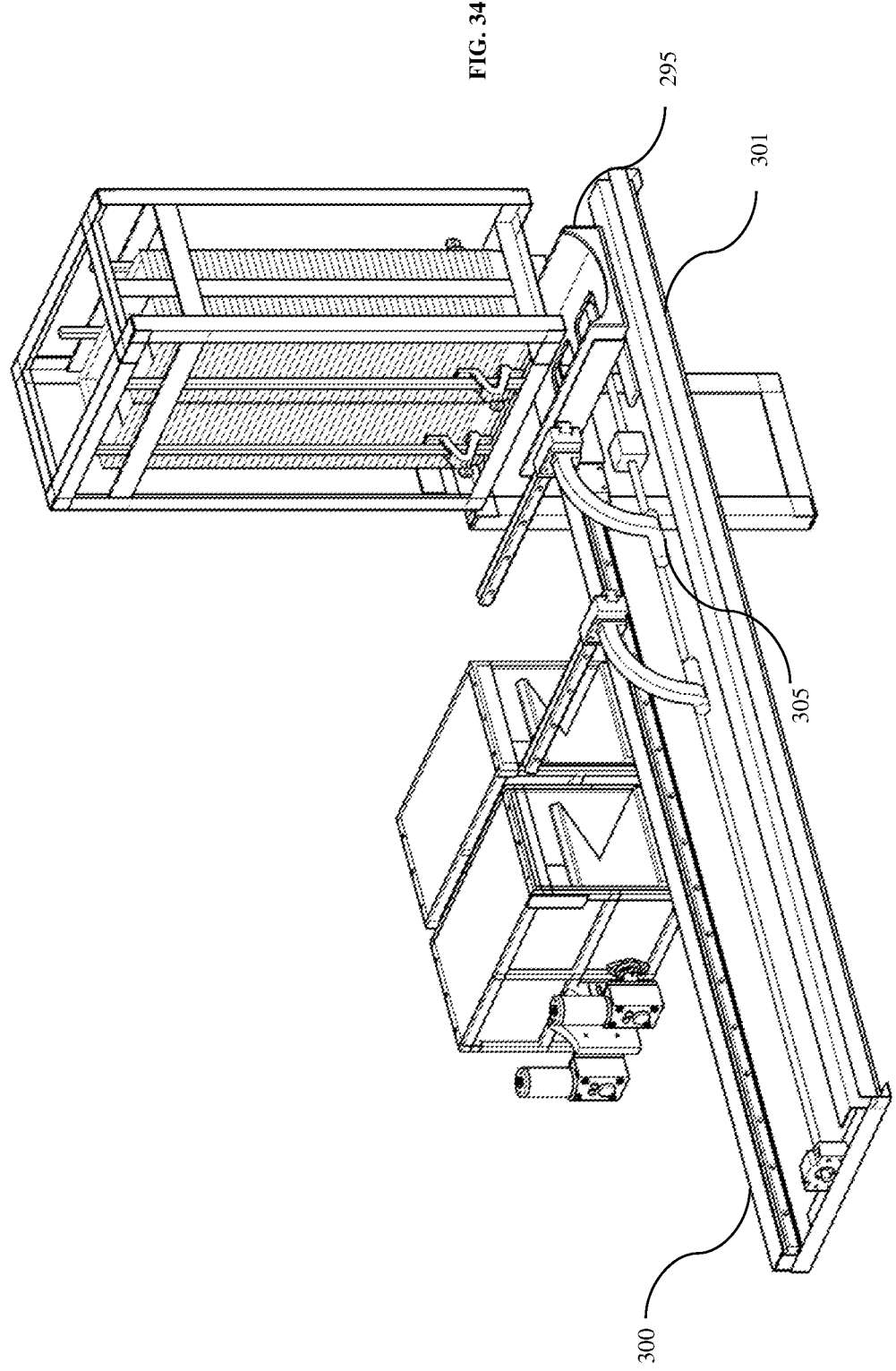
FIG. 34 is a top perspective rear view of a movable carrier and at least one movable arm mounted on a track, according to an example embodiment of the present invention.
Figure 44:
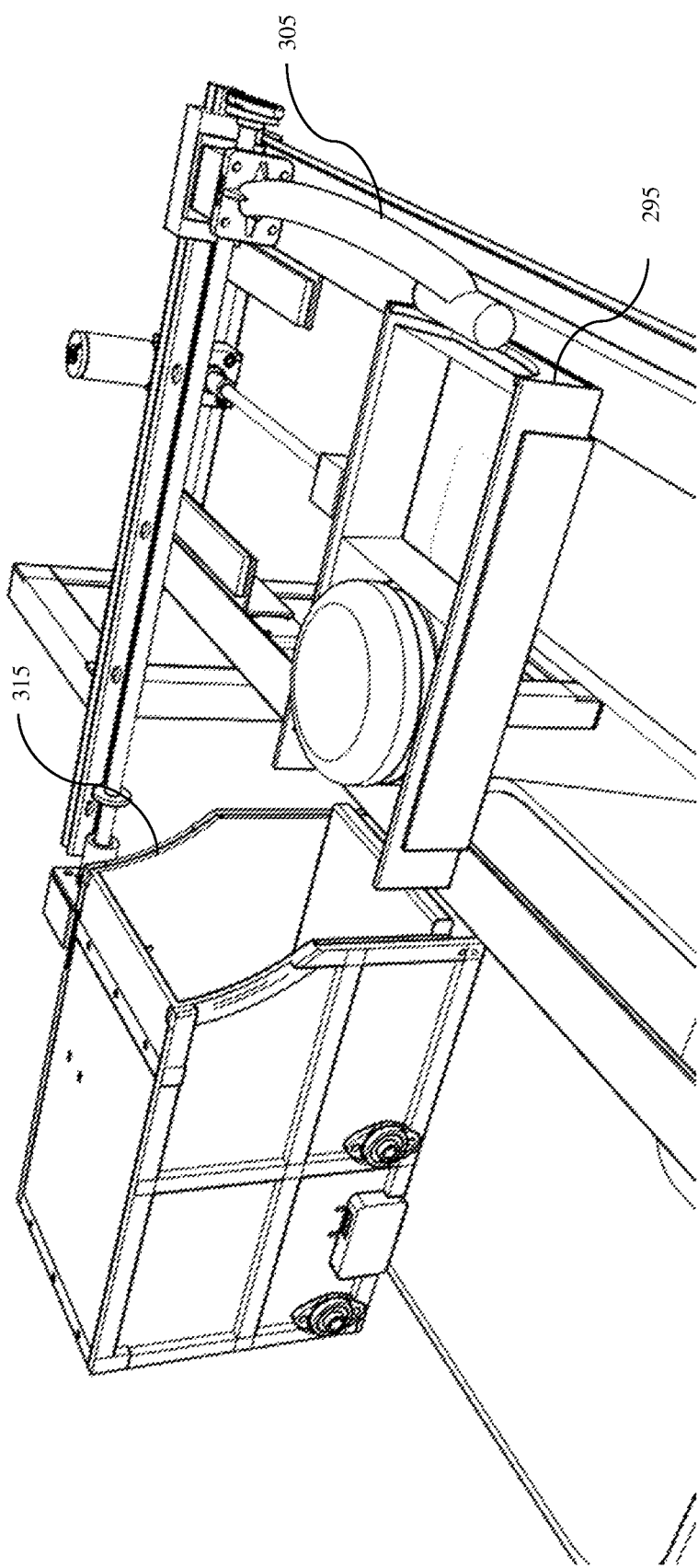
FIG. 44 is a perspective side view of a food receptacle containing a fully assembled cooked food item proximate to a pickup area first element, wherein a movable arm is positioned rearward of a track, according to an example embodiment of the present invention.
Figure 45:
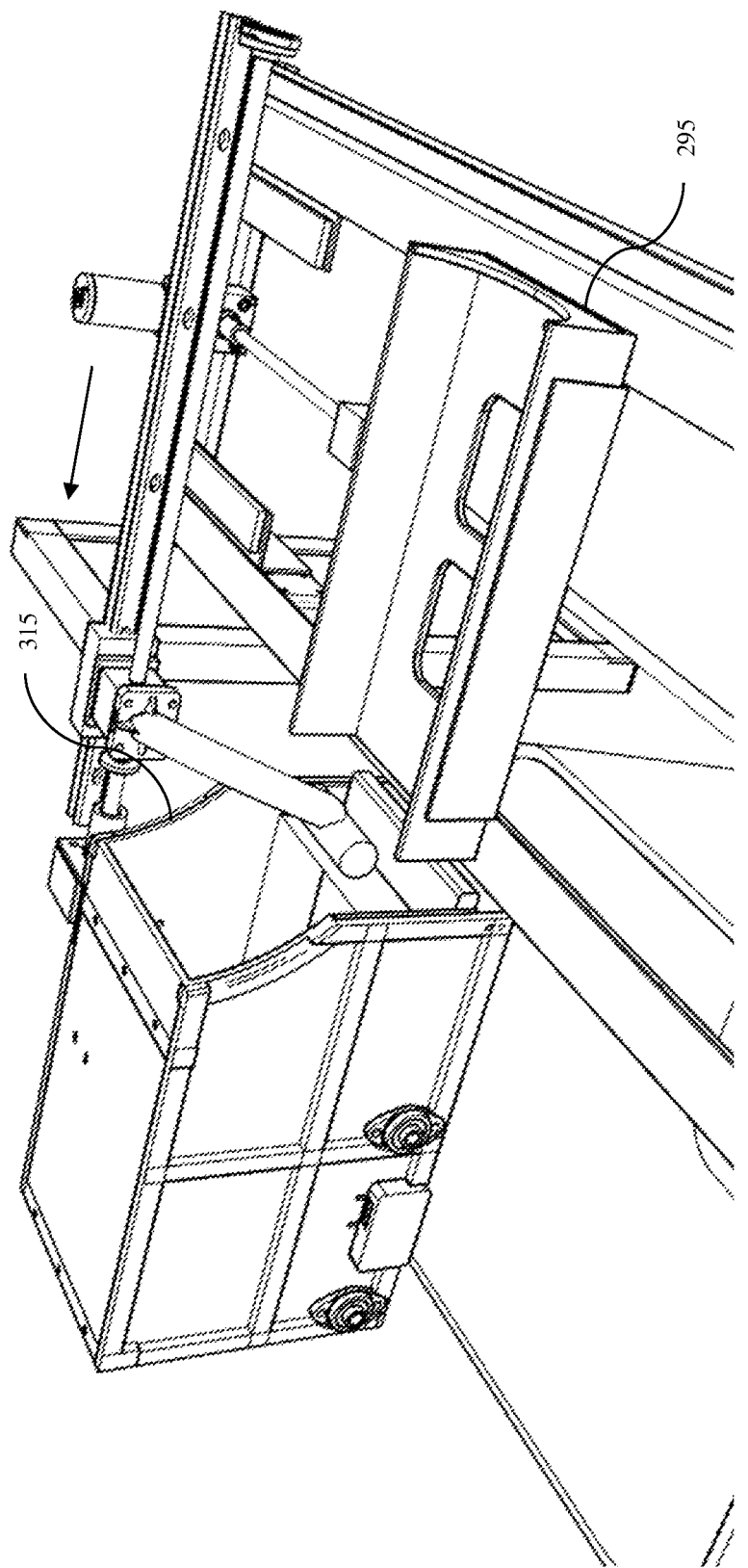
FIG. 45 is a perspective side view of a movable arm moving a food receptacle containing a fully assembled cooked food item into a pickup area first element, wherein the moveable arm is positioned proximate to the pickup area first element, according to an example embodiment of the present invention.
Figures 46, 47, 48:
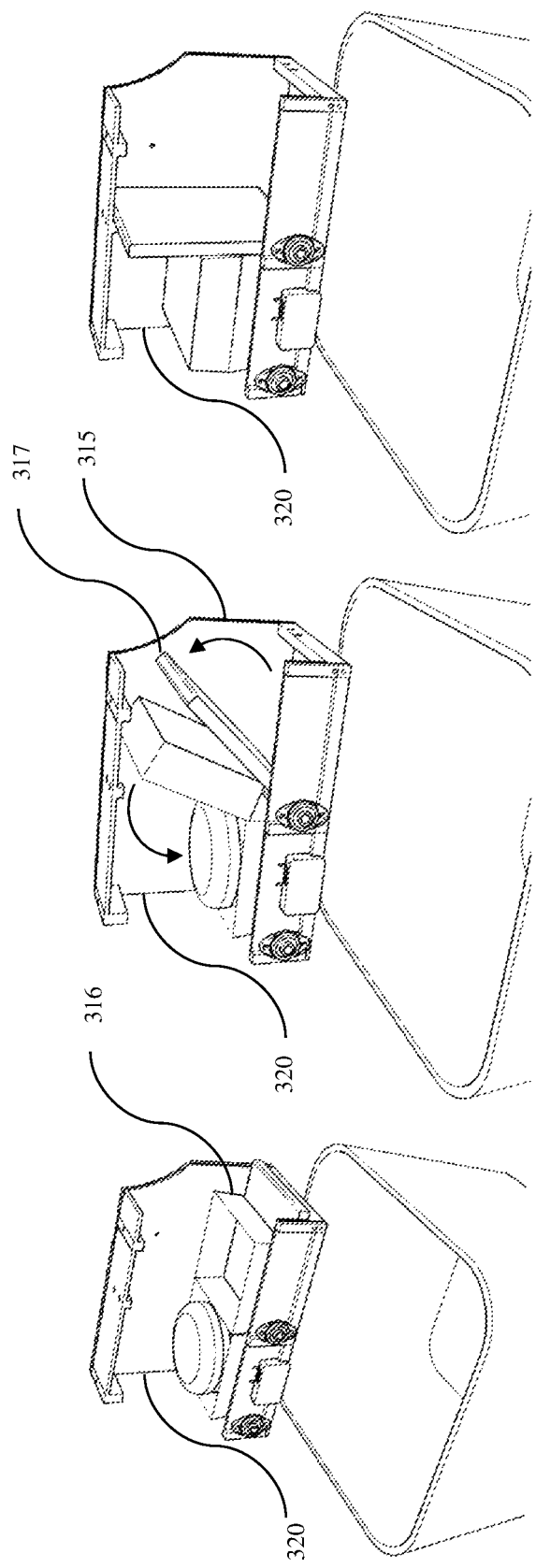
FIG. 46 is a perspective side view of a food receptacle containing a fully assembled cooked food item positioned inside a pickup area first element, according to an example embodiment of the present invention.
FIG. 47 is a perspective side view of a pickup area first element movable panel, wherein the moveable panel is closing a food receptacle containing a fully assembled cooked food item positioned inside a pickup area first element, according to an example embodiment of the present invention.
FIG. 48 is a perspective side view of a pickup area second element, wherein a closed food receptacle containing a fully assembled cooked food item is positioned inside the pickup area second element to be picked up by a consumer, according to an example embodiment of the present invention.

FIGS. 33 and 34 show a movable carrier 295 and at least one movable arm 305 mounted on a track 300 according to an example embodiment of the present invention. The movable carrier 295 is configured to receive the food item components as it moves between a plurality of the assembling areas. The track 300 is configured to allow the movable carrier 295 to translate in a carrier first direction (in the direction of arrowed line D12) and a carrier second direction (in the direction of arrowed line D13). The track further includes at least one movable arm 305 that is configured to move between a rearward position and a forward position. The at least one controller is configured to send a plurality of signals to cause the at least one movable arm 305 to move between the rearward position and the forward position. In the rearward position, as best illustrated in FIG. 44, the at least one movable arm 305 is located on a rearward facing side 301 of the track. In the forward position, as best illustrated in FIG. 45, the at least one movable arm 305 is located proximate to a pickup area 310.

Figure 24:
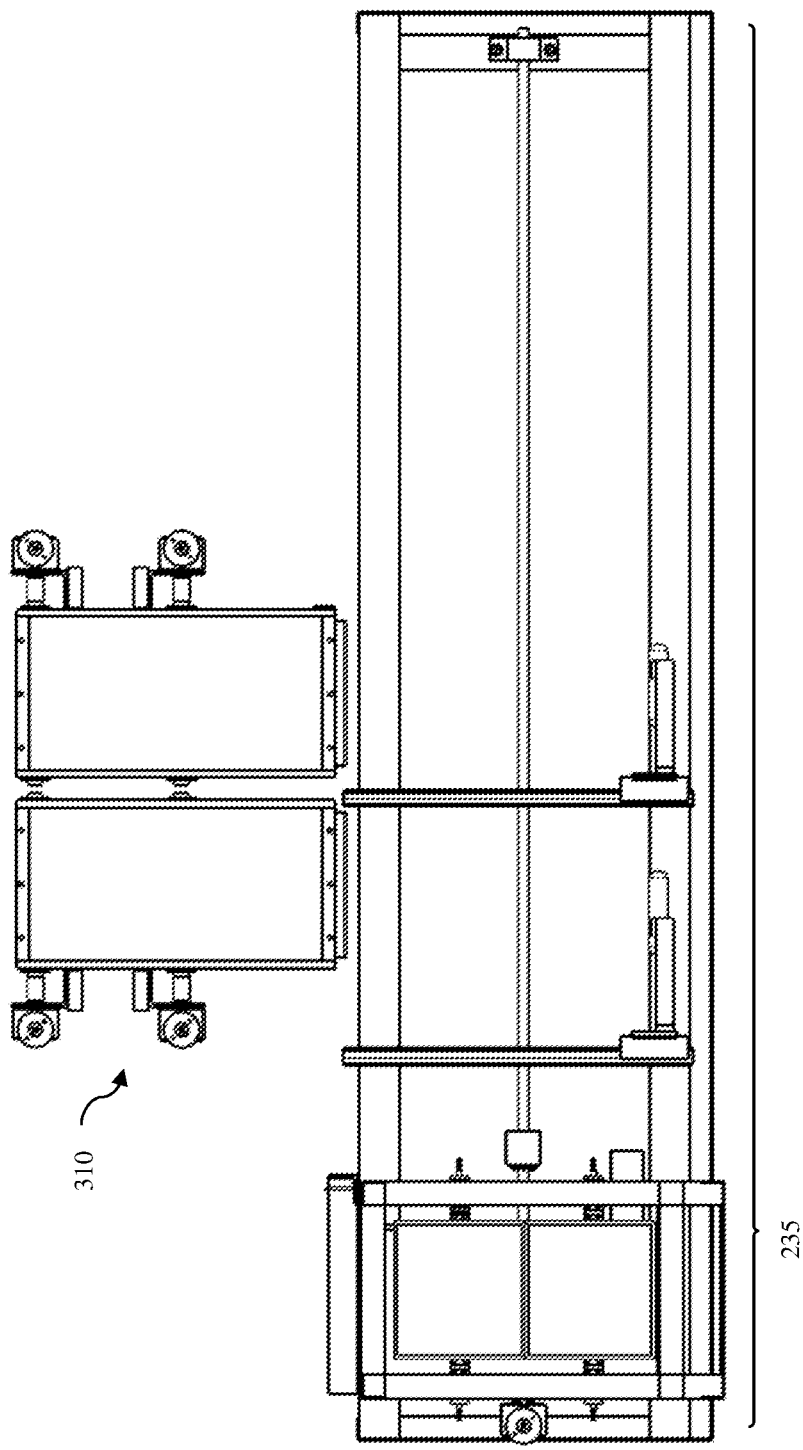
FIG. 24 is a top view of at least one assembling area, according to an example embodiment of the present invention.
Figure 25:
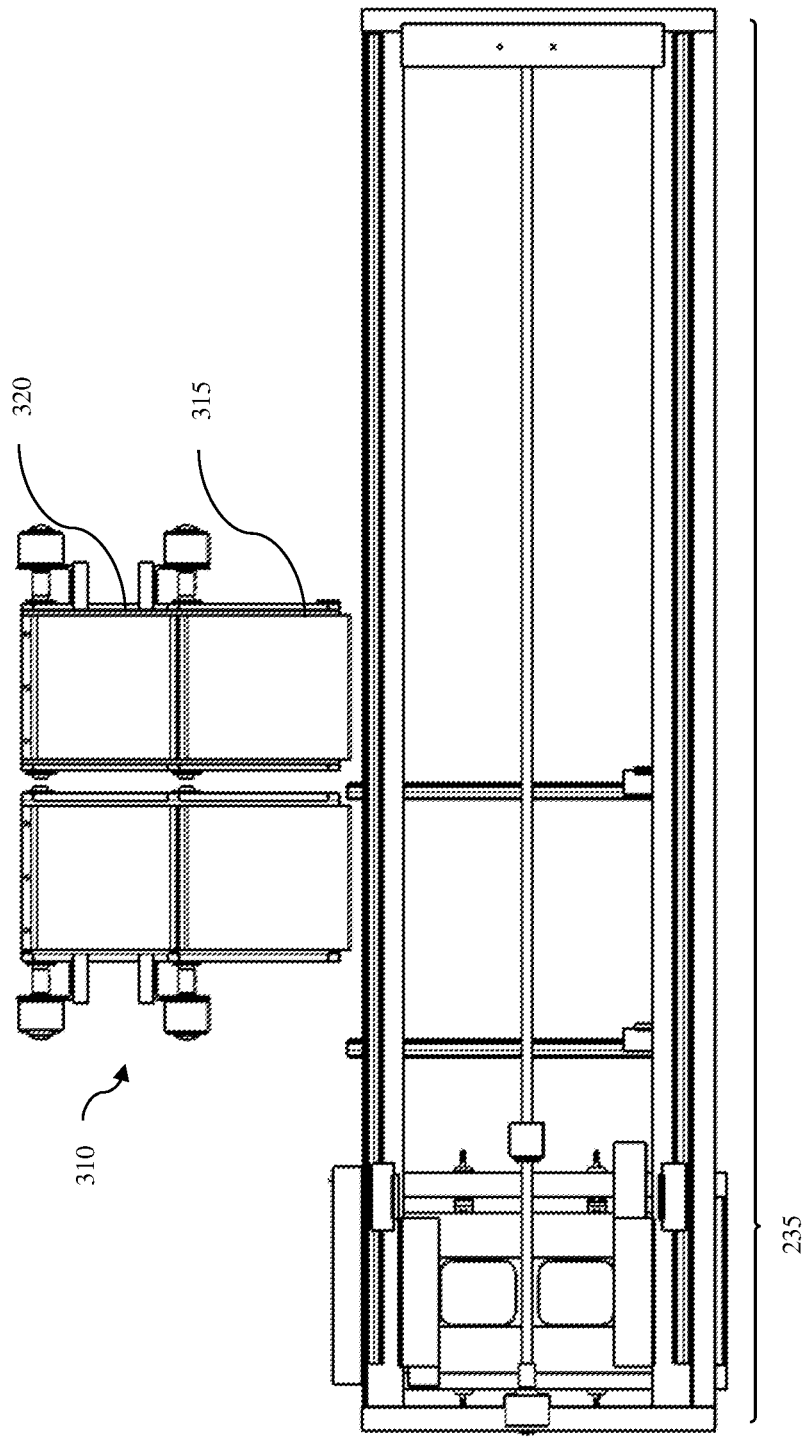
FIG. 25 is a bottom view of at least one assembling area, according to an example embodiment of the present invention.
Figure 26:
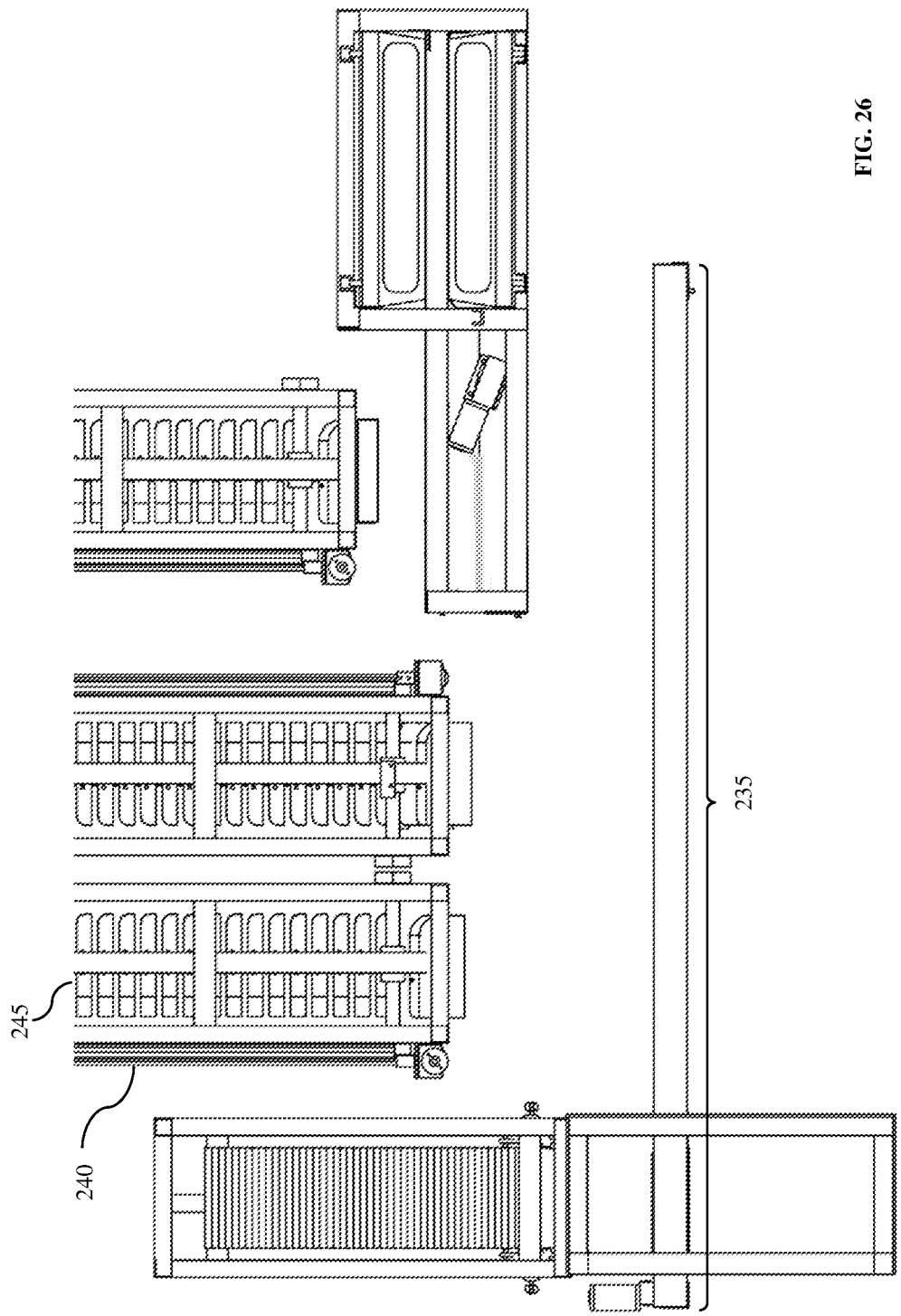
FIG. 26 is a front view of a conveyor system above at least one assembling area, according to an example embodiment of the present invention.
Figure 29:
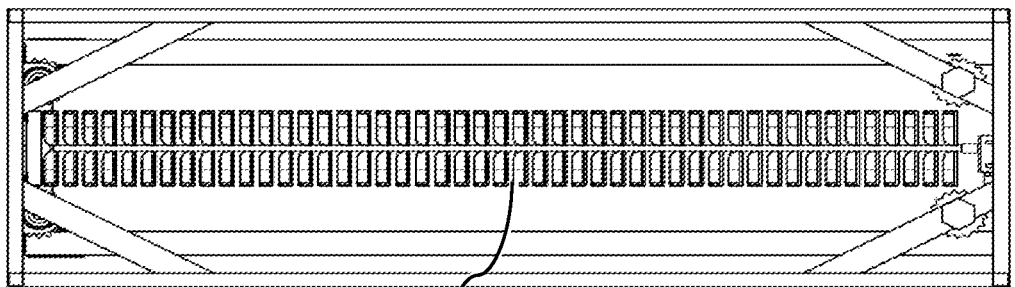
FIG. 29 is a left side view of a vertically stacked movable platform, according to an example embodiment of the present invention.
Figure 28:
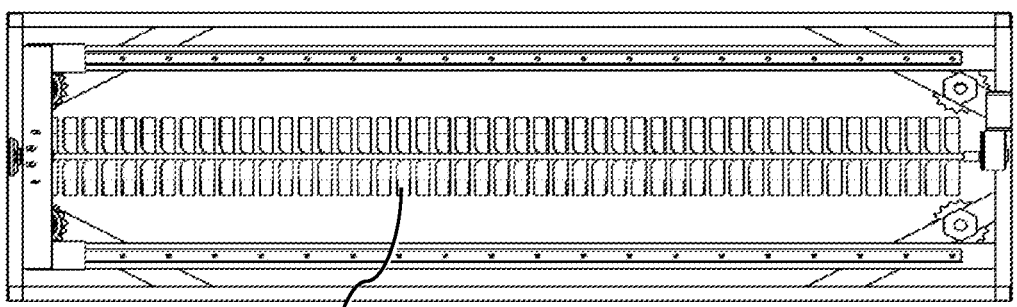
FIG. 28 is a right-side view of a vertically stacked movable platform, according to an example embodiment of the present invention.
Figure 27:
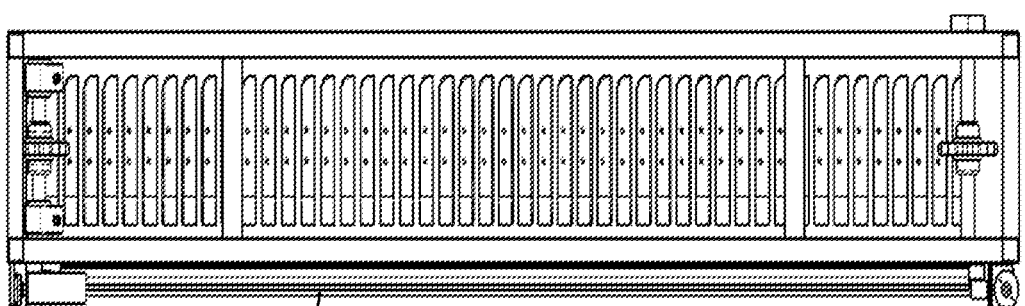
FIG. 27 is a front view of a vertically stacked movable platform, according to an example embodiment of the present invention.

FIGS. 24 and 25 show the pickup area 310 according to an example embodiment of the present invention. The pickup area 310 includes a pickup area first element 315, a pickup area second element 320, and a pickup area third element 325. The pickup area first element 315 is configured to receive at least a fully assembled cooked food item 316. In the present embodiment, the pickup area first element is a first open pickup area positioned in front of and proximate to the track. The pickup area second element 320 is configured to allow the fully assembled cooked food item 316 to be picked up by a consumer. In the present embodiment, the pickup area second element is a second open pickup area positioned proximate to the pickup area first element 315. The pickup area third element 325 configured to allow the fully assembled cooked food item 316 to move to a disposal area 330. In the present embodiment, the pickup area third element is a movable panel positioned above the disposal area 330. The disposal area includes a disposal area first portion 331 and is positioned relative to the pickup area third element such that when the pickup area third element is in an open configuration, the fully assembled cooked food item 316 drops from the pickup area third element into the disposal area first portion. It should be appreciated that the pickup area may have other shapes, dimensions, and surfaces, and such variations are within the spirit and scope of the claimed invention. For example, the pickup area may be a container, partial container, ledge, or surface, that combines the pickup area first element 315, the pickup area second element 320, and the pickup area third element 325. The pickup area may also be other items just as ledges, panels or other bodies. The pickup areas first element, second element and third element may also be a single item (such as a movable ledge). It should also be appreciated that the pickup area may be configured to orient, wrap or close food receptacles having different shapes, dimensions, and configurations, and such variations are within the spirit and scope of the claimed invention.

Figure 52:
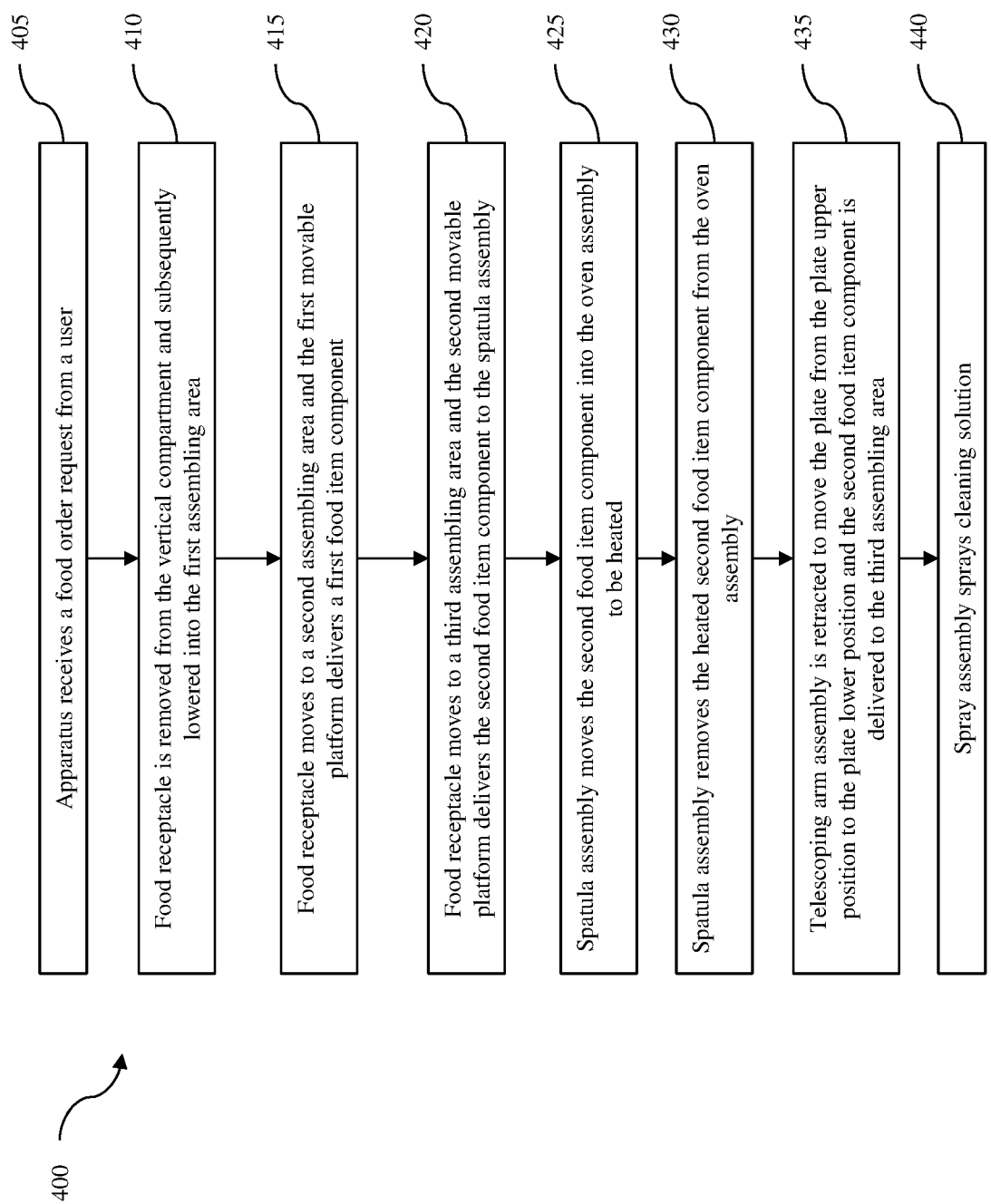
FIG. 52 is a flowchart describing the steps of the process for preparing a cooked food item, according to an example embodiment of the present invention.
Figure 53:
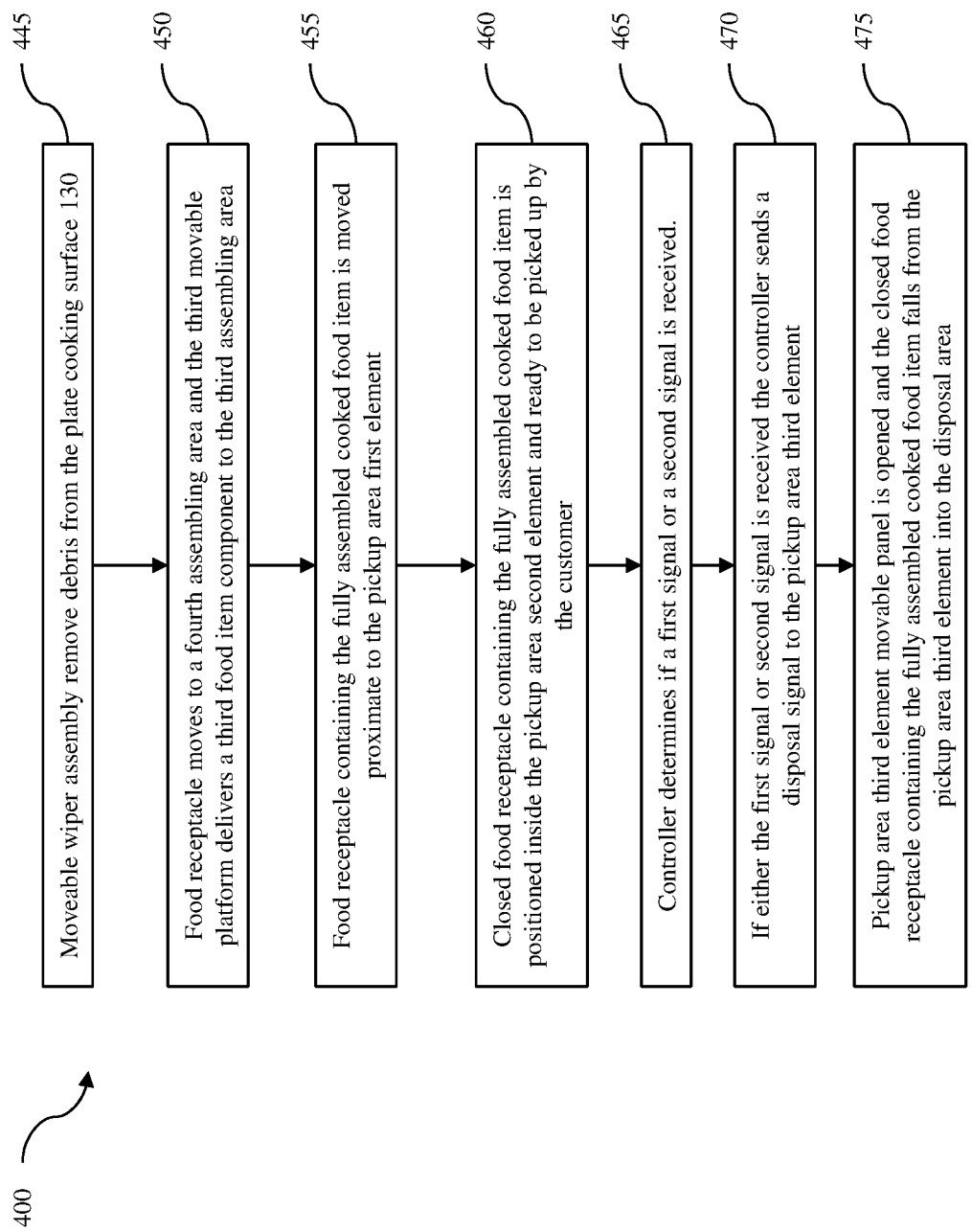
FIG. 53 is a flowchart describing a second set of steps of the process for preparing a cooked food item, according to an example embodiment of the present invention.

FIG. 52 and FIG. 53 are flowcharts describing the steps of the process 400 for preparing a cooked food item, according to an example embodiment of the present invention. The sequence of steps depicted is for illustrative purposes only and is not meant to limit the method in any way as it is understood that the steps may proceed in a different logical order, additional or intervening steps may be included, or described steps may be divided into multiple steps, without detracting from the invention.

Figure 35:
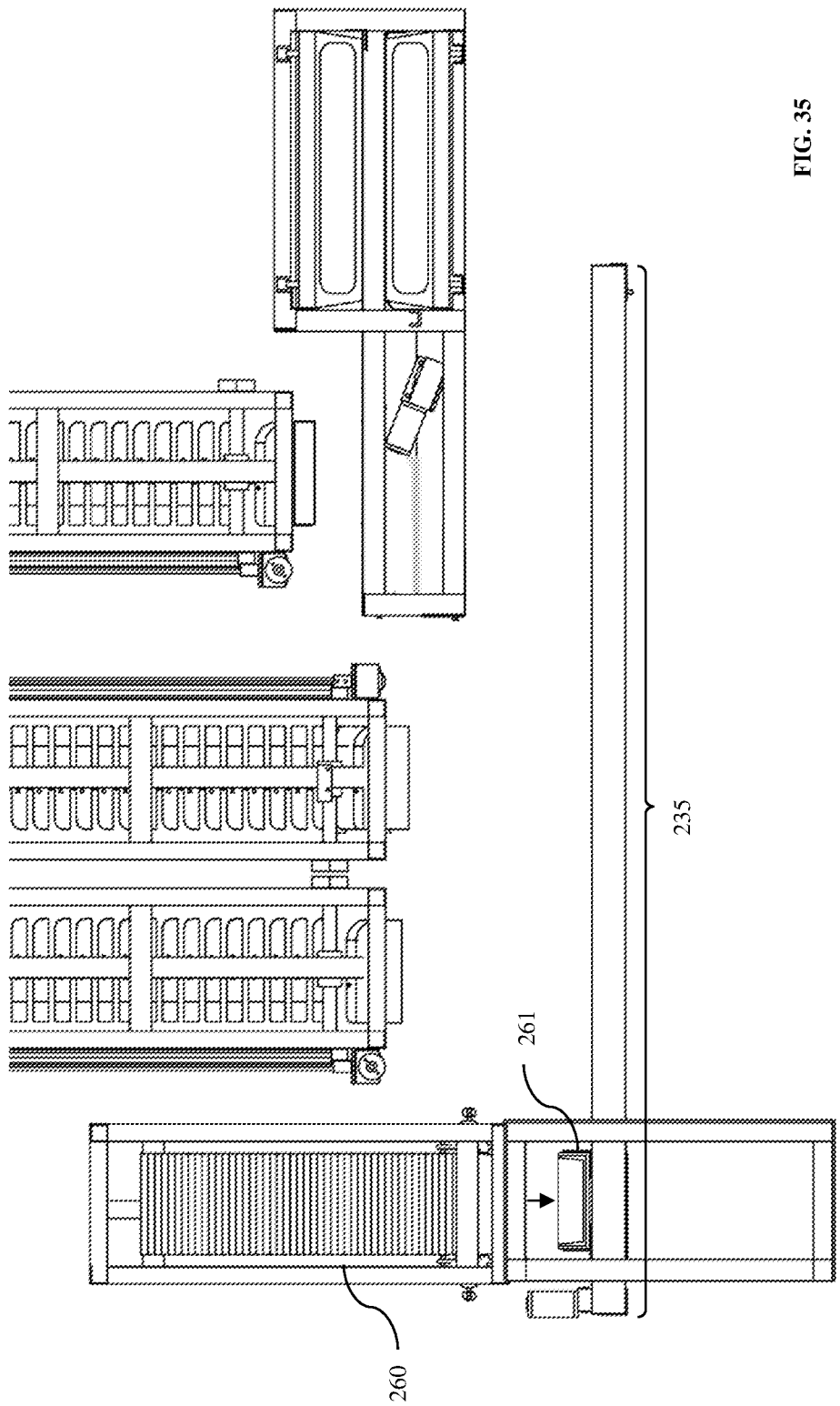
FIG. 35 is a front view of a food receptacle that has been removed from a vertical compartment and subsequently lowered into a first assembling area, according to an example embodiment of the present invention.
Figure 36:
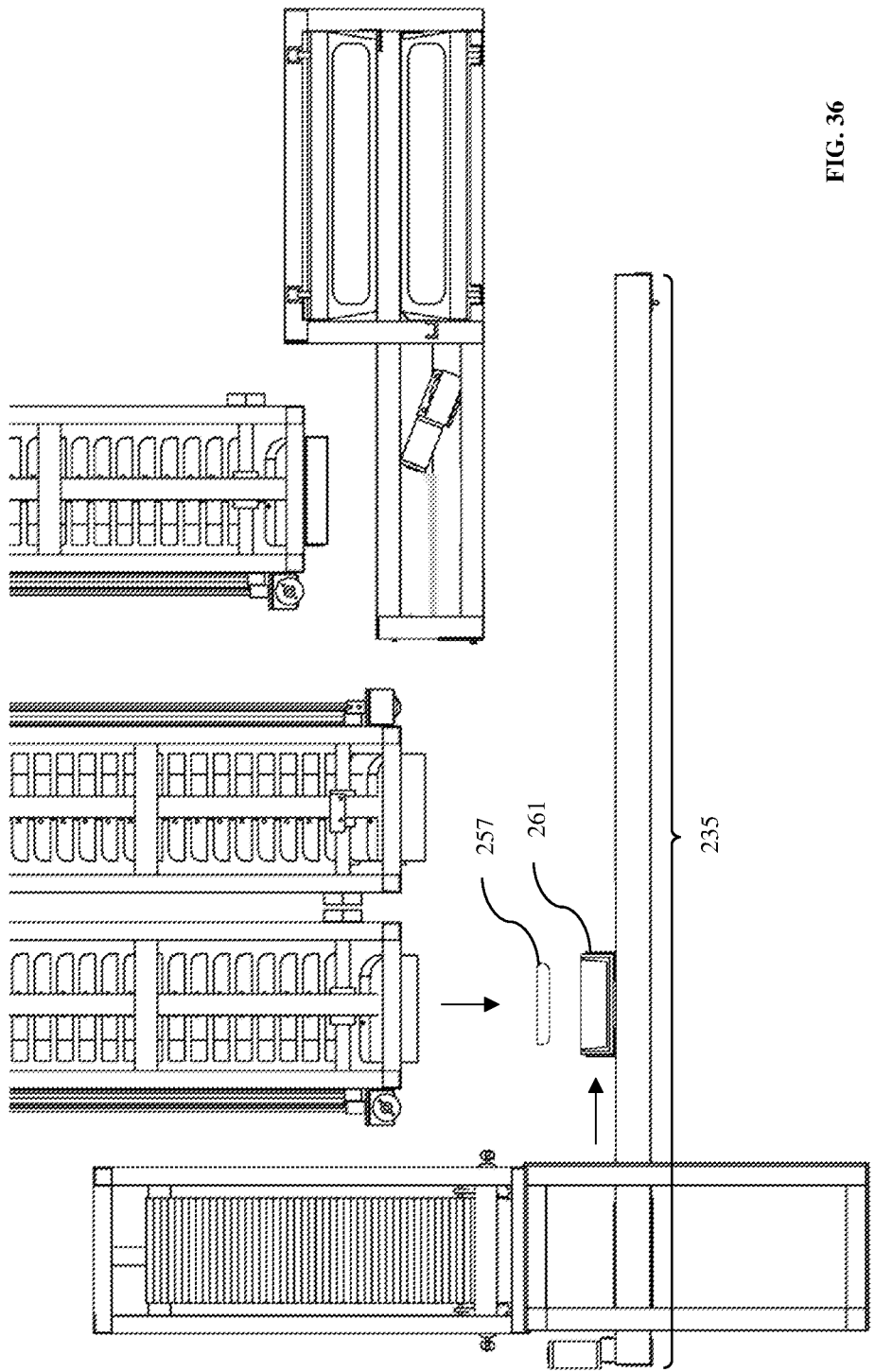
FIG. 36 is a front view of a food receptacle moving to a second assembling area, wherein a first movable platform is delivering a first food item component to the second assembling area, according to an example embodiment of the present invention.

In step 405, the at least one controller receives a food order request from a user. In this step, the user may request a food order in person or utilize a mobile food order application on a mobile device, such as a cell phone, a smart phone, or a tablet/laptop computer to request a food order. In step 410, the food receptacle is removed from the vertical compartment and subsequently lowered into the first assembling area shown in FIG. 35. In step 415, the food receptacle moves to a second assembling area and the first movable platform delivers a first food item component in accordance with the customer order to the second assembling area as shown in FIG. 36.

Figure 37:
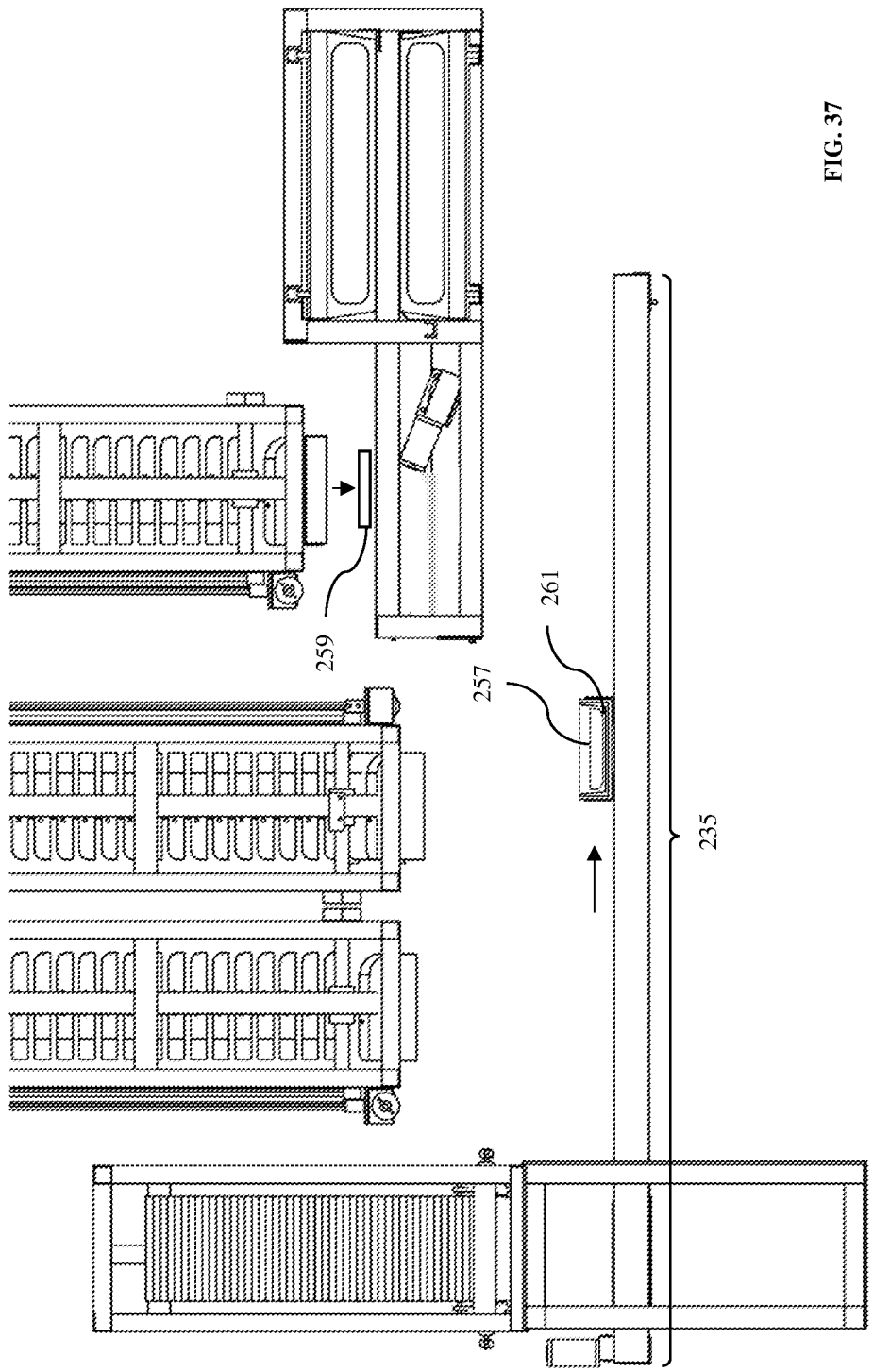
FIG. 37 is a front view of a food receptacle moving to a third assembling area, wherein a second movable platform is delivering a second food item component to a spatula assembly, according to an example embodiment of the present invention.
Figure 38:
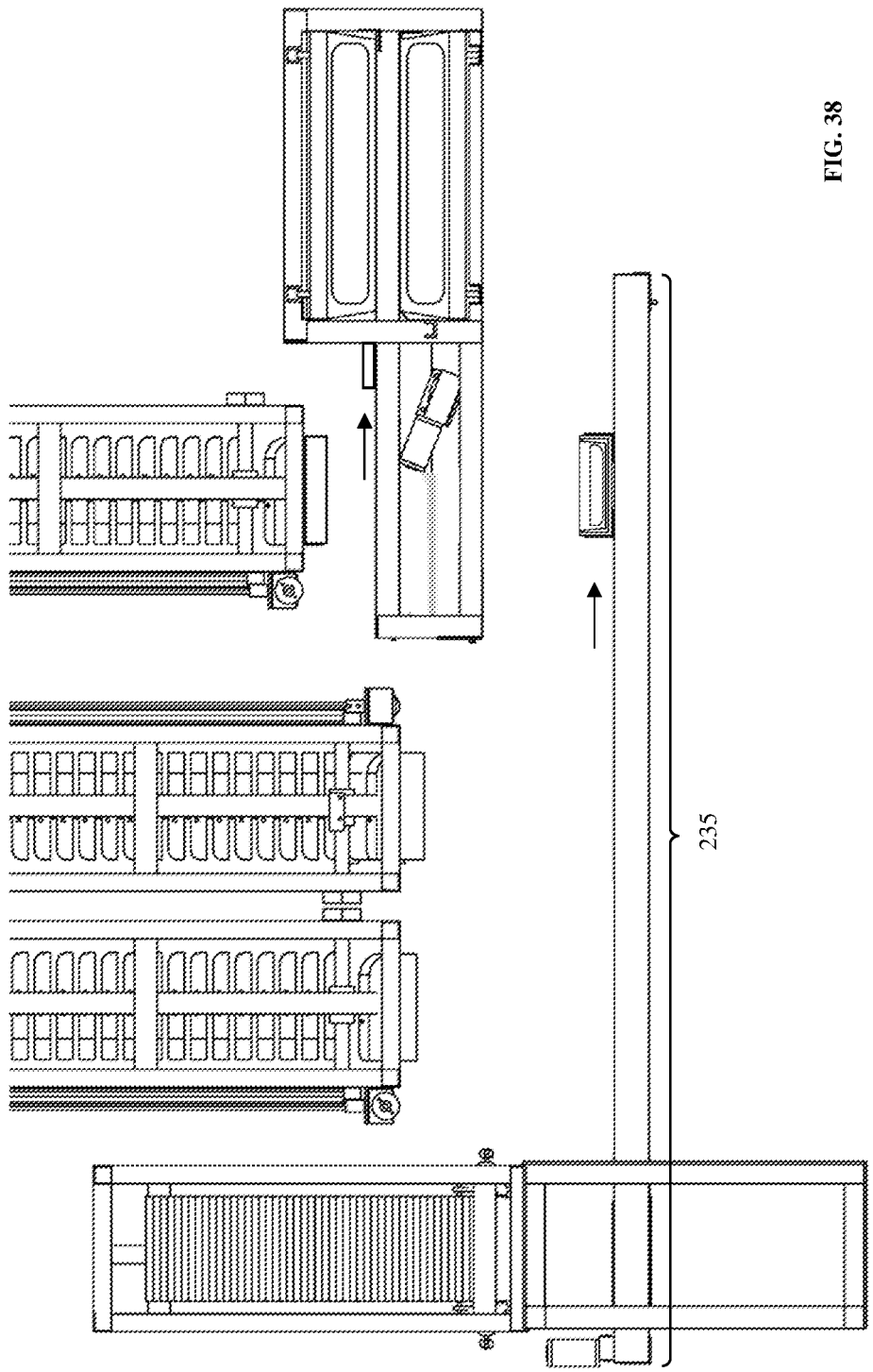
FIG. 38 is a front view of a food receptacle moving to a third assembling area, wherein a spatula assembly is moving a second food item component to an oven assembly, according to an example embodiment of the present invention.
Figure 39:
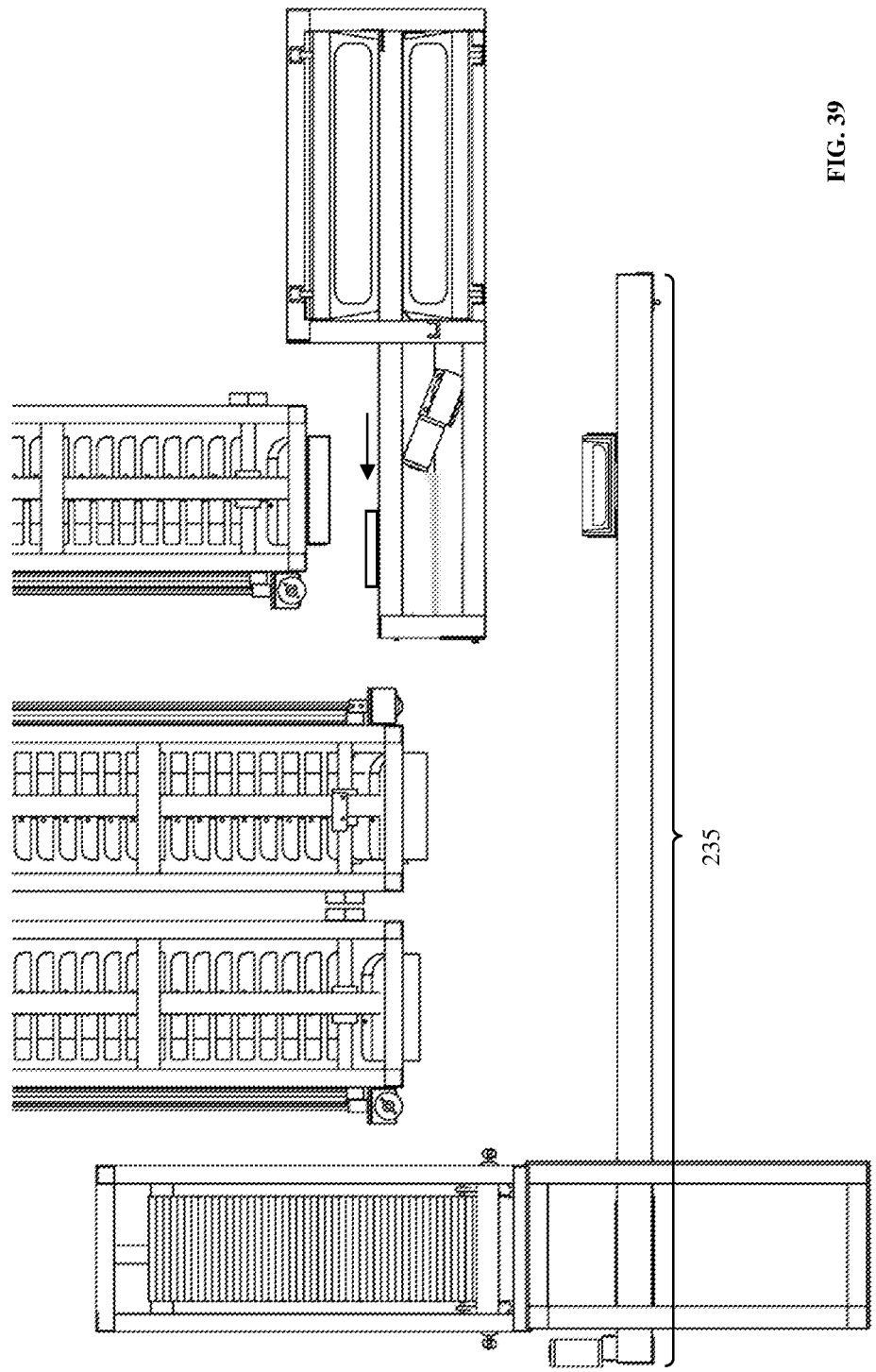
FIG. 39 is a front view of a food receptacle in a third assembling area, wherein a spatula assembly removing a second food item component from an oven assembly, according to an example embodiment of the present invention.
Figure 40:
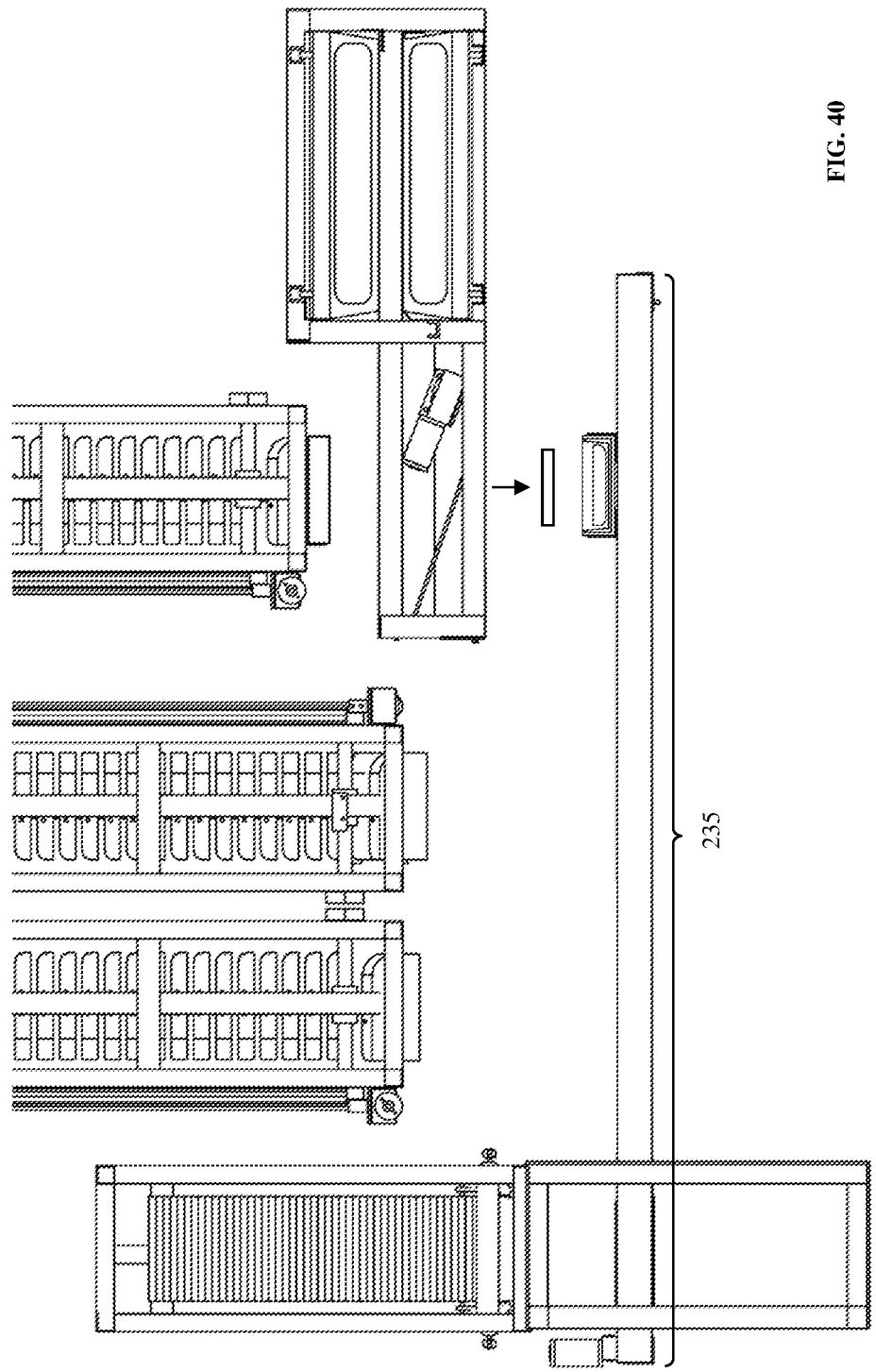
FIG. 40 is a front view of a food receptacle in a third assembling area, wherein a plate in a lower position is delivering a second food item component to the third assembling area, according to an example embodiment of the present invention.

In step 420, the food receptacle moves to a third assembling area and the second movable platform delivers the second food item component to the spatula assembly as shown in FIG. 37. In step 425, the spatula assembly moves the second food item component into the oven assembly to be heated as shown in FIG. 38. In step 430, the spatula assembly removes the heated second food item component from the oven assembly as shown in FIG. 39. In step 435, the telescoping arm assembly is retracted to move the plate from the plate upper position to the plate lower position and the second food item component is delivered to the third assembling area as shown in FIG. 40.

In step 440, the spray assembly 215 sprays cleaning solution onto the cooking area upward facing surface 180, the cooking area downward facing surface 175, and the plate 115. In step 445, the moveable wiper assembly 150 is brought into contact with the plate 115 and the movable wiper cleaning surface 155 oscillates from the first direction (in the direction of arrowed line D4) to the second direction (in the direction of arrowed line D5) as shown in FIGS. 10 and 11, respectively, to remove debris (e.g., food particles, grease, cleaning solution) from the plate cooking surface 130. Additionally, the at least one fixed wiper cleaning surface 210 located along the upward facing side and downward facing side of the elongated bar is pressed against the cooking area upward facing surface 180 and cooking area downward facing surface 175. The fixed wiper 205 pressed against the cooking area upward facing surface 180 and cooking area downward facing surface 175 moves from the spatula assembly cooking position to the spatula assembly non-cooking position to remove and cleans debris from the cooking area upward facing surface 180 and cooking area downward facing surface 175.

Figure 41:
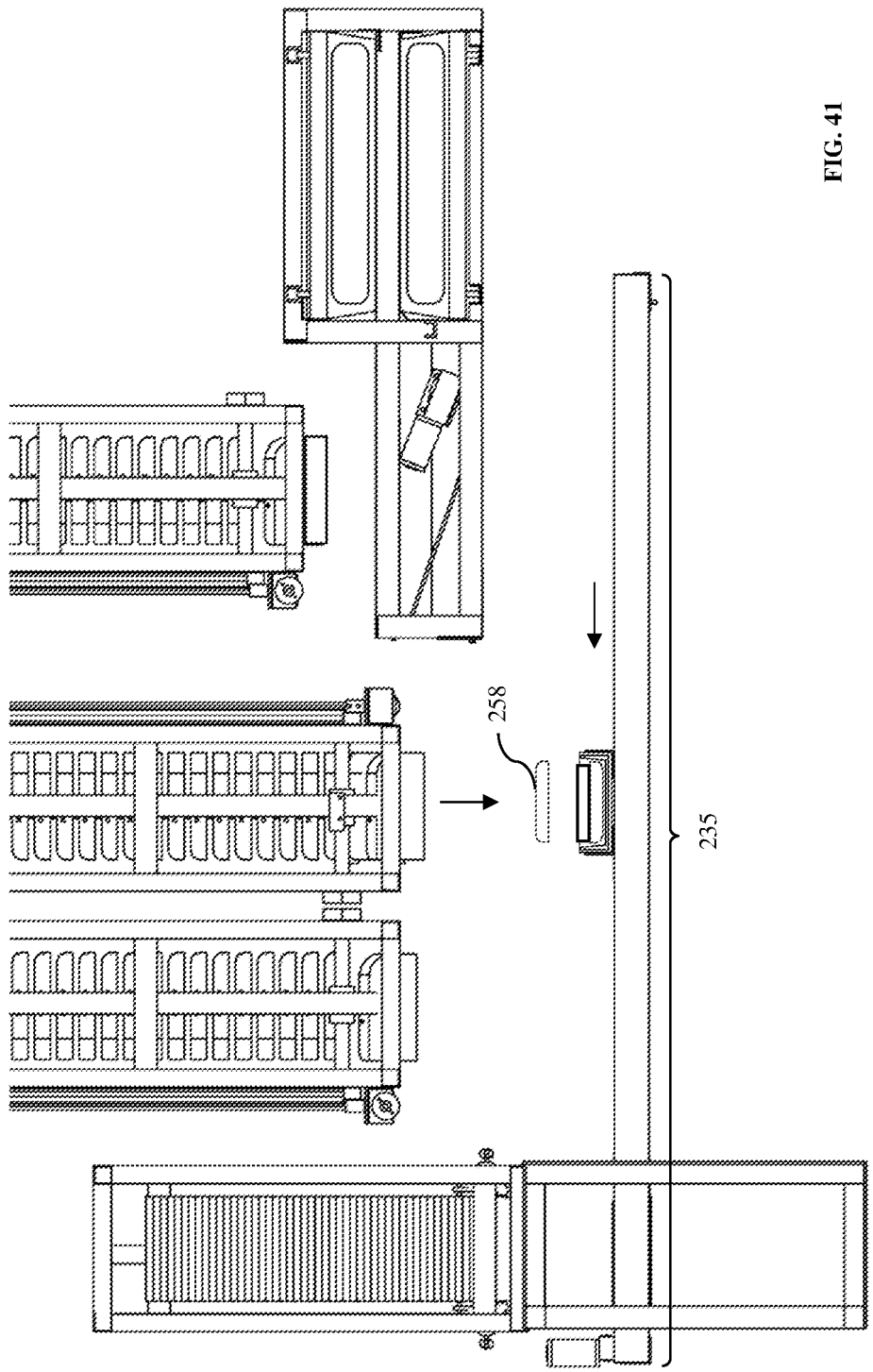
FIG. 41 is a front view of a food receptacle moving to a fourth assembling area, wherein a third movable platform is delivering a third food item component to the third assembling area, according to an example embodiment of the present invention.
Figure 42:
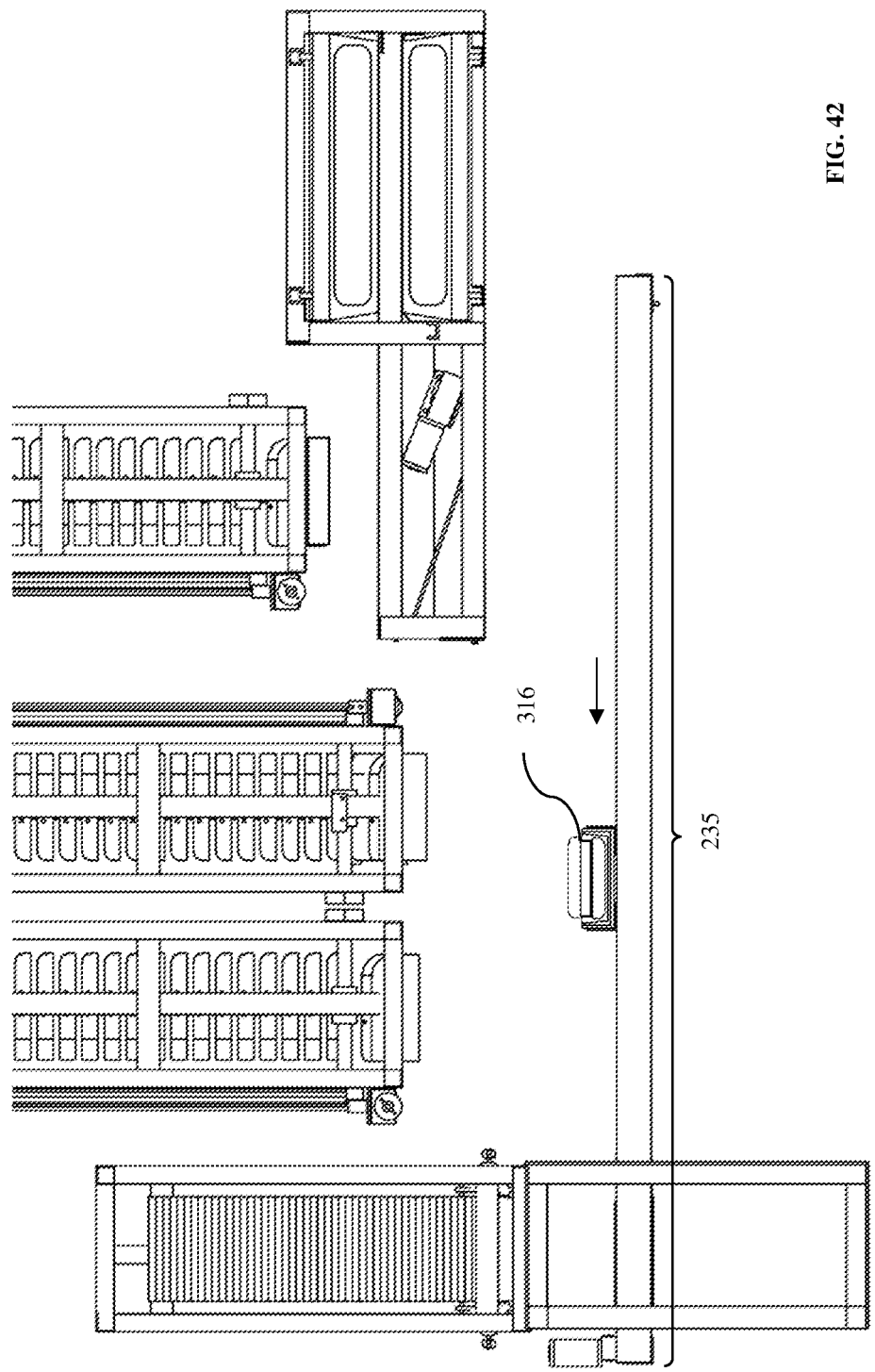
FIG. 42 is a front view of a food receptacle containing a fully assembled cooked food item moving to a pickup area first element, according to an example embodiment of the present invention.
Figure 43:
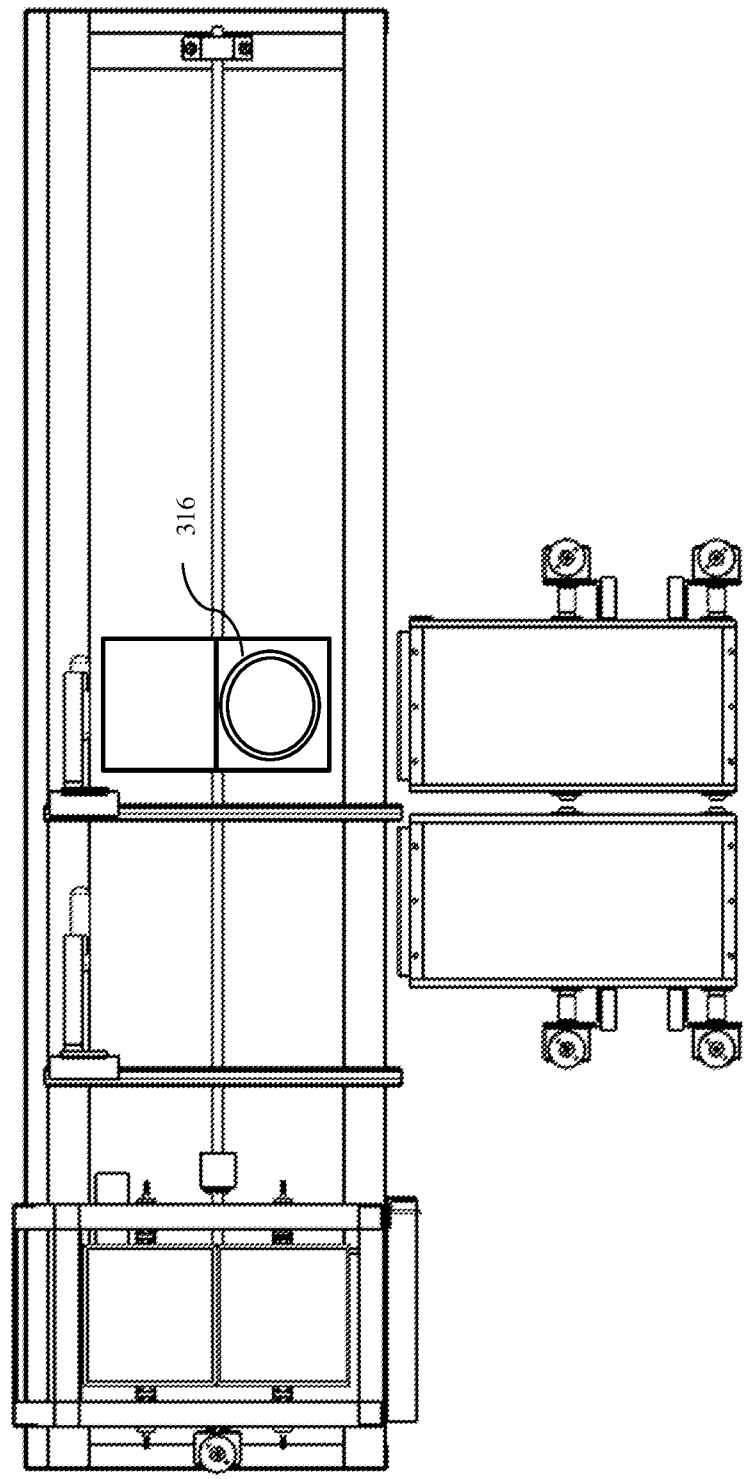
FIG. 43 is a top view of a food receptacle containing a fully assembled cooked food item proximate to a pickup area first element, wherein a movable arm is positioned rearward of a track, according to an example embodiment of the present invention.
Figure 49:
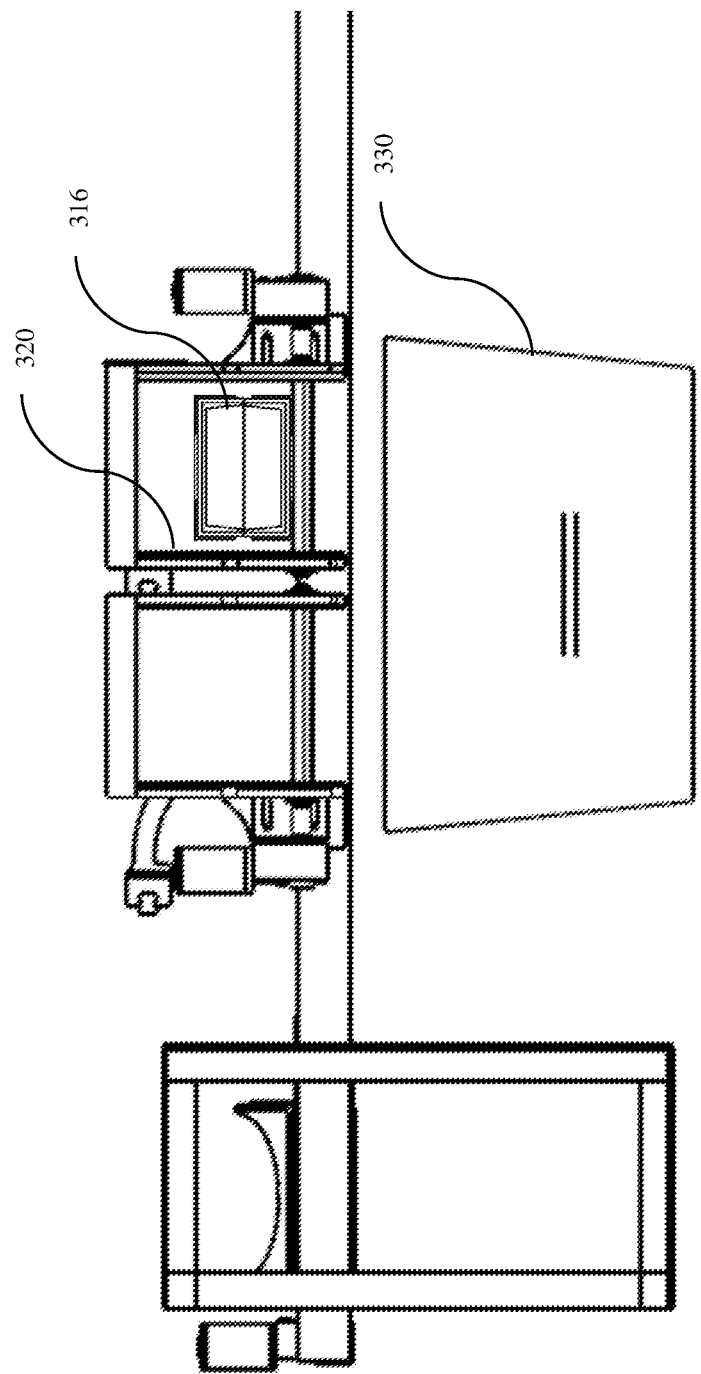
FIG. 49 is a front view of a pickup area second element, wherein a closed food receptacle containing a fully assembled cooked food item is positioned inside the pickup area second element to be picked up by a consumer, according to an example embodiment of the present invention.
Figure 50:
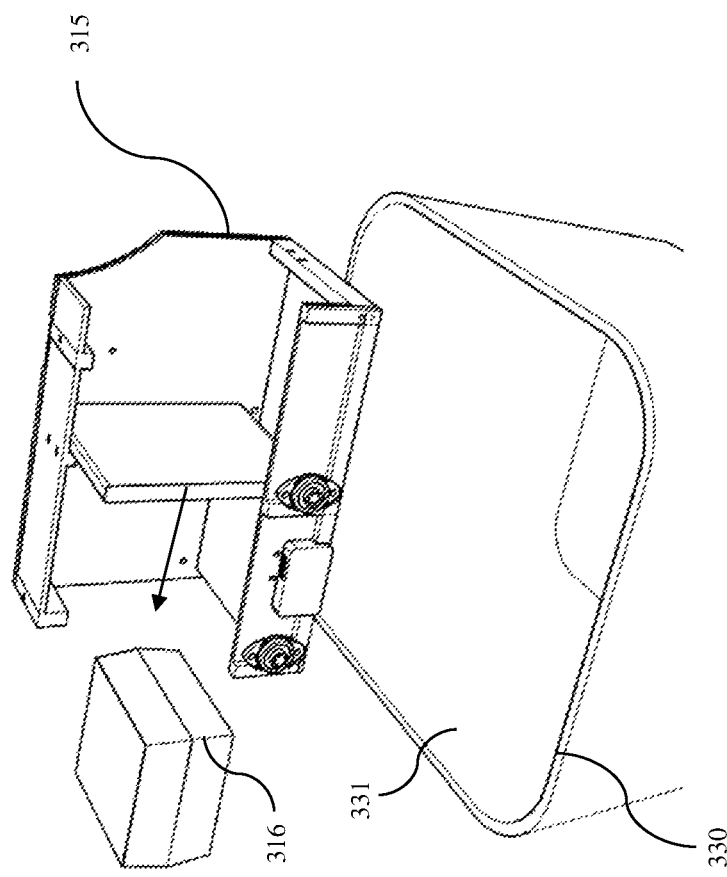
FIG. 50 is a perspective side view of a pickup area second element, wherein a closed food receptacle containing a fully assembled cooked food item is moving out of the pickup area second element, according to an example embodiment of the present invention.

In step 450, the food receptacle moves to a fourth assembling area and the third movable platform delivers a third food item 258 component to the third assembling area as shown in FIG. 41. In step 450, the food receptacle containing the fully assembled cooked food item is moved proximate to the pickup area first element as shown in FIGS. 42 and 43. In step 455, the movable arm moves the fully assembled cooked food item into the pickup area first element and a moveable panel 317 located inside the pickup area first element closes the food receptacle containing the fully assembled cooked food as shown in FIGS. 44-48. In step 460, the closed food receptacle containing the fully assembled cooked food item is positioned inside the pickup area second element and ready to be picked up by the customer as shown in FIGS. 49 and 50.

With reference to the figures now including FIG. 55, a schematic 600 of the apparatus 100 in communication with the controller 610 is shown. In step 465, the at least one controller determines if a first signal 650 or a second signal 660 is received. The first signal 650 indicates that the closed food receptacle containing the fully assembled cooked food item inside the pickup area second element has not been removed by the customer within the preprogrammed amount of time. The predetermined amount of time takes into account that another food order is placed and must be moved into the pickup area. The second signal 660 indicates that the closed food receptacle containing the fully assembled cooked food item inside the pickup area second element has not satisfied a specific parameter or condition. For example, the second signal could be a signal that is based on temperature, mechanical malfunction, order cancellation, or *E. coli* determination.

Figure 51:
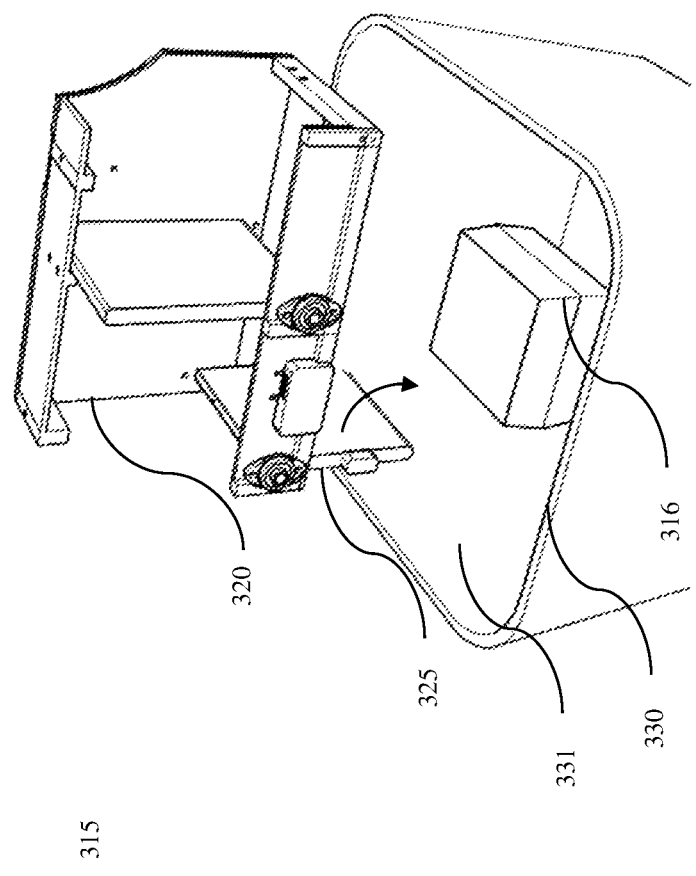
FIG. 51 is a perspective side view of a pickup area third element, wherein a closed food receptacle containing a fully assembled cooked food item is moving to a disposal area, according to an example embodiment of the present invention.

In step 470, if either the first signal or second signal is received, the at least one controller 610 sends a disposal signal 670 to the pickup area third element to move the fully assembled cooked food item 316 to the disposal area. In step 475, the pickup area third element movable panel is opened and the closed food receptacle containing the fully assembled cooked food item falls from the pickup area third element into the disposal area positioned below the pickup area third element as shown in FIG. 51.

Figure 54:
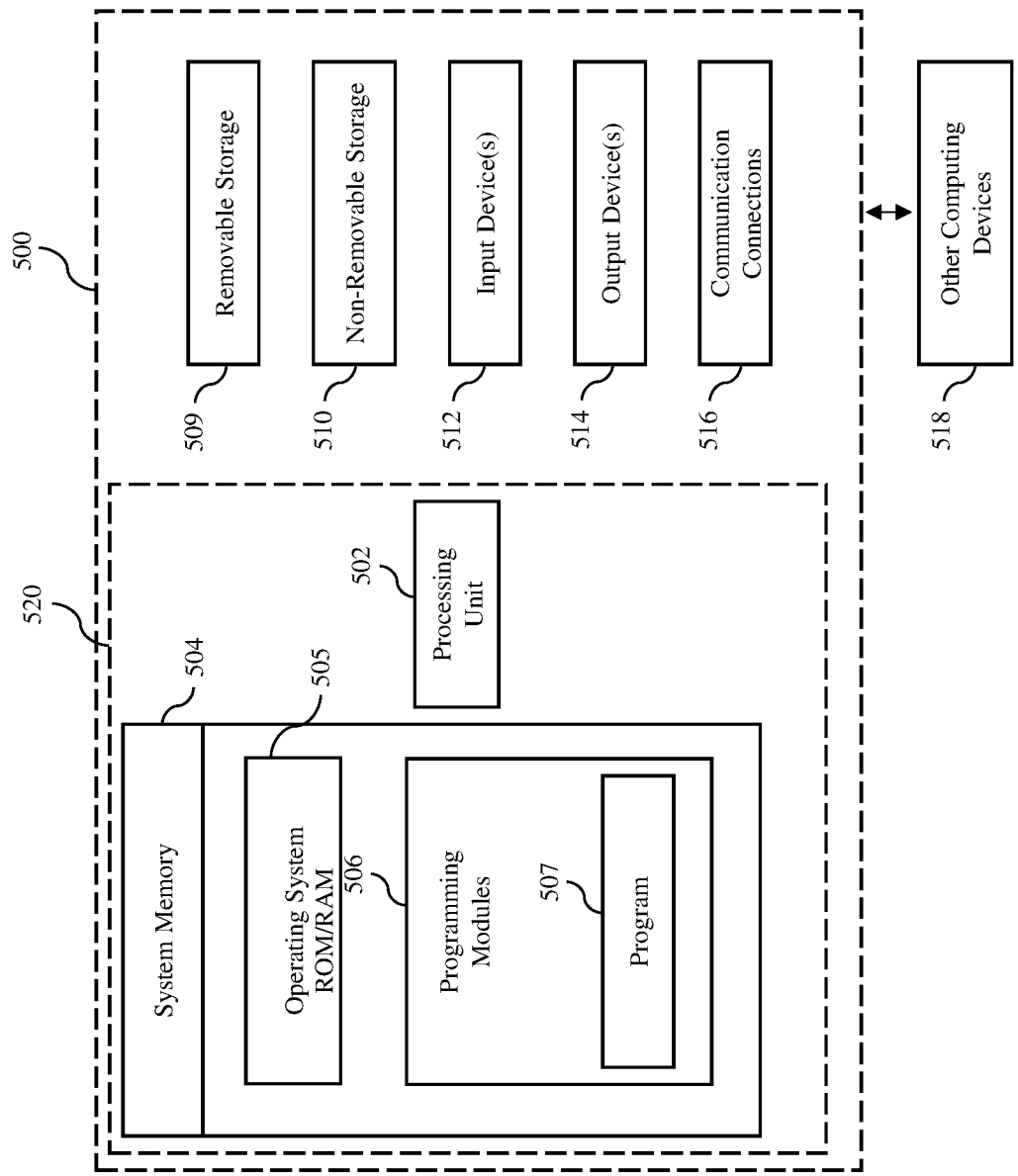
FIG. 54 is a block diagram of a system including an example computing device and other computing devices, according to an example embodiment of the present invention.

FIG. 54 is a block diagram of a system including an example computing device 500 that may also be used as the controller or a device used to store the preprogrammed logic that may be used for performing certain functions as identified herein. For example, computing device 500 may also the processor or controller 315*n* as identified in FIG. 70. Consistent with the embodiments described herein, the aforementioned actions may be implemented in a computing device, such as the computing device of FIG. 54. Any suitable combination of hardware, software, or firmware may be used to implement the computing device. The aforementioned system, device, and processors are examples and other systems, devices, and processors may comprise the aforementioned computing device.

With reference to FIG. 54, a system consistent with an embodiment of the invention may include a plurality of computing devices, such as computing device 500. In a basic configuration, computing device may include at least one processing unit 502 and a system memory 504. Depending on the configuration and type of computing device, system memory 504 may comprise, but is not limited to volatile (e.g. random-access memory (RAM)), non-volatile (e.g. read-only memory (ROM)), flash memory, or any combination or memory. System memory 504 may also include operating system 505, and one or more programming modules 506 (such as program module 507). Operating system 505, for example, may be suitable for controlling the operation of computing device 500. In one embodiment, programming modules 506 may include, for example, a program module 507. Furthermore, embodiments of the invention may be practiced in conjunction with a graphics library, other operating systems, or any other application program and is not limited to any particular application or system. This basic configuration is illustrated in FIG. 54 by those components within a dashed line 520.

Computing device 500 may have additional features or functionality. For example, computing device 500 may also include additional data storage devices (removable and/or non-removable) such as, for example, magnetic disks, optical disks, or tape. Such additional storage is illustrated in FIG. 54 by a removable storage 509 and a non-removable storage 510. Computer storage media may include volatile and nonvolatile, removable and non- removable media implemented in any method or technology for storage of information, such as computer readable instructions, data structures, program modules, or other data. System memory 504, removable storage 509, and non-removable storage 510 are all computer storage media examples (i.e., memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 500. Any such computer storage media may be part of computing device 500. Computing device 500 may also have input device(s) 512 such as a keyboard, a mouse, a pen, a sound input device, a camera, a touch input device, etc. Output device(s) 514 such as a display, audio speakers, or printer, may also be included. The aforementioned devices are only examples, and other devices may be added or substituted.

Computing device 500 may also contain a communication connection 516 that may allow computing device 500 to communicate with other computing devices 518, such as over a network in a distributed computing environment, for example, an intranet or the Internet. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media, such as a wired network or direct-wired connection, and wireless media, such as acoustic, radio frequency (RF), infrared, and other wireless media. The term computer readable media as used herein may include both, computer storage media and communication media.

As stated above, a number of program modules and data files may be stored in system memory 504, including operating system 505. While executing on processing unit 502, programming modules 506 may perform processes including, for example, one or more of the methods and steps shown in FIG. 52, FIG. 53 and FIG. 54. Computing device 500 may also include a graphics processing unit, which supplements the processing capabilities of processor 502 and which may execute programming modules 506, including all or a portion of those processes and methods shown in FIG. 52, FIG. 53 and FIG. 54. The aforementioned processes are examples, and processing unit 502 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general-purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods stages may be modified in any manner, including by reordering stages and/or inserting or deleting stages, without departing from the invention.

Figure 54A:
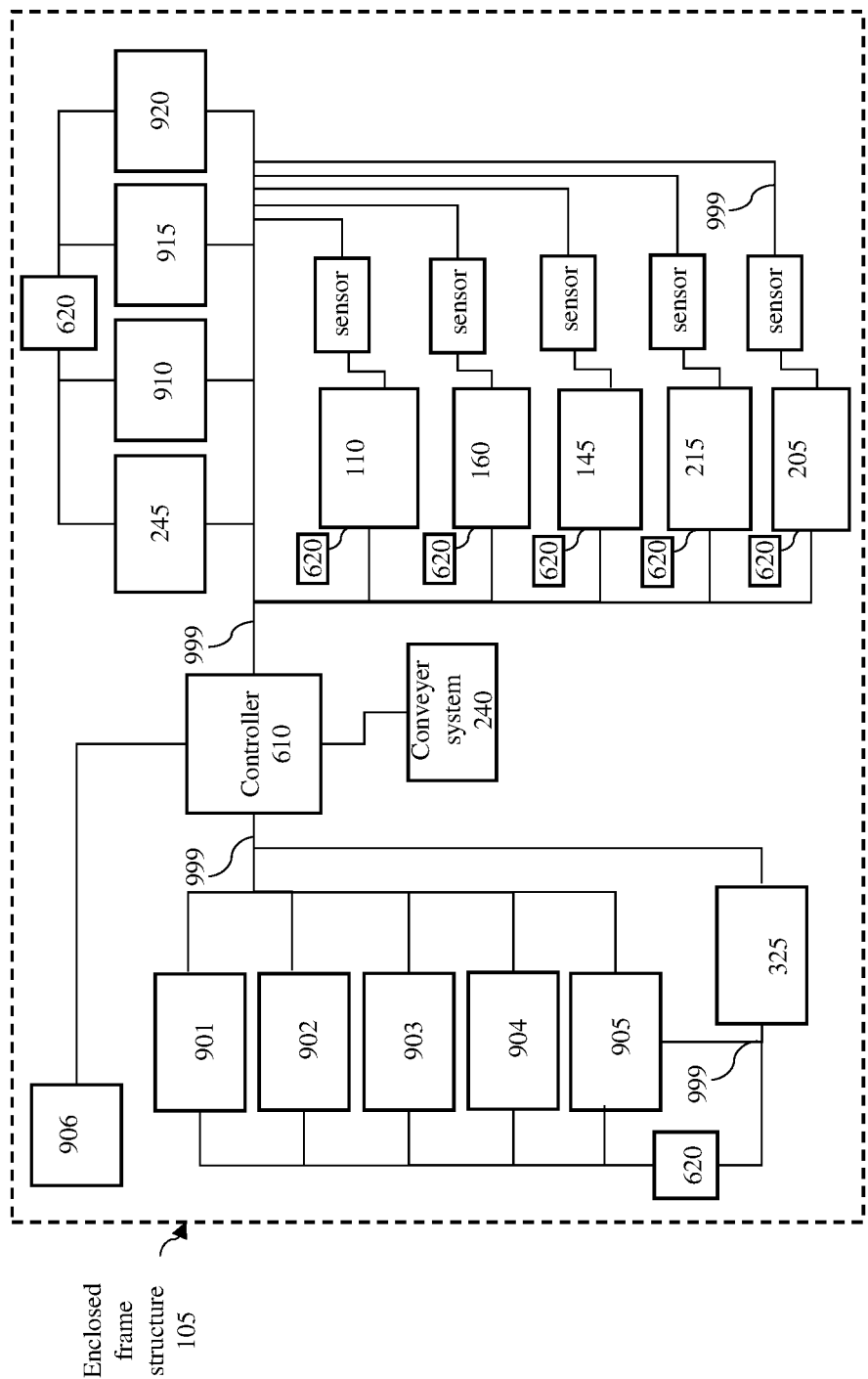
FIG. 54A is a block diagram illustrating the electrical components in communication with each other.

FIG. 54A is a block diagram illustrating the electrical components in communication with each other. The controller 610 uses its preprogrammed logic to evaluate positions of components of the system and direct the components in the proper order at the proper times. The controller may accurately evaluate the system by use of sensors dispersed in various places, and directs its components based on the signals it receives from the sensors. A plurality of different sensors may be used such as motion sensors, temperature sensors, optical sensors, pressure sensors, encoders, etc. All components within FIG. 54A are in electrical communication, through conductor 999, with a power source 620. The power source may come from the electric power grid, such as an electrical outlet, energy storage devices such as batteries or fuel cells, generators or alternators, solar power converters, or any other form of power supply.

First, the controller 610 receives a food order request 906 from a user. In this step, the user may request a food order in person or utilize a mobile food order application on a mobile device, such as a cell phone, a smart phone, or a tablet/laptop computer to request a food order. The food order request signal will be received, through a conductor, by the controller. The controller will then use its preprogrammed logic to send a signal, through a conductor 999, to start the motor of the vertically stacked platforms 245. These platforms hold the food receptacles 261. The food receptacle will be lowered into the first assembling area (as shown in FIG. 35) on the conveyer belt. Once the food receptacle reaches the first assembling area, the first assembling area sensor 901 will send a signal, through conductor 999, to the controller. The first assembling area sensor may take different forms as discussed in FIG. 55. The controller 610 will interpret the signal and send a signal, through conductor 999, to the motor of the vertically stacked platforms to stop. The first assembling area sensor 901 may be an optical sensor tracking objects in a certain area.

Next, the controller will use its preprogrammed logic to determine the next step. The next step is to start the conveyer system 240. The controller will send a signal, through conductor 999, to the conveyer belt motor to start moving forward. The food receptacle 261 will translate from the first assembling area (as shown in FIG. 35) to the second assembling area (as shown in FIG. 36). Once the food receptacle reaches the second assembling area, a second assembling area sensor 902 will detect the receptacle and send a signal, through conductor 999, to the controller. The second assembling area sensor may take different forms as discussed in FIG. 55. The controller 610 will receive the signal, then use its preprogrammed logic to interpret the signal and determine the next action. The next action being to stop the conveyer belt and to deliver a first food item to the food receptacle.

The controller sends a signal, through conductor 999, to the conveyer belt to stop and to the first movable platform motor 910 to start. This motor may contain an encoder instructing the motor to have the panel rotate to a predetermined point then rotate back to its beginning position. In other embodiments the controller or processor may receive a signal from the a sensor configured to detect the position of the panel. Once the first food item component is delivered, the second assembling area sensor 902 will send a signal, through conductor 999, to the controller. The controller 610 receives the signal, interprets it, then uses its preprogrammed logic to determine next action.

Next action having the controller send a signal, through conductor 999, to the conveyer belt motor to start. Once that signal is received, the conveyer belt starts translating the food receptacle 261 from the second assembling area (as shown in FIG. 36) to the third assembling area (as shown in FIG. 37). The third assembling area sensor 903 will detect when the food receptacle is present, then send a signal, through conductor 999, to the controller. The third assembling area sensor may take different forms as discussed in FIG. 55. The controller will receive the signal, interpret the signal, and determine the next action. The next action being to send a signal to the conveyer belt motor to stop, and to send a signal to the second movable platform 915 to deliver a second food item to the spatula assembly 110.

Once the spatula assembly sensor detects the food item, the sensor will send a signal, through conductor 999, to the controller 610. The spatula assembly sensor may take different forms as discussed in FIG. 55. The controller will receive the signal, and send a signal back to the spatula assembly motor using its preprogrammed logic. The signal received by the spatula assembly will instruct the spatula to insert the food into the oven assembly 160.

The oven assembly sensor will then detect the food item inside the oven and send a signal to the controller. The oven assembly sensor may take different forms as discussed in FIG. 55. The controller will receive the signal, interpret it, and determine the next action. The next action being to start a time sensor in the oven. The time sensor in the oven will begin counting the time passing, once a predetermined time has been reached, the sensor will send a signal, through conductor 999, to the controller. The controller will receive the signal, interpret it, and determine the next action using its preprogrammed logic.

The controller will send a signal, through conductor 999, to the spatula assembly 110 instructing it to remove the heated food item from the oven. Once the heated food is removed from the oven, the oven assembly sensor will detect the action and send a signal to the controller. The controller will receive the signal, interpret the signal, and determine the next action.

Using its preprogrammed logic, the controller will then send a signal, through conductor 999, to the telescoping arm assembly 145 motor to retract the arm moving a plate from an upper position to a lower position. By having the plate in the lower position, the heated food item will be delivered to the third assembling area. The third assembling area sensor 903 will detect the second food item and send a signal, through conductor 999, to the controller.

The controller will receive the signal, and in return send a signal, through conductor 999, to the spray assembly 315 using its preprogrammed logic. The spray assembly will receive the signal and spray the cleaning solution. Once done spraying, the spray assembly sensor will send a signal, through conductor 999, to the controller. The spray assembly sensor may take different forms as discussed in FIG. 55. The controller 610 will receive the signal, interpret and determine the next action. The next action being to signal the movable wiper assembly 205 to remove debris from the plate cooking surface.

The controller will send a signal, through conductor 999, to the wiper assembly to wipe, once the wiper assembly sensor detects that any debris is removed from the plate cooking surface, the sensor will send a signal to the controller. The wiper assembly sensor may take different forms as discussed in FIG. 55. The controller will receive the signal, interpret the signal and determine the next step using its preprogrammed logic. The controller will then send a signal to the conveyer system 240 to start the conveyer belt. The conveyer belt will move forward until the food receptacle 261 reaches its fourth assembling area (as shown in FIG. 41). The fourth assembling area sensor 904 will send a signal, through conductor 999, to the controller once the receptacle is in position. The fourth assembling area sensor may take different forms as discussed in FIG. 55. The controller will receive the signal, and send a signal to the conveyer assembly motor to stop.

Then, using it preprogrammed logic, the controller will send a signal, through conductor 999, to the third movable platform 920 to start delivering the third food component to the third assembling area. The third assembling area sensor 903 will send a signal to the controller, once it detects the third food item to be in the food receptacle 261. The controller 610 will receive the signal, interpret it and determine the next action.

The next action being to start the conveyer assembly moving the food receptacle proximate to the pickup area first element to close the food receptacle, which is further described in FIGS. 56-70. Once the pickup area sensor 905 detects the receptacle is closed, the sensor will send a signal, through conductor 999, to the controller. The controller will receive the signal, and send a signal to the conveyer system 240 to continue moving the conveyer belt so that the closed food receptacle containing a fully assembled cooked food item is positioned inside the pickup area second element and ready to be picked up by the customer. In other embodiments, the location of the pickup area is the same area where the receptacle is closed.

Next, the pickup area sensor 905 will determine if the cooked food item has been properly cooked or not. If not, the sensor will send a first signal, through conductor 999, to the controller. The pickup area sensor may be a temperature sensor to detect the temperature of the food. The pickup area sensor may also be a sensor configured to detect time and how long the cooked food item has been in the pickup area. The pickup area sensor may take different forms as discussed in FIG. 55. If the sensor detects that the food item has been in the area for a predetermined time, the sensor will send a second signal, through conductor 999, to the controller. For example, the predetermined time, may be 1 minute, 5 minutes, 10 minutes etc. If the controller receives either a first or second signal from the pickup area, the controller may send a signal to a motor or actuating device to move the pickup area third element movable panel 325 to open or move downward. The panel 325 moving downward causes, the fully assembled food receptacle 261 to fall into the disposal area (because it has not been cooked properly or has been in the pickup area for too long (over the predetermined amount of time).

FIG. 55 is a schematic diagram of an apparatus and a controller in electrical communication. The apparatus 100 includes at least one controller (illustrated in FIG. 55) is configured for controlling the electrical and mechanical components of the apparatus. As shown in the schematic diagram 600 of FIG. 55, the at least one controller 610 is conductively and communicatively coupled, via a communication bus, to allow communication and conductive coupling to the at least one power source 620, the mechanical components of the apparatus (e.g., spatula assembly, oven, telescoping arm assembly, moveable wiper assembly, etc.), and a plurality of sensors located throughout the apparatus. For instance, as illustrated in the diagram 600, the apparatus 100 includes a plurality of sensors, including a camera 632, a temperature sensor 634, and a time sensor 634. The camera 632 may be used to visually supervise the food preparation process. For instance, the camera may be used as a means of quality control. Artificial intelligence may be used to determine if the prepared food has been prepared in a way that is aesthetically pleasing. If the food is not aesthetically pleasing or fails to meet other visual standards, the apparatus may reject the prepared food and dispose of it. In this way, a strict adherence to quality control may be realized. Furthermore, the apparatus 100 may include a temperature sensor 636. The temperature sensor may be an infrared ("IR") temperature sensor, or any other suitable temperature sensor known in the art. The temperature sensor 636 may be used to determine if a food product has been cooked to the desired, or required (e.g., per health and safety laws) temperature. The time sensor 634 may be a simple digital clock. Based on time-temperature data, the time sensor 634 may be used to determine if a food product has been fully cooked. Moreover, the temperature sensor may be used to determine the temperature of the heated components. Motor 640 (discussed above) is also illustrated. These components of the apparatus 100 may be conductively coupled with the power source 620 via conduit, such as copper (or other suitable material) wire. Similarly, the components may be communicatively coupled (e.g., via the aforementioned communication bus), and conduit such as copper wire may also be used. The least one controller is further configured to receive and monitor sensor data from the plurality of sensors. The plurality of sensors may include additional temperature sensors, positional sensors, optical sensors, tilt sensors, infrared sensors, or the like to determine the status of, or monitor the status of, various aspects of the apparatus. For example, the apparatus may include a sensor to measure the temperature in the oven assembly cooking area, a sensor to detect the stock level of a food item component or food receptacle 261, a sensor to detect the amount of cleaning solution in the cleaning solution container, and a sensor to detect the fill level of the disposal area.

Controller 610 may be configured for controlling the aforementioned electrical and mechanical components (e.g., via the electrical components, such as a motor or actuator). For instance, the controller may be programmed (e.g., via executable code) to perform the operations described above to prepare a cooked food product. For instance, the motor of the telescoping arm assembly may have communicate a position of the telescoping arm to the controller 610. The telescoping arm may communicate an angle of the plate cooking surface 130 to the controller. The angle that is communicated may be discrete (e.g., an open/closed algorithm) or continuous. Controller 610 may be configured for receiving data from the aforementioned sensors, and using a computer algorithm to determine the next steps for the apparatus to take. For instance, a time sensor may be used to determine if a food product has been fully cooked and is ready for subsequent assembly.

In step 470, if either the first signal or second signal is received, the at least one controller 610 sends a disposal signal 670 to the pickup area third element to move the fully assembled cooked food item 316 to the disposal area.

In step 465, the at least one controller determines if a first signal 650 or a second signal 660 is received. The first signal 650 indicates that the closed food receptacle containing the fully assembled cooked food item inside the pickup area second element has not been removed by the customer within the preprogrammed amount of time. The predetermined amount of time takes into account that another food order is placed and must be moved into the pickup area. The second signal 660 indicates that the closed food receptacle containing the fully assembled cooked food item inside the pickup area second element has not satisfied a specific parameter or condition. For example, the second signal could be a signal that is based on temperature, mechanical malfunction, order cancellation, or *E. coli* determination.

Figure 56:
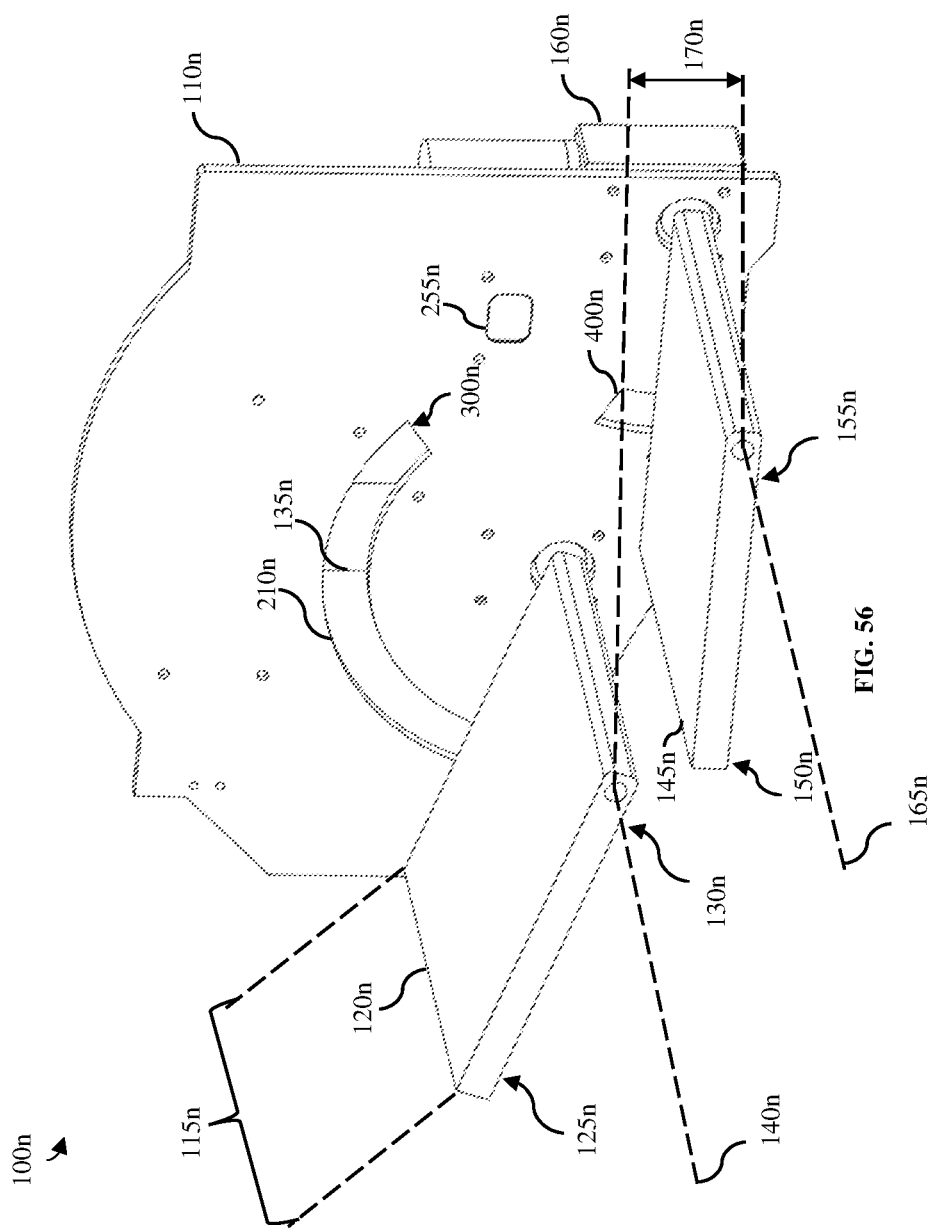
FIG. 56 is a front perspective view of portions of the system including a wall, a first and second panel, a track, and a conveyer channel, according to an example embodiment.

FIGS. 56-70 illustrates the box folding apparatus used to close the box or food receptacle. FIG. 56 illustrates a system 100n for automatically folding a box 105n for fast food delivery. The system comprises a wall 110n, a conveyer channel 115n, a first panel 120n, a second panel 145n, a first panel pivot axis 140n, a second panel pivot axis 165n, a first motor 135n, a second motor 160n, a third sensor 255n, and a track 210n. The figures illustrated here are drawn to scale.

The box 105n may be defined as a container having a base, parallel sides, and a lid. In an ideal embodiment, the box may take the shape of a rectangular prism with a smooth bottom surface and be formed from a single piece of material allowing a lid to fold over the top latching onto a clamp like fastener on the opposite side. The box may be sized to fit the item it is intended to enclose. For example, a hamburger would likely fit into a 3 in×3 in box, however a salad would likely fit into a 5 in×5 in box. Possible materials the box may be formed from include cardboard, Styrofoam™, plastic, foil, kraft paper, etc. In a preferred embodiment, the box may be comprised from an integral piece of recyclable, non-toxic and food safe paper-based material such as corrugated cardboard or may be similarly comprised of biodegradable or compostable materials such as sugarcane, bamboo, and plant-based materials. Additionally, the box may be formed from a single piece of material, or several individual pieces formed or coupled together. The box may be manufactured from a variety of different processes including an extrusion process, folding, molding, forging, rolling, etc. Colors, shapes, sizes, and textures may vary in other embodiments. Furthermore, other materials and manufacturing processes may also be used and are within the spirit and scope of the present invention.

Figure 59:
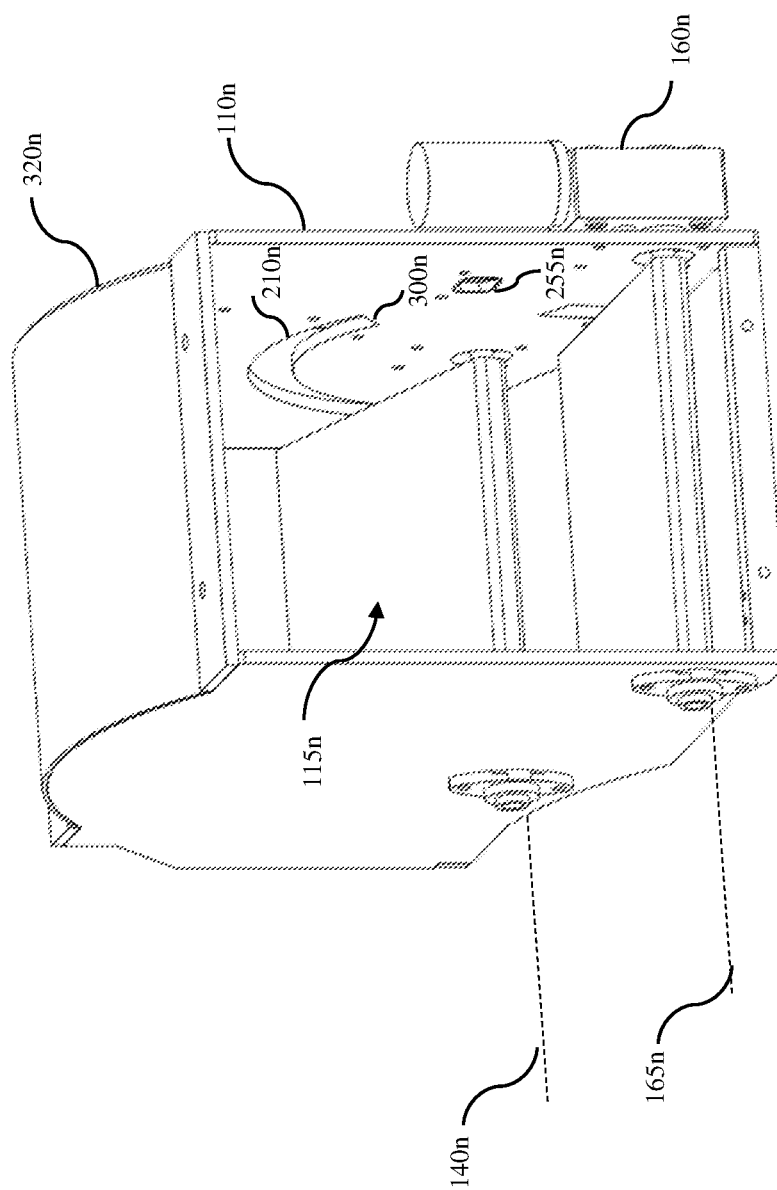
FIG. 59 is a front perspective view of the system including an enclosure and two walls, according to an example embodiment.

The wall 110n may be defined as a planar vertical surface. It is understood that in certain embodiments, there may be more than one wall as illustrated in FIG. 59. The wall contains a track 210n for the first panel and in certain embodiments, and a track 400n for the second panel.

The first track 210n is illustrated, in the figures, as an arc shaped hole in the wall with squared off ends at each physical rotational stop. The first track being located perpendicular to the first panel and having a width slightly greater than the width of the peg. In other embodiments, the track may not cut into the wall at all, for example, a track may be magnetically manufactured having the full path be a magnet in the necessary shape, and having the peg, located on the free end of the panel, instead being a magnet on the edge of the panel. Other variations are also possible such as using pulleys to keep the panel in the correct position, however in other embodiments there may not be a track. A system only having a rotational limiter programmed into the motor or sensors.

Similarly, the second track 400n also can be described as arc shaped having squared ends. The length of the second track is much shorter than the first considering the second panel only has two positions, both being substantially horizontal, one being an up position and the other being a dropped position. Substantially being defined as proximate to, near, or relative to. However, as stated above other embodiments may have track that appear differently. Other forms of tracks may also be used and are within the spirit and the scope of the present invention.

The wall also contains an opening for the first panel arm connecting to the first motor and the second panel connecting to the second motor. In certain embodiments the wall may also contain fastener holes to attach the motors to the wall itself. The wall may be formed from materials such as stainless steel, carbon steel, polypropylene, polycarbonate, glass, etc. The Food and Drug Administration recommend high-density polyethylene (HDPE) or and stainless steel when working with food. The wall may also be manufactured from a variety of different processes including an extrusion process, casting, molding, shearing, and forming, 3D printing, etc. However other material and manufacturing processes may be used and are within the spirit and the scope of the present invention. Colors, shapes, sizes, and textures may also vary in other embodiments.

The third sensor 255n may be oriented to exist on a plane that is parallel and adjacent to the wall and is centered above the second panel. However, the sensor may also be positioned in other ways depending on the type of sensor, the size of the sensor, of the requirements to ensure accuracy. This sensor is configured to detect if the box is disposed on the second panel within the conveyer channel. There are many different sensors available for object detection including electromechanical sensors, capacitive, photoelectric, laser-based sensors, ultrasonic, etc.

Figure 69:
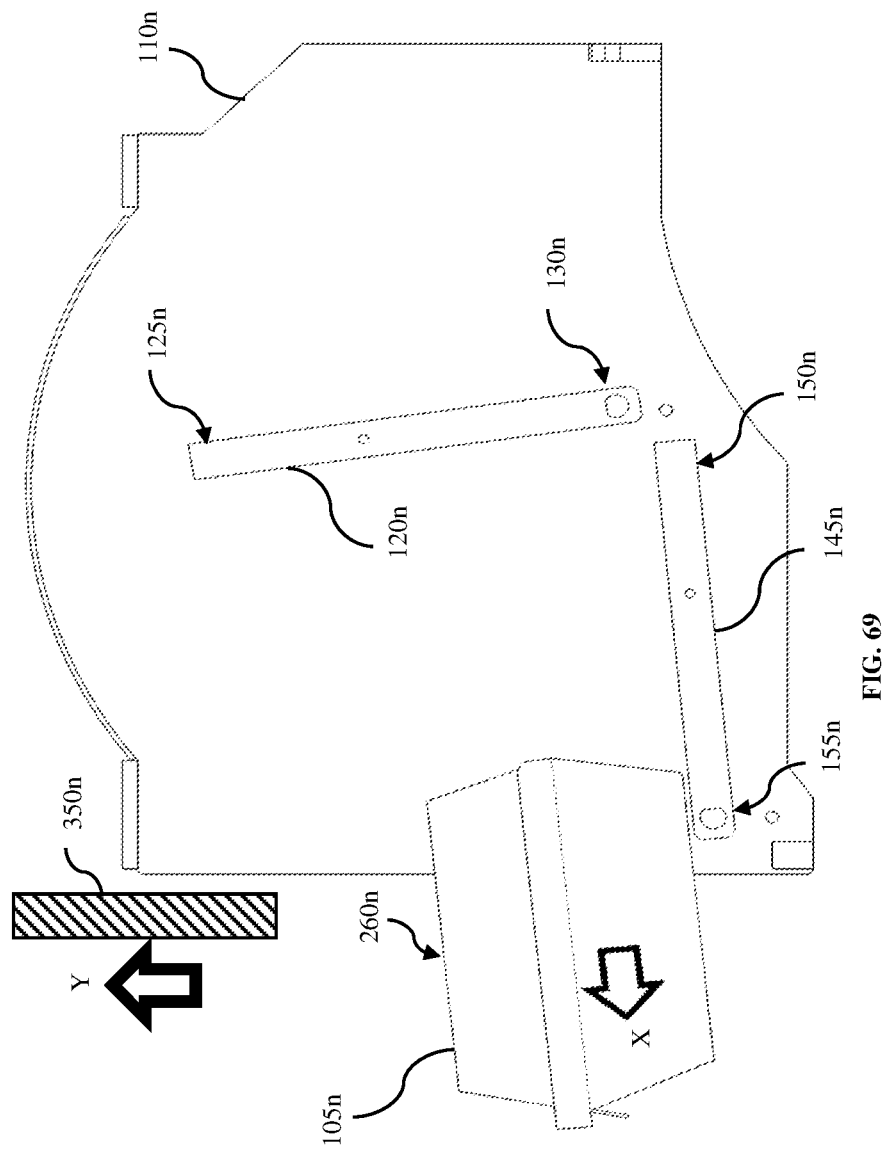
FIG. 69 is a front view of the system including the box leaving the conveyer channel, according to an example embodiment.

The conveyer channel 115n is defined as the path the box follows as it translates through the system and is located adjacent to the wall. In a preferred embodiment, the size of the conveyer channel will be slightly wider than the box's width and slightly longer than the length of the two panels, however in other embodiments the conveyer channel may be arranged differently. Before the box enters the conveyer channel the box may exist on a planar surface adjacent to the first panel first end portion 125n. The box will then be fed through the conveyer channel by an arm 285n. The end of the conveyer channel meets a brace 350n located adjacent to the second panel second end portion 155n. Once the box travels through the conveyer channel and is in its final closed position, the brace will shift up allowing the box to exit the conveyer channel, which is illustrated in FIG. 69.

The first panel 120n being positioned within the conveyer channel contains a first panel first end portion 125n, and a first panel second end portion 130n. The second panel being positioned adjacent to the first panel contains a second panel first end portion 150n and a second panel second end portion 155n. The first panel and second panel are vertically offset such that the first panel second end portion is disposed at a predetermined distance 170n defined by the location of each peg attaching each motor to its panel, measured from the second panel pivot axis 165n to the first panel pivot axis 140n, above the second panel second end portion (as shown throughout the figures and more specifically in FIG. 56). The first and second panels are also horizontally offset such that the first panel second end portion is proximate to, at, near, or close to the second panel first end portion. The panels also are attached to arms connected to a fixed end of the panel, which connect each panel to their respective motor. These arms are located on the first panel pivot axis and the second panel pivot axis. In certain embodiments the system may only include a first panel pivot axis 140n, however in a preferred embodiment both panels will have pivot axes to allow for smooth box translation throughout the conveyer channel.

In a preferred embodiment, the panels will be made from smooth materials allowing the box to translate through the conveyer channel easily, however the panels may be formed from any material ranging from metallic materials, such as carbon steel or stainless steel, to polymeric materials, such as polypropylene or polyurethane. Other materials may also be used. The panels may be manufactured from a variety of different processes including extrusion, casting, molding, folding, welding, shearing, 3D printing, etc. The shape and size of the panels may resemble the shape and size of the box. However, the shape and size may vary depending on the shape and size of the wall, the conveyer channel, the box, etc. Other materials and manufacturing processes may also be used and are within the spirit and the scope of the present invention.

Figure 57:
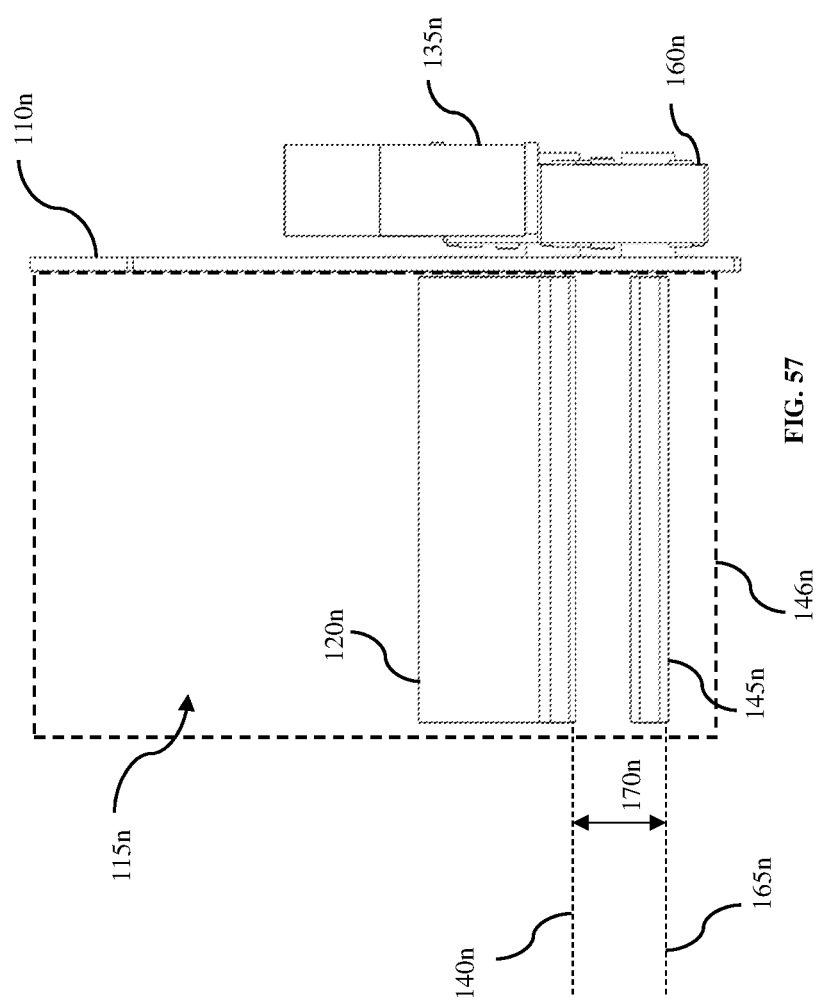
FIG. 57 is a side view of the of portions of the system emphasizing the area of the conveyer channel, and each panels pivot axis, according to an example embodiment.

FIG. 57 is a side view of the system including a wall 110n, a conveyer channel 115n, a first panel pivot axis 140n, a second panel pivot axis 165n, a predetermined distance 170n, a first panel 120n, a second panel 145n, a first motor 135n, and a second motor 160n.

The first motor 135n is in attachment with the first panel second end portion such that the first panel pivots about the first panel pivot axis within the conveyer channel. In attachment with is defined as two objects being joined or fastened to each other in order to secure their connection. Pivot is defined as a central point on which a mechanism turns or oscillates about. The first panel pivot axis is defined as dotted line 140n, originating at the shaft connecting the first motor to the first panel. The second motor is in attachment with the second panel second end portion such that the second panel pivots about the second panel pivot axis within the conveyer channel. The second panel pivot axis is defined as dotted line 165n, originating at the shaft connecting the second motor to the second panel. The present embodiment shows the vertical offset, or a predetermined distance 170n, measured from the second panel's pivot axis 165n to the first panel's pivot axis 140n, between the first panel's pivot axis and second panel's pivot axis. The exact dimension of the distance 170n is approximately 32 mm, however other embodiment may be used and are within the scope of the present invention. The vertical offset is one of the reasons the folding apparatus folds boxes more efficiently. The area of the conveyer channel is depicted by the dashed line 146n in FIG. 57 located adjacent to the wall. Inside the conveyer channel exists the first and second panel's and a box. The channel is adjacent to the wall meaning that the channel is directly next to or adjoining the wall such that the panels discussed herein are disposed within the conveyor channel. The conveyer channel encloses the first and second panel, routing where the box will pass through.

Figure 58:
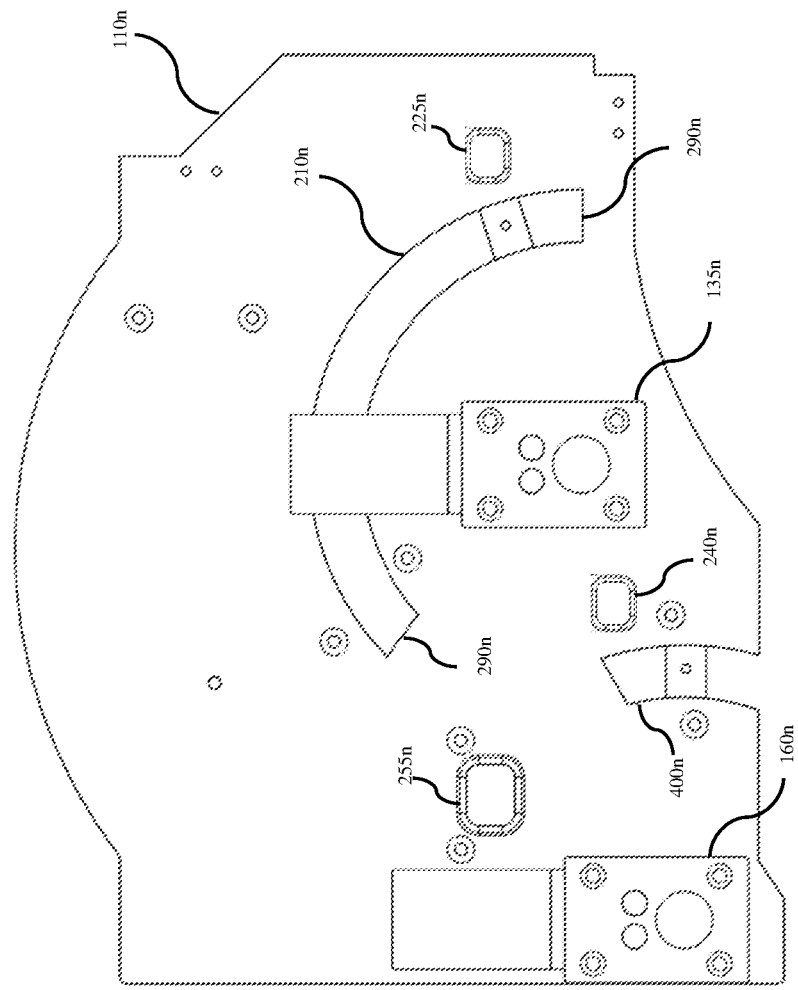
FIG. 58 is a back view of portions of the system including a first and second motor, sensors, a track, and a stop, according to an example embodiment.

FIG. 58 is a back view of the system including a track 210n, a wall 110n, a first motor 135n, a second motor 160n, a sensor 225n, and a rotational stop 290n. In the present embodiment, the rotational stop 290n is shown as the physical start of the track and the physical end of the track and may also be referred to as a physical shaft limiter. Physical shaft limiters act as physical barriers blocking the shaft from continuing motion in the direction its moving. The walls of the rotational stops may engage with the pegs extending from the tracks to act as a mechanical stop. However, there can be negative effects when relying on only physical shaft limiters with automated and repeated processes. For example, structural failure can occur from cyclic loading, in other words a material that is repeatedly stressed and unloaded. As the structural integrity of the material decreases, pieces may crack or break off extending the rotational stop further away from the desired location. These small extensions may build until the shaft rotates too far causing issue within the system or even breakage of the track. Many devices in the automation industry are created for repeated processes and utilize physical shaft limiters as a backup stop.

In other embodiments the rotational stop may be in the form of a sensor in communication with the shafts motor. This would require a sensor at each stopping point to ensure that the box is positioned correctly when the motor stops. In other embodiments, the rotational stop may be programmed into the motor, or use a sensor like an encoder. Another example of a possible sensor may be in the form of the panels planar surface itself measuring and recording the angles at which the panel is at. This type of sensor may be preprogrammed to stop at specific angles ensuring that the surface of the panel is in the correct position. Common sensors used for object detection include electromechanical sensors, capacitive, photoelectric, laser-based sensors, and ultrasonic sensors. Placement of the sensor may be attached to the wall, fed through a hole in the wall, or anywhere within the conveyer channel.

In the present embodiment, a third sensor 255n may be displayed above the second panel to detect if the box is located on the second panel. However, the sensor may also be positioned in other ways depending on the type of sensor, the size of the sensor, of the requirements to ensure accuracy. A sensor 240n, may be located along the second panel's track to detect if the second panel is positioned in a second track position 250n, and a first sensor 225n configured to detect if the first panel is positioned at the first track position. In other embodiments the sensor may be located in other positions to that it may properly detect the location of the second panel's.

The first motor 135*n* is in attachment with the first panel second end portion such that the first panel pivots about the first panel pivot axis within the conveyer channel. The second motor 160*n* is in attachment with the second panel second end portion such that the second panel pivots about the second panel pivot axis within the conveyer channel. Motors used in the system may include electric motors driven by alternating currents of direct currents, etc.

FIG.59 is a perspective view of the system including an enclosure 320*n*, also referred to as housing, a conveyer channel 115*n*, a first panel pivot axis 140*n*, a second panel pivot axis 165*n*, a track 210*n*, a wall 110*n*, and a second motor 160*n*. The first panel, the second panel, the wall, and the conveyer channel are at least partially housed in the enclosure. The housing may be comprised of metallic material such as carbon steel, stainless steel, aluminum, Titanium, other metals or alloys, composites, ceramics, polymeric materials such as polycarbonates, such as Acrylonitrile butadiene styrene (ABS plastic), Lexan™, and Makrolon™. other materials having waterproof type properties. The housing may be made of other materials and is within the spirit and the disclosure. The housing may be formed from a single piece or from several individual pieces joined or coupled together. The components of the hosing may be manufactured from a variety of different processes including an extrusion process, a mold, casting, welding, shearing, punching, folding, 3D printing, CNC machining, etc. However, other types of processes may also be used and are within the spirit and scope of the present invention.

FIG. 59, illustrates those two walls, the conveyer channel, and the enclosure may be used. The first panel axis 140*n* and second panel axis 165*n* are aligned with the arm, or shaft, of the motor attached. In certain embodiments the panels may be attached to both walls by use of pegs, shafts, arms, etc. aligned on the pivot axes.

Figure 60:
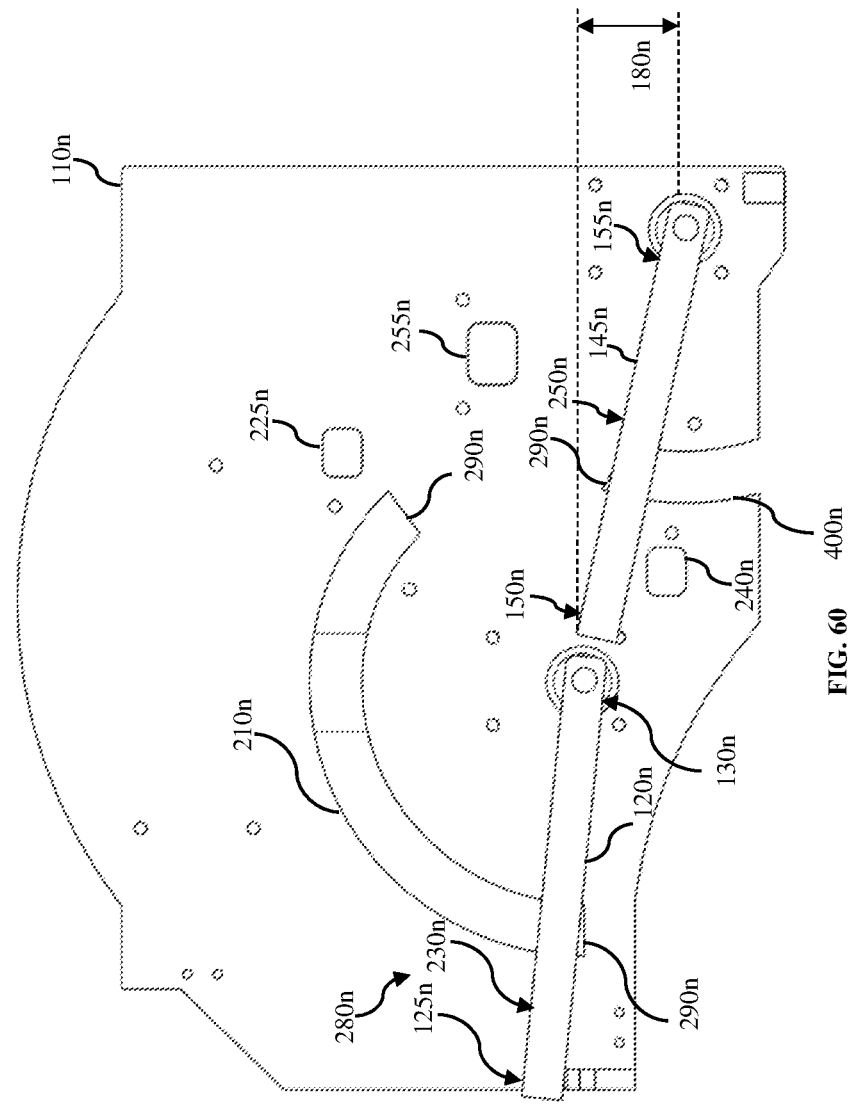
FIG. 60 is a front view of the system having panels oriented in a beginning position, according to an example embodiment.

FIG. 60 is a front view beginning position of the system including a wall 110*n*, a first panel 120*n* having a first panel first end portion 125*n* and a first panel second end portion 130*n*, a second panel 145*n* having a second panel first end portion 150*n* and a second panel second end portion 155*n*, a track 210*n*, a rotational stop 290*n*, a first sensor 225*n*, a second sensor 240*n*, and a third sensor 255*n*. FIG. 59 illustrates the first position or beginning position of the system.

The first panel is positioned in a first panel first track position 230*n* where the first panel is substantially horizontal, and the first panel first end portion is in contact with a stop 290*n*. The second panel is arranged at a first height 180*n*, measured from the second panel's pivot axis 165*n* to the end of the panels second portion, such that the second panel first end portion is adjacent to the first panel second end portion and is in contact with a stop 290*n* or close to the stop. The second panel first end portion is adjacent to the first panel second end such that the box may slide from the first panel to the second panel. This position may be used in the systems first and third position. The first sensor is configured to detect if the first panel is positioned in either a first panel first track position 230*n* or a first panel second track position. The first sensor may consist of two sensors, one for each position on the first panel's track, or in other example embodiments may only have one first sensor. In the present embodiment, the first panel is at the first panel first track position.

The second sensor is configured to detect if the second panel is positioned in either a second panel first track position 245*n* or a second panel second track position 250*n*. In the present embodiment as illustrated in FIG. 60, the second panel is at a second panel second track position. Like the first sensor, the second sensor may consist of two sensors place at each track position or may only one second sensor. Lastly, the third sensor is positioned above the second panel configured to detect if the box is disposed on the second panel.

Figure 61:
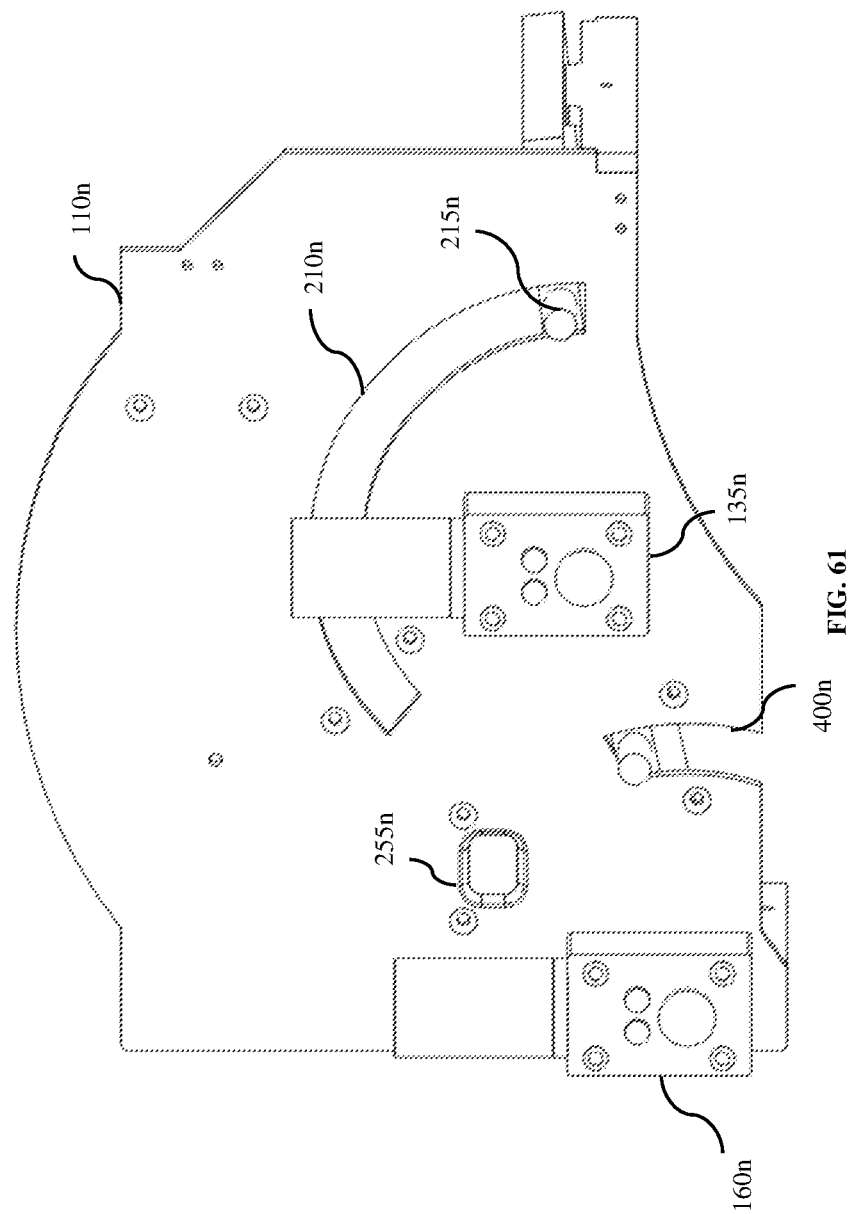
FIG. 61 is a back perspective view of the system including a peg, a stop, and a track, according to an example embodiment.

FIG. 61 is a back perspective view of the system including a first motor 135*n*, a second motor 160*n*, a peg 215*n*, a third sensor 255*n*, and a track 210*n*. The peg, located on the free end of the panel, comprises of a first portion of a peg attached to the first panel first end portion and a second portion of the peg which is positioned within the track. The peg follows the path of the track and comes into contact with the end of the track in specific positions. In the present embodiment the track and the peg define the rotational stop. In the present embodiment, the peg is in the form of a cylindrical rod, however in other embodiments the peg may appear differently. For example, the track may include an inner grove sized to fit a roller in connection with the panel. This may result in a smoother movement between positions. The peg may be comprised of metallic material such as carbon steel, stainless steel, aluminum, Titanium, other metals or alloys, composites, ceramics, polymeric materials such as polycarbonates, such as Acrylonitrile butadiene styrene (ABS plastic), Lexan™, and Makrolon™. The peg may also be made of other materials and is within the spirit and the disclosure. The peg may be manufactured from a variety of different processes including an extrusion process, a mold, casting, welding, shearing, punching, folding, 3D printing, CNC machining, etc. However, other types of processes may also be used and are within the spirit and scope of the present invention. The third sensor may be positioned within the wall above the second panel and is configured to detect if the box is within the conveyer channel on the second panel. However, the sensor may also be positioned in other ways depending on the type of sensor, the size of the sensor, of the requirements to ensure accuracy. The sensor may be in the form of an optical detection sensor including electromechanical, pneumatic, magnetic, capacitive, photoelectric (transmitting beam of light, and detecting the object based on the reflected light), ultra-sonic (using sound waves), laser-based sensors, LED based sensors, etc. In other example embodiments, the sensor may be in the form of a weight sensor measuring the load on the second panel. Examples of weight sensors include strain gauges, capacitance, hydraulic, pneumatic, etc.

Figure 62:
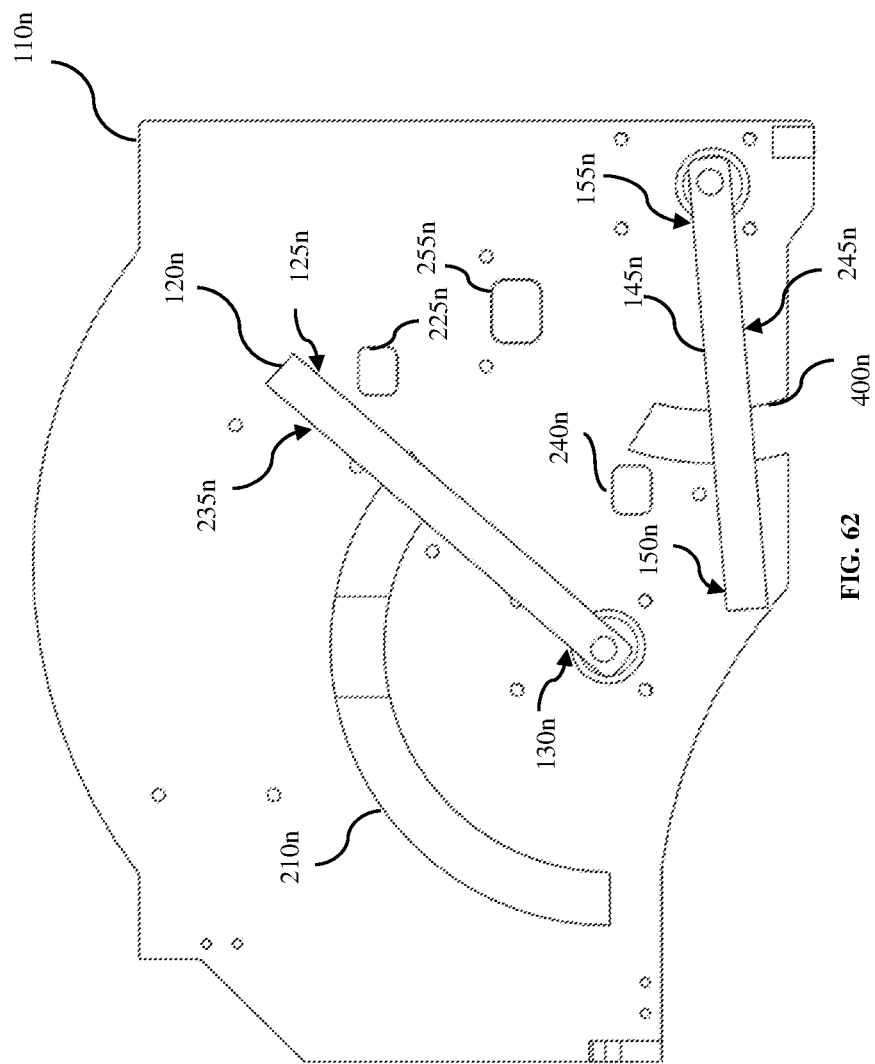
FIG. 62 is a front view of the system having panels oriented in an ending position, according to an example embodiment.

FIG. 62 is a front view of the system including a wall 110*n*, a first panel 120*n* having a first panel first end portion 125*n* and a first panel second end portion 130*n*, a second panel 145*n* having a second panel first end portion 150*n* and a second panel second end portion 155*n*, a track 210*n*, a first sensor 225*n*, a second sensor 240*n*, and a third sensor 255*n*. FIG. 62 illustrates an ending position or fifth position. In the fifth position or ending position, the first panel is positioned in a first panel second track position 235*n*, this position will be used in the systems fifth position, and the second panel is positioned in a second panel first track position 245*n*. In the current embodiment the sensor and the motor define the rotational stop, in other embodiments the rotational stop may be in the form of an encoder or a mechanical stop such as the peg, located on the free end of the panel, within the track.

Figure 66:
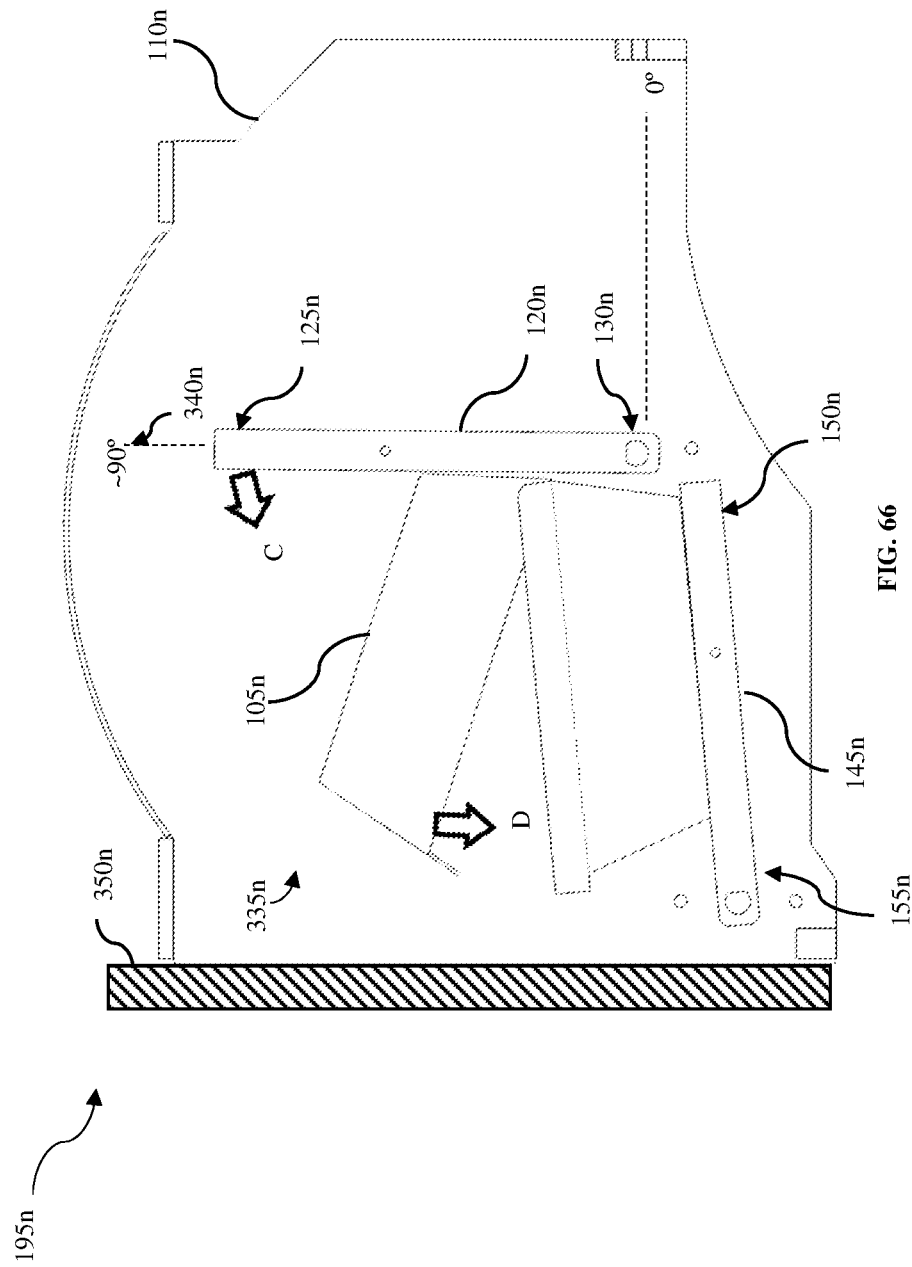
FIG. 66 is a front view of the system oriented in a third position with a box in a partially closed state on the second panel and the first panel substantially vertically arranged, according to an example embodiment.
Figure 68:
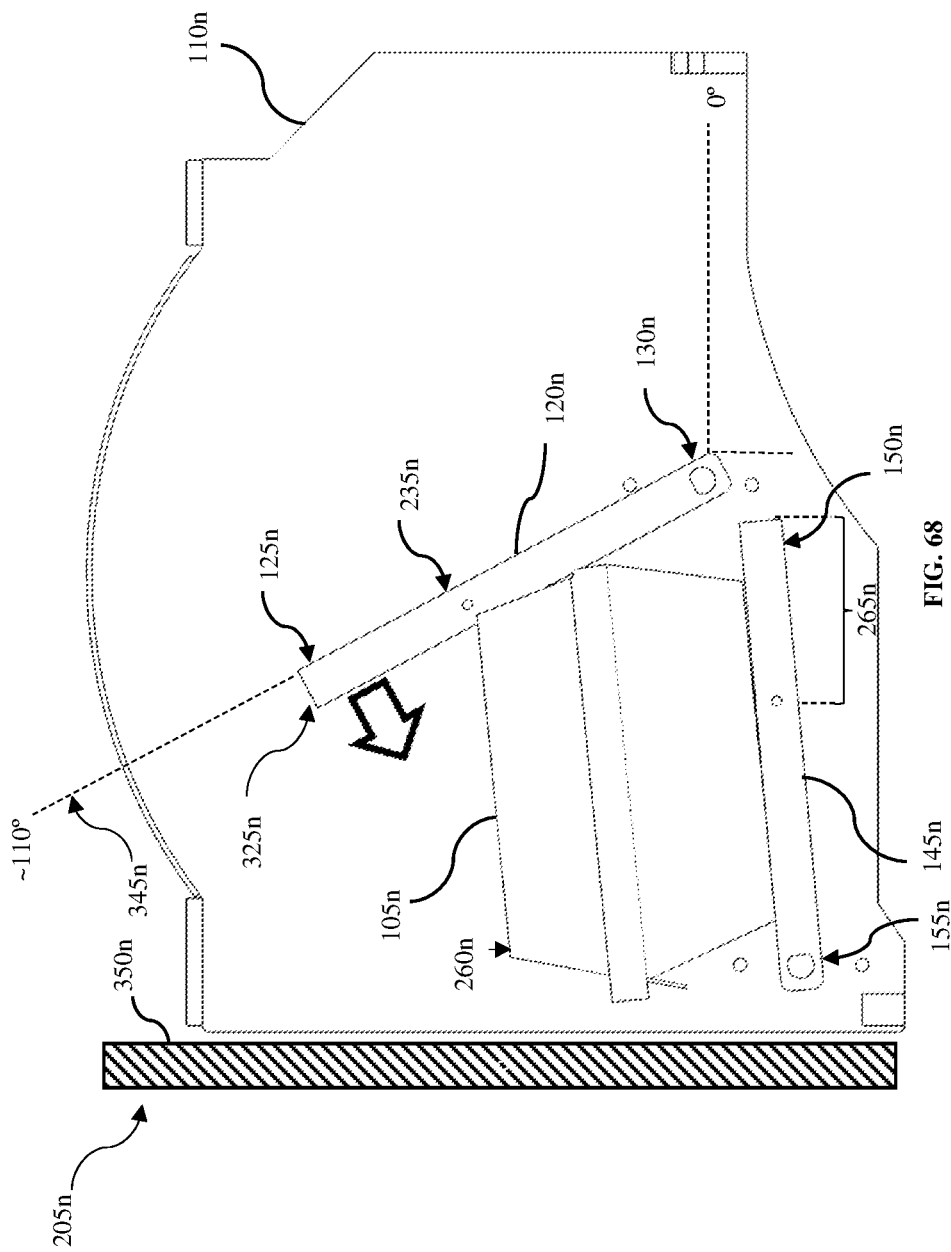
FIG. 68 is a front view of the system oriented in a fifth position with a box in a folded configuration, according to an example embodiment.

The first sensor (225*n* and or 225*n*(*a*)) is configured to detect if the first panel is positioned in a first panel first track position 340*n*, as illustrated in FIG. 66, or a first panel second track position 345*n*, as illustrated in FIG. 68. It is also understood that the first sensor may be used to detect various positions of the first panel as identified in the figures. The first sensor may be comprised of two separate sensors located at each stopping position or may be a single sensor capable of detecting the panels movement across the entirety of the track. Furthermore, the sensor may be in the form of an encoder. An encoder is defined as an electro- mechanical motion sensor device providing the user with information on velocity, direction, and position. Examples of optical detection sensors may include electromechanical, pneumatic, magnetic, capacitive, photoelectric (transmitting beam of light, and detecting the object based on the reflected light), ultra-sonic (using sound waves), laser-based sensors, LED based sensors, etc. The first sensor is in communication with the first motor and the processor. This connection allows the sensor to detect the motion of the panel, send that information to the processor or computing device, have the processor analyze the information and send a command to the motor.

The second sensor (240*n* and or 240*n(a)*) is configured to detect if the second panel is positioned in a second panel first track position or a second panel second track position or in other track positions. The second sensor may be comprised of two separate sensors located at each stopping position or may be a single sensor capable of detecting the panels movement across the entirety of the track. It is also understood that the second sensor may be used to detect various positions of the second panel as identified in the figures. Furthermore, the sensor may be in the form of an encoder. An encoder is defined as an electro-mechanical motion sensor device providing the user with information on velocity, direction, and position. Examples of optical detection sensors may include electromechanical, pneumatic, magnetic, capacitive, photoelectric (transmitting beam of light, and detecting the object based on the reflected light), ultra-sonic (using sound waves), laser-based sensors, LED based sensors, etc. The second sensor is in communication with the second motor and the processor. This connection allows the sensor to detect the motion of the panel, send that information to the processor or computing device, have the processor analyze the information and send a command to the motor, being connected to the panel by an arm.

The third sensor 255*n* may be positioned above the second panel in either a wall or enclosure ceiling, configured to detect if the box is disposed on the second panel within the conveyer channel. However, the sensor may also be positioned in other ways depending on the type of sensor, the size of the sensor, of the requirements to ensure accuracy. This sensor may be in communication with the processor, through conductors while also being in communication with the brace motor, having the sensor detect when the box is ready to leave the conveyer channel. In an example embodiment the sensor may be in the form of an optical detection sensor including electromechanical, pneumatic, magnetic, capacitive, photoelectric (transmitting beam of light, and detecting the object based on the reflected light), ultra-sonic (using sound waves), laser-based sensors, LED based sensors, etc. In other example embodiments, the sensor may be in the form of a weight sensor measuring the load on the second panel. Examples of weight sensors include strain gauges, capacitance, hydraulic, pneumatic, etc.

Figure 63:
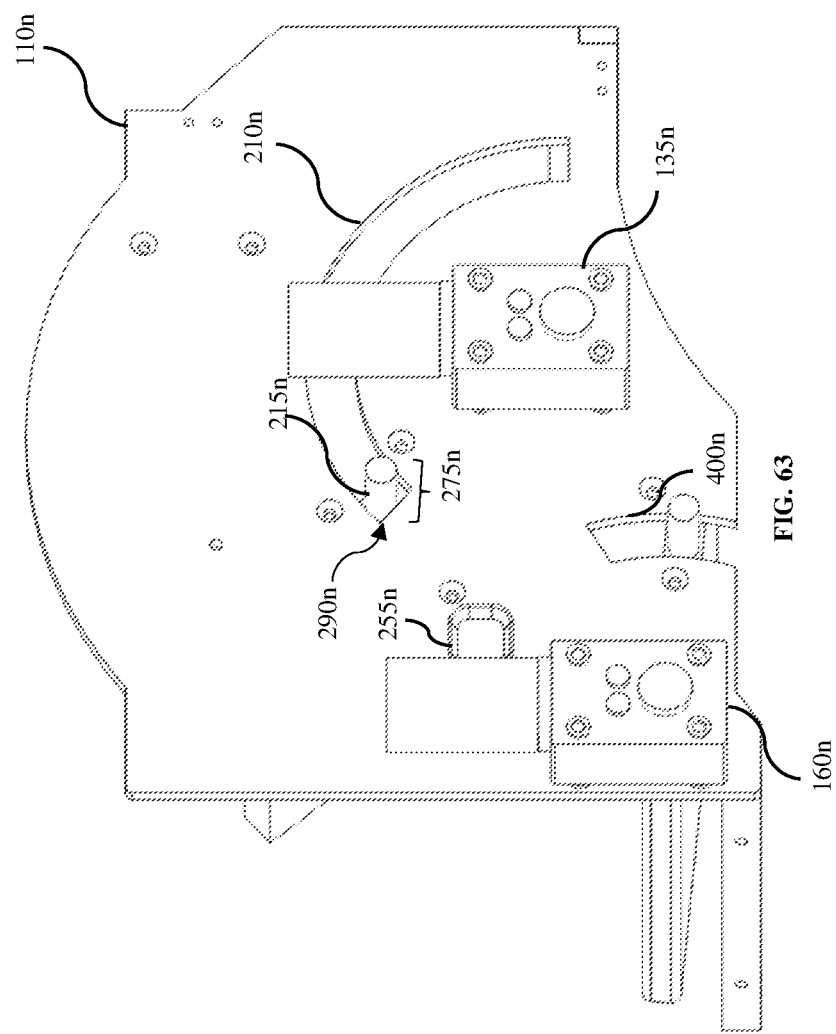
FIG. 63 is a back perspective view of a second example embodiment of the system, according to an example embodiment.

FIG. 63 is a back perspective view of the system illustrating a second portion 275*n* of the peg 215*n* disposed within a track 210*n*. The present embodiment includes a wall 110*n*, the track, a peg 215*n*, a sensor 255*n*, a first motor 135*n*, a second motor 160*n*, and a stop 290*n*. Similarly, to FIG. 61, the present example embodiment illustrates a second portion of a peg located within the track. The peg is in contact with the rotational stop while in a first panel second track position. In certain embodiments, the peg may comprise a portion of the rotational stop. The peg follows the path of the track and comes into contact with the rotational stop in specific positions, such as illustrated in FIG. 63, wherein the peg 275*n* is in contact with the physical stop 290*n* when the first panel is in the first panel second track position. In the present embodiment, the peg is in the form of a cylindrical rod, however in other embodiments the peg may appear differently. For example, the track may include an inner grove sized to fit a roller in connection with the panel. This may result in a smoother movement between positions. The peg may be comprised of metallic material such as carbon steel, stainless steel, aluminum, Titanium, other metals or alloys, composites, ceramics, polymeric materials such as polycarbonates, such as Acrylonitrile butadiene styrene (ABS plastic), Lexan™, and Makrolon™. The peg may also be made of other materials and is within the spirit and the disclosure. The peg may be manufactured from a variety of different processes including an extrusion process, a mold, casting, welding, shearing, punching, folding, 3D printing, CNC machining, etc. However, other types of processes may also be used and are within the spirit and scope of the present invention.

Figure 64:
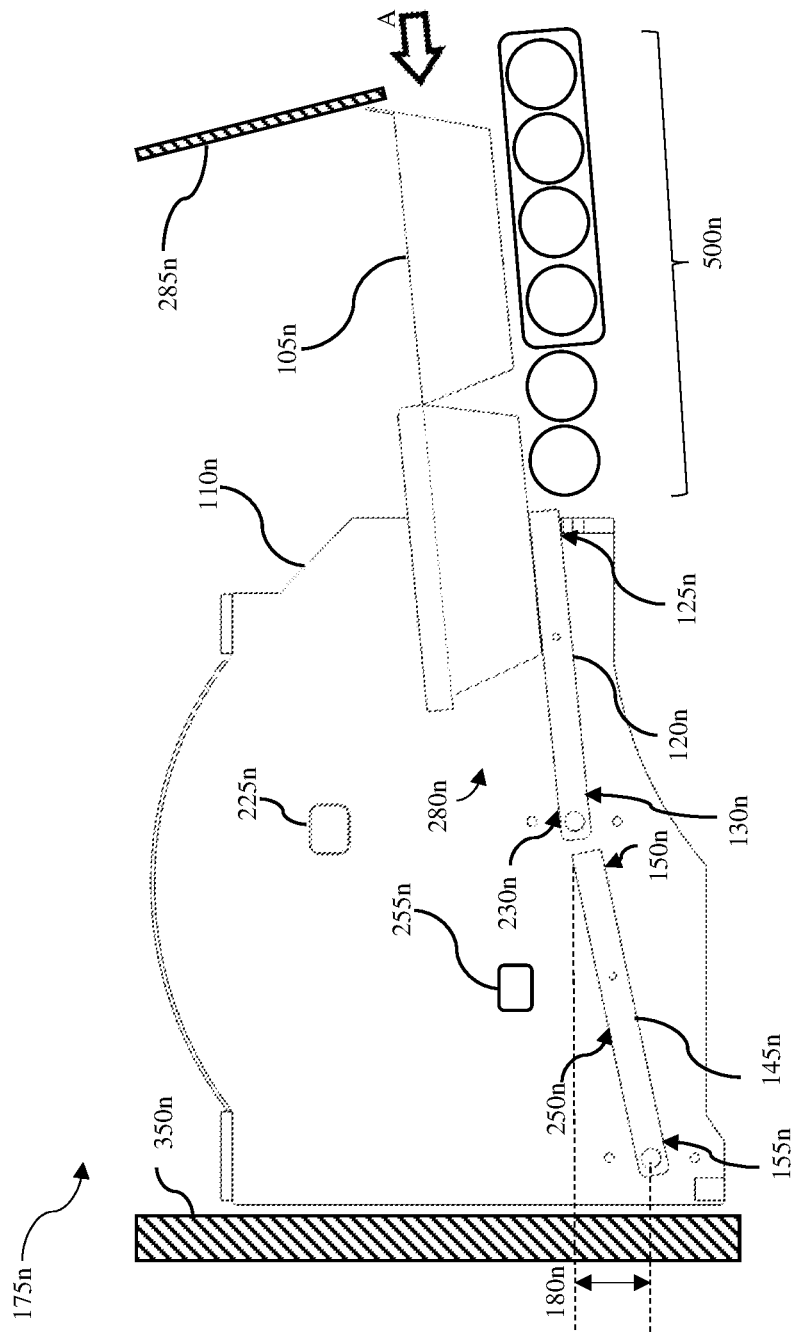
FIG. 64 is a front view of portions of the system oriented in a first position with a box partially positioned on the first panel, according to an example embodiment.

FIG. 64 is a front view of the system oriented in a first position 175*n*, including a first panel 120*n* having a first panel first end portion 125*n* and a first panel second end portion 130*n*, a second panel 145*n* having a second panel first end portion 150*n* and a second panel second end portion 155*n*, a wall 110*n*, a first sensor 225*n*, a third sensor 255*n*, a box 105*n*, and a conveyer belt 500*n*.

The first position or beginning position 280*n* comprises the second panel first end portion at a first height 180*n*, measured from the second panel's pivot axis 165*n* to the end of the panels second portion, such that the second panel first end portion is adjacent to the first panel second end portion. In the beginning position 280*n* the first may be adjacent to an arm 285*n*, where the arm is located proximate to the first panel such that the arm feeds the box along the conveyer belt and into the conveyer channel in direction A. The conveyer belt may a series of rollers, a smooth surface, a food grade conveyer belt, etc.

The arm may be in the form of a mechanical device that allows for movement between a rearward position and a forward position. A forward position thrusting the unfolded box forward into the conveyer channel. The size and shape of the arm may vary in different embodiments, for example in certain embodiments the arm may be a cylindrical rod with a flat surface attached to the end.

Additionally, a door or brace 350*n* is located at the end of the conveyer channel, specifically, adjacent to the second panel second end portion. The brace will keep the box from continuing forward once on the second panel. The brace may be in the form of a panel, a door, a bar or rod, a bracket, any planar surface able to block an area, etc.

The first sensor is configured to detect if the first panel is positioned in at least one of a first panel first track position 230*n* or first panel second track position. However, the first sensor may also be configured to detect multiple positions of panel relative to the track. In the first position of the system, the first panel is positioned in the first panel track position. In the first position, the first is relatively or substantially horizontal having the first panel first end portion in contact with a stop 290*n*. In other embodiments, the first panel may not be in contact with the stop in the first position. The first position allows the box to be slide into the channel. Additionally, the first position of the system may also be known as a beginning position 280n having the first panel first end portion adjacent to the rotational stop and having the second panel first end portion at a first height 180n, measured from the second panel's pivot axis 165n to the end of the panels second portion, such that the second panel first end portion is adjacent to the first panel second end portion (as illustrated in FIG. 64). The first sensor may be comprised of two separate sensors located at each stopping position or may be a single sensor capable of detecting the panels movement across the entirety of the track. Furthermore, the sensor may be in the form of an encoder. An encoder is defined as an electro-mechanical motion sensor device providing the user with information on velocity, direction, and position. Examples of optical detection sensors may include electro-mechanical, pneumatic, magnetic, capacitive, photoelectric (transmitting beam of light, and detecting the object based on the reflected light), ultra-sonic (using sound waves), laser-based sensors, LED based sensors, etc. The first sensor is in communication with the first motor and the processor. This connection allows the sensor to detect the motion of the panel, send that information to the processor or computing device, have the processor analyze the information and send a command to the motor, being connected to the panel by an arm.

Figure 65:
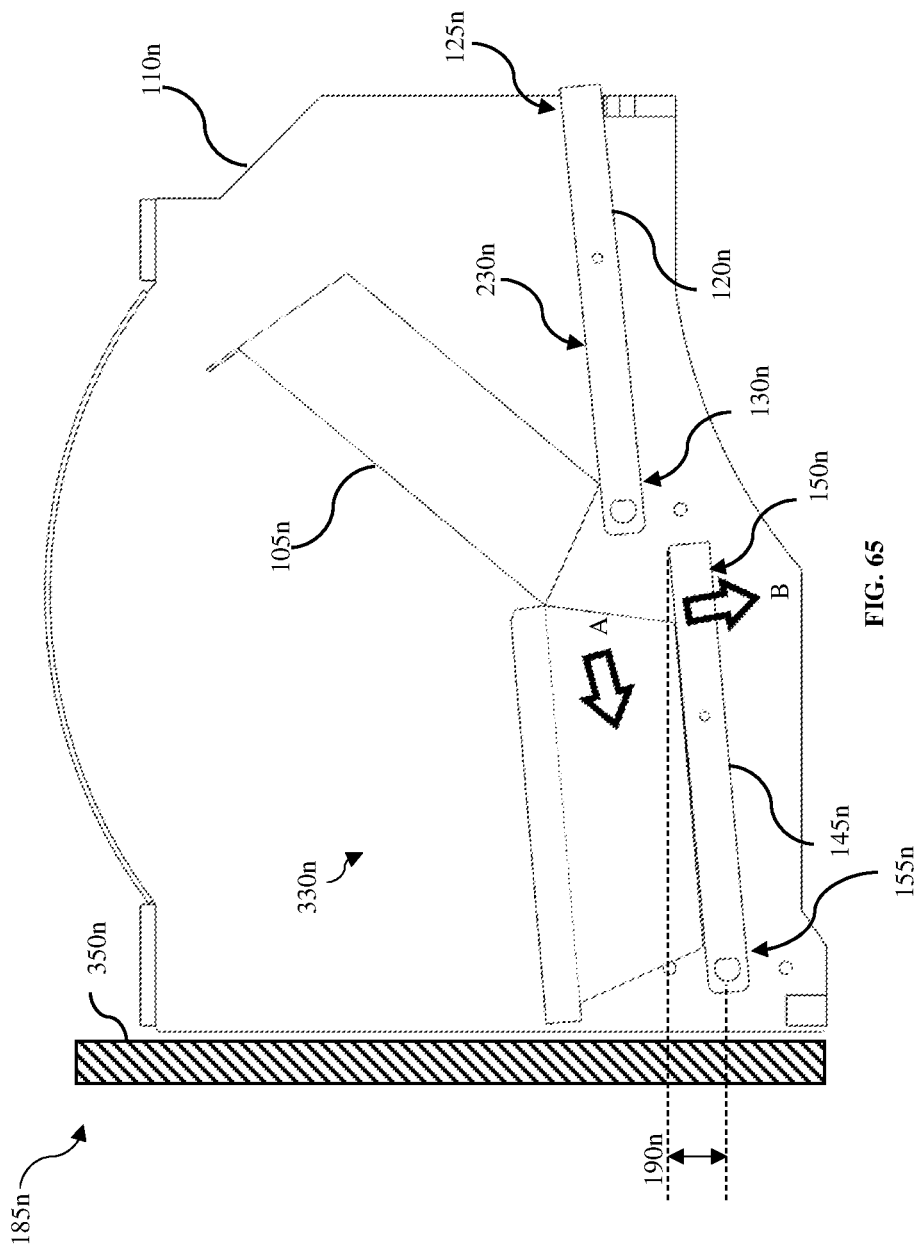
FIG. 65 is a front view of the system oriented in a second position with a box positioned on the first panel and second panel, according to an example embodiment.

FIG. 65 is a front view of the system oriented in a second position 185n, including a brace 350n, a box 105n, a first panel 120n with a first panel first end portion 125n and a first panel second end portion 130n, a second panel 145n with a second panel first end portion 150n and a second panel second end portion 155n, a wall 110n, and a first panel first track position 230n. While in the second position, the box is located on the second panel.

The arm, shown in FIG. 64, pushes the box forward in direction A with a force great enough to enable the box to slide over the first panel and onto the second panel, and having the brace stop the box from continuing its path. Once the base of the box is stationary on the second panel and the lid of the box is stationary on the first panel, a second position 330n will take place. The second position includes the second panel first end portion lowered to a second height 190n, measured from the second panel's pivot axis 165n to the end of the panels second portion, such that the second panel first end portion is below the first panel second end portion. By lowering the second panel first end portion in direction B to the second height (as illustrated in FIG. 65), the lid of the box begins to rotate about the first panel pivot axis while simultaneously creases the portion of the box connecting the lid to the base. The box experiences compressive forces directed toward the seam decreasing the stiffness of the material in that area.

The example embodiment represents a preferred embodiment of the box and panels. The box being a clamshell box shaped to fit a fully assembled hamburger, and the panels being shaped similarly to the shape of the box base and being sized only slightly larger than the base dimensions of the box. However, other box designs and panel designs are possible and are within the spirit and the scope of the present invention.

FIG. 66 is a front view of the system oriented in a third position 195n including a box 105n, a wall 110n, a first panel 120n having a first panel first end portion 125n and a first panel second end portion 130n, a second panel 145n having a second panel first end portion 150n and a second panel second end portion 155n, a brace 350n, a first rotational position 340n, and more broadly, a third position 335n. The third position of the system includes the first panel being substantially vertically arranged in the first rotational position which may be roughly 90degrees relative to its original position. By rotating the first panel first end portion about the first panel axis in direction C, the boxes lid starts moving downward in direction D. The brace holds the base of the box stationary while the first panel forces the lid downward. This position is used to crease the portion of the material connecting the box lid to the box base.

Figure 67:
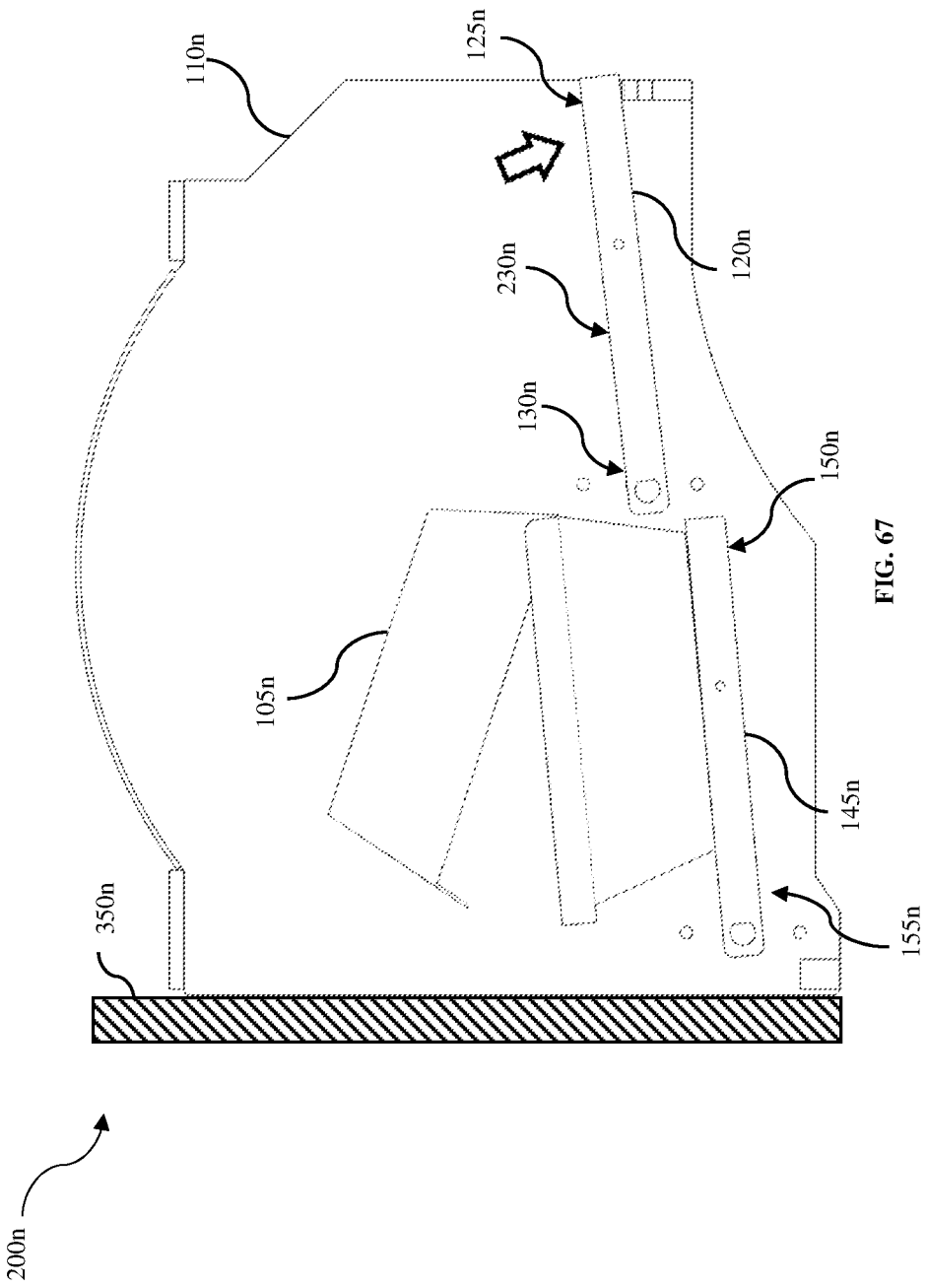
FIG. 67 is a front view of the system oriented in a fourth position with a box in a closed state on the second panel, according to an example embodiment.

FIG. 67 is a front view of the system oriented in a fourth position 200n, including a box 105n, a wall 110n, a brace, 350n, a first panel 120n having a first panel first end portion 125n and a first panel second end portion 130n, a second panel 145n having a second panel first end portion 150n and a second panel second end portion 155n. The fourth position includes the first panel being substantially horizontally arranged in a first panel first track position 230n. The first panel rotates about the first panel axis in the direction E, stopping when the first end portion of the first panel makes contact with the stop, and the first sensor detects the position in the track to turn off the motor. In this position, the first motor begins building a great amount of force needed to rotate the first panel allowing it to reach its fifth position, a winding up period if you may. The box and the second panel remain stationary during this position.

FIG. 68 is a front view of the system oriented in a fifth position 205n or ending position including a box 105n, a wall 110n, a brace, 350n, a first panel 120n having a first panel first end portion 125n and a first panel second end portion 130n, a second panel 145n having a second panel first end portion 150n and a second panel second end portion 155n. The fifth position includes the first panel first end portion positioned over the second panel first end portion creating a box closed position 260n having the first panel first end portion located over at least a portion of the second panel first end portion 265n. The box closed position further includes an ending position 325n having the first panel first end portion adjacent to a rotational stop 290n. For reference, the figure depicts the angle at which the first panel rotates in order for the first panel first end portion to be positioned above a portion of the second panel first end portion 265n. The brace ensures that the base of the box is stationary while the lid of the box folds and latches onto the base.

While in fifth position configuration, the box is now in a box-closed position 260n with the first panel first end portion disposed over at least a portion of the second panel first end portion 265n. Once the brace is lifted upward in direction Y, the box may slide out of the conveyer channel in direction X. In a preferred embodiment, the second panel would be manufactured to have a smooth surface layer allowing the box to easily slide from the second panel to a possible retrieving device outside of the conveyer channel. The braces movement may be powered by a motor using the third sensor to detect when the box is closed on the second panel or may contain an encoder inside the motor. Other embodiments may use a brace in communication with a timer triggering when to translate up and when to translate down.

FIG. 69 is a front view of the system illustrating a box 105n leaving the conveyer channel. This embodiment includes a box 105n, a brace 350n, a wall 110n, a first panel 120n having a first panel first end portion 125n and a first panel second end portion 130n, and a second panel 145n having a second panel first end portion 150n and a second panel second end portion 155n. After the system detects that, using the third sensor that the box is no longer in the channel, the processer may send signals to the appropriate electrical components so that the components may move the first panela and second panel back to the first position or beginning position (as illustrated in FIG. 60) so that it may receive another box.

Figure 70:
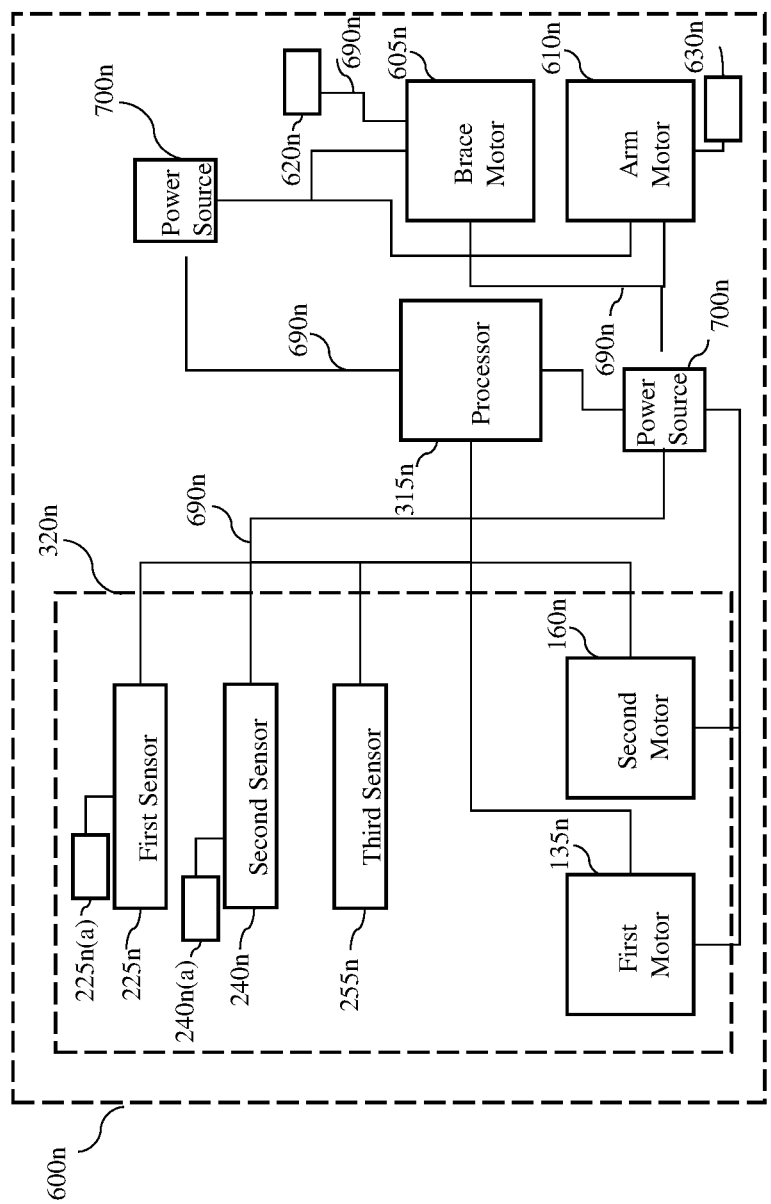
FIG. 70 is a block diagram of an example embodiment of the system, according to an example embodiment.

FIG. 70 is a block diagram of an example embodiment of the system. The system may be contained within the housing of a vending machine 600n. Some of the system's components may be contained within an enclosure 320n. The system has a processor 315n, a brace motor 605n, and an arm motor 610n. However, other embodiments, may be used and within the spirit and scope of the present invention. In one embodiment, the system includes a first sensor 225n, a second sensor 240n, a third sensor 255n, a first motor 135n, and a second motor 160n. As explained throughout the application, the first sensor and second sensor may include more than sensor (further explained below) for detecting the positions of the panels.

The process begins with a sensor 630n configured to detect that a box is positioned before the conveyor channel and that a box is in position to move into the box folding part of the system. At this step in the process, the system is in a first position or beginning position (as further explained above and as illustrated in FIG. 64). The senor 630n sends a signal, through a conductor 690n, to the processor 315n that the box is in position and ready to be folded. The processer receives the signal and determines that the box is ready to be folded, and then sends a signal, through a conductor 690n, to a motor 605n that controls movement of the arm 285n forcing the box into the conveyer channel. The motor 610n then forces the arm to move the box 105n into the channel such that the box is positioned over the first panel 120n, and onto the second panel 145n. As mentioned above, in the first position, the second end 130n of the first panel 120n is proximate to or adjacent to the first end 150n of the second panel 145n (as illustrated in FIG. 63) so that the box may easily slide onto the second panel. Proximate to or adjacent to meaning the panels edges being close enough in location to each other creating a smooth path for the box to follow so that the box may slide or move from the first panel to the second panel. The box will experience a force applied by the arm mechanism pushing the box over the first panel and onto the second panel. In certain embodiments, the brace will then exert an equal and opposite force onto the box forcing the box to become stationary on the second panel. The third sensor 255n may detect when at least a portion of the box is on the second panel. The sensor 255n may then send a signal to the processor 315n when at least a portion of the box is on the second panel.

After the processer receives the signal that at least a portion of the box is on the second panel, the processer may determine, using preprogrammed logic to move the panels of the system to the second position. To move to the second position, the processor will send a signal, through the conductor 690n, to the motor 160n. The motor 160n receives the command from the processor to start the motor so that first end of the second panel may be lowered to a second panel second track position. The second track 400n may be described as arc shaped having squared ends. The length of the second track is much shorter than the first considering the second panel only has two positions both being substantially horizontal. However, as stated above other embodiments may have track that appear differently. The second peg that may fit inside the second track may be attached to the free end of the panel. Other forms of tracks may also be used and are within the spirit and the scope of the present invention.

The motor may be in the form of a conventional electric motor having rotational motion, or a linear actuator having forward and backward motion. Both are applicable to the present system, for example linear actuators may use the push and pull motion to tip the panel in the direction and angle needed, whereas a conventional electric motor will rotate the panel about the shafts axis in the direction and angle needed. Other motors may also be used and are within the spirit and scope of the present invention. The first end of the second panel, which is not fixedly attached to the wall, will begin lowering to a second position (as illustrated in FIG. 65). Once the second sensor (240n and/or 240n(a)) detects that the second panel is lowered to the predetermined height 190n (measured from the second panel's pivot axis 165n to the end of the panels second portion) of the second position, the sensor (240n and/or 240n(a)) will transmit a signal, through a conductor 690n, to the processor. After, the signal is received, the processor will determine, using its preprogrammed logic, to send a signal to the second motor to stop. At this point, the system is in a second position (as further explained above and as illustrated in FIG. 65).

Next, the system will move the panels to the third position. To move from the second position to the third position, after the processor, using its preprogrammed logic based on information from the sensors, the processor will then send a signal, through a conductor 690n to the first motor to start to rotate the first end of the first panel of the first panel upward. After, the signal is received, the motor 135n will start the first motor. As explained above, the motor may be in the form of a conventional electric motor or may also be a linear actuator. In one embodiment 315n, the motor will be operating in rotational motion therefore in the form of a conventional electric motor. The processor will send a signal to the first motor to start the motor. After receiving the signal, the motor will interpret and follow the action required. The action required being to start the motor. The first motor will begin rotating the first panel about its axis until the first sensor (225n and/or 225n(a)) detects the first panel to be at a first panel first track position. In this position, the first panel should be substantially vertically arranged (as illustrated in FIG. 66). Once the sensor detects that the panel is in the substantially vertically arranged position, the sensor (225n and/or 225n(a)) will send a signal, through a conductor 690n, to the processor. After the signal is received, the processor will utilize its preprogrammed logic to interpret the signal and determine what the next step is. At this point the next step is to stop the first motor. The processor will then send a signal, through the conductor 690n, to the first motor. The motor will stop, leaving the system in a third position (as further explained above and as illustrated in FIG. 66). By rotating the first panel first end portion towards the box and about the first panel axis, the boxes lid starts moving downward to a closed position. The brace 350n may hold the base of the box stationary while the first panel forces the lid downward. Additionally, the different in heights of the first panel second end and the second panel allow the box to more easily be creased and fold properly. When the first panel first end is substantially vertically orientated, as explained above, the system is in the third position (as illustrated in FIG. 66).

Next, after the system is in the third position, the system may move the panels to the fourth position. As explained above, the sensor (225n and/or 225n(a))) will detect that the first panel is in the third position and the processor will stop the motor as stated above, then the processor will once again, using it preprogrammed logic, to send a signal to the motor commanding it to move the first panel back to its original position (as illustrated in FIG. 67). Once a sensor (225n and/or 225n(a)) detects that the first panel is back at its original position being substantially horizontal, the sensor will send a signal, through a conductor 690*n*, to the processor. Once the processor receives the signal that the first panel is in original position and the second panel is in the lowered position (as illustrated in FIG. 67), the process will utilize it preprogrammed logic to interpret and determine the next action. The next action being to stop the first motor allowing the first panel to become stationary. The processor will send the signal, through conductor 690*n*, to the first motor to stop. At this point, the system is in a fourth position (as further explained above and as illustrated in FIG. 67). This position is also known as a "wind up" position preparing the motor to apply full force in the next position or fifth position.

Next, the system will move the system to the fifth position (as illustrated in FIG. 68). Using preprogrammed logic, the processor will send a signal back to the first motor 135*n*, to rotate the first panel first end over the second so that the box closes. To do that, after receiving a signal, through conductor 690*n*, the motor may interpret the signal and start the motor. In certain embodiments, the brace 350*n* may provide forces against the base of the box so that the box may retain stable on the top surface of the second panel, the first motor starts, moving the first panel into a first panel second track position or box closed position (as illustrated in FIG. 68). As the first panel is moving, the box lid is shifting in the same direction. The movement from the first panel first track position to the position shown in FIG. 68 (or ending position) may happen at a more rapid speed than the movement of the first panel from the first position to the second position, the third position or the fourth position. The more rapid speed of moving from the first position to the fifth position (as illustrated in FIG. 68) may increase the ability to properly close the box. The angle and direction are further explained above and illustrated in FIG. 68 above. The brace ensures that the base of the box is stationary while the lid of the box folds and latches onto the base. A sensor (225*n* and/or 225*n*(*a*)) detects the first panel to be in a first panel to be in the ending position. The sensor then sends a signal to the processor, through conductor 690*n*, identifying the position of the first panel. The processor utilizes its preprogrammed logic and determines the next step. Next, the processor, using its preprogrammed logic, will stop the first motor. The processor then sends a signal to the first motor instructing it to stop. The motor receives the signal and stops the motor 135*n*. At this point, the system is in a fifth position (as further explained above and as illustrated in FIG. 68). The fifth position includes the first panel first end portion positioned over the second panel first end portion creating a box closed position 260*n* having the first panel first end portion located over at least a portion of the second panel first end portion 265*n*. The box closed position further includes an ending position 325*n* having the first panel first end portion adjacent to a rotational stop 290*n*.

A sensor 620*n*, in communication with the processor and the brace motor by electrical conductor 690*n*, will send a signal to the processor. The signal received by the processor will notify the processor that the box is ready to leave the conveyer channel. It is understood that after the box has closed, the process can send a plurality of signal. In one embodiment, the processor may send to an indictor (light emitting device) to indicate that the box is ready to be removed manually. In other embodiments, the processer may send a signal to the brace motor 605*n* to start to open the brace or door so that a user may remove the box with its contents from the retrieval area and conveying channel. As the brace motor runs, a gap forms allowing the box to be removed from the conveyer channel.

The first sensor 225*n* is configured to detect if the first panel is positioned in a first panel first track position or a first panel second track position. It is understood that the first sensor may be used to detect the positions of panels at many separate locations along the first track. The first sensor may be two separate sensors (225*n* and 225*n*(*a*)) located at each stopping position or may be a single sensor capable of detecting the panels movement across the entirety of the track. The sensor may be located within the wall containing the track, within a wall opposite of the track, the sensor may be incorporated in the enclosure, the sensor may even within each panel, however in other embodiments the sensor may be positioned elsewhere according to the spirit and scope of the present invention.

In other embodiments, the system may include sensors on the rotating device that rotates the panels and is configured to detect when the device is at a beginning state or ending sate. Furthermore, the sensor may be in the form of an encoder. An encoder is defined as an electro-mechanical motion sensor device providing the user with information on velocity, direction, and position. Examples of optical detection sensors may include electromechanical, pneumatic, magnetic, capacitive, photoelectric (transmitting beam of light, and detecting the object based on the reflected light), ultra-sonic (using sound waves), laser-based sensors, LED based sensors, etc. The first sensor is in communication with the first motor and the processor. This connection allows the sensor to detect the motion of the panel, send that information to the processor or computing device, have the processor analyze the information and send a command to the motor.

The second sensor is configured to detect if the second panel is positioned in a second panel first track position, being substantially horizontal, as illustrated in FIG. 64, or a second panel second track position, as illustrated in FIG. 65. It is understood that the first sensor may be used to detect the positions of panels at many separate locations along the first track. The second sensor may be comprised of two separate sensors (240*n* and 240*n*(*a*)) as illustrated in FIG. 70) located at each stopping position or may be a single sensor capable of detecting the panels movement across the entirety of the track. Furthermore, the sensor may be in the form of an encoder. The sensor may be located within the wall containing the track, within a wall opposite of the track, the sensor may be incorporated in the enclosure, the sensor may even within each panel, however in other embodiments the sensor may be positioned elsewhere according to the spirit and scope of the present invention. An encoder is defined as an electro- mechanical motion sensor device providing the user with information on velocity, direction, and position. Examples of optical detection sensors may include electromechanical, pneumatic, magnetic, capacitive, photoelectric (transmitting beam of light, and detecting the object based on the reflected light), ultra-sonic (using sound waves), laser-based sensors, LED based sensors, etc. The second sensor is in communication with the second motor and the processor. This connection allows the sensor to detect the motion of the panel, send that information to the processor or computing device, have the processor analyze the information and send a command to the motor.

The third sensor is positioned above the second panel in either a wall or enclosure ceiling, configured to detect if the box is disposed on the second panel within the conveyer channel. This sensor may be in communication with the processor while also being in communication with the brace motor, having the sensor detect when the box is ready to leave the conveyer channel. In an example embodiment the sensor may be in the form of an optical detection sensor including electromechanical, pneumatic, magnetic, capacitive, photoelectric (transmitting beam of light, and detecting the object based on the reflected light), ultra-sonic (using sound waves), laser-based sensors, LED based sensors, etc. In other example embodiments, the sensor may be in the form of a weight sensor measuring the load on the second panel. Examples of weight sensors include strain gauges, capacitance, hydraulic, pneumatic, etc.

The first and second motor may be in communication with a power source $700n$, each motor may have its own power source, or the motors may share a power source. The power source may be in the form of a battery such standard dry cell batteries or rechargeable batteries, a linear power supply, a switched power supply, etc. Likewise, the brace motor and arm motor may also be in communication with a power source $700n$, each motor may have its own power source, or the motors may share a power source. The power source may be in the form of a battery such standard dry cell batteries or rechargeable batteries, a linear power supply, a switched power supply, etc. Each component, being the first motor, second motor, brace motor, arm motor, arm sensor, brace sensor, first, second, or third sensor may draw power from the same power source or may each have their own power source.

In certain embodiments, the processor $315n$ may be a programmable logic controller (PLC) or programmable controller, such as modular PLC's or Fixed/Integrated/Compact PLC's. However, other types of programmable controllers or processes may be used that are within the spirit and scope of the present invention. The processor may be programmed with logic to perform certain actions and steps identified above based on information provided sensors. The electrical components illustrated in FIG. 69 may electrically coupled or in electrical communication such that the different electrical components ($315n$, $240n$, $240n(a)$, $255n$, $255n(a)$, $135n$, $160n$, $610n$, $605n$, $620n$ and $630n$) are in communication with each other and with power supply $700n$.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A system for automatically folding a box for fast food delivery, the system comprising:
   a wall;
   a conveyor channel disposed adjacent to the wall;
   a first panel disposed in the conveyor channel and having a first panel first end portion, a first panel second end portion, and a first panel planar surface configured for the box to rest on top of, to be conveyed and to move across the first panel planar surface;
   the first panel pivotally in attachment with a lower portion of the system at the first panel second end portion;
   at least one motor in attachment with the first panel second end portion such that first panel pivots about a first panel pivot axis within the conveyor channel;
   a second panel having a second panel first end portion, a second panel second end portion, and a second panel planar surface configured for the box to rest on top of, to be conveyed and move across the second panel planar surface;
   the second panel pivotally in attachment with a lower portion of the system at the second panel second end portion;
   the at least one motor in attachment with the second panel second end portion such that second panel pivots about a second panel pivot axis within the conveyor channel;
   wherein the first panel and the second panel are vertically offset such that the first panel second end portion is disposed at a predetermined distance above the second panel second end portion;
   wherein the first panel and the second panel are horizontally offset, wherein the first panel second end portion is disposed proximate to the second panel first end portion; and
   wherein the wall is substantially vertical and wherein the first panel and second end panel are in attachment with the lower end of the wall.

2. The system of claim 1 comprising:
   a rotational limiter;
   at least one sensor configured to detect the box within the conveyor channel; and
   a processor.

3. The system of claim 1, wherein the system further comprises:
   a beginning position comprising the second panel first end portion at a first height such that the second panel first end portion is adjacent to the first panel second end portion; and,
   an ending position comprising the first panel first end portion disposed over the second panel first end portion.

4. The system of claim 3 comprising:
   a second position comprising the second panel first end portion at a second height such that the second panel first end portion is below the first panel second end portion;
   a third position comprising the first panel being substantially vertically arranged; and
   wherein the second position and the third position occur substantially simultaneously.

5. The system of claim 3, wherein the first panel is elongated and substantially planar and wherein the second panel is elongated and substantially planar.

* * * * *